[12] United States Patent  
Nakayama et al.

(10) Patent No.: US 7,227,998 B2  
(45) Date of Patent: Jun. 5, 2007

(54) IMAGE PROCESSING APPARATUS, CONTROL METHOD OF THE SAME, COMPUTER PROGRAM, AND COMPUTER-READABLE STORAGE MEDIUM

(75) Inventors: Tadayoshi Nakayama, Tokyo (JP); Naoki Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 750 days.

(21) Appl. No.: 10/458,490

(22) Filed: Jun. 11, 2003

(65) Prior Publication Data

US 2003/0228063 A1    Dec. 11, 2003

(30) Foreign Application Priority Data

Jun. 11, 2002 (JP) .......................... 2002-170167  
Jan. 7, 2003 (JP) .......................... 2003-001382  
Apr. 3, 2003 (JP) .......................... 2003-100633  
Apr. 16, 2003 (JP) .......................... 2003-111876

(51) Int. Cl.  
*G06K 9/36* (2006.01)  
*G06K 9/46* (2006.01)

(52) U.S. Cl. .................................................. 382/232

(58) Field of Classification Search ................ 382/218, 382/219, 232, 233, 238, 246, 250, 251, 305; 375/240.02, 240.03, 240.12; 341/67, 107; 358/462, 476; 348/402, 405  
See application file for complete search history.

(56) References Cited

U.S. PATENT DOCUMENTS

| 4,982,285 | A | * | 1/1991 | Sugiyama | 375/240.12 |
| 5,581,373 | A | | 12/1996 | Yoshida | 358/476 |
| 5,663,763 | A | * | 9/1997 | Yagasaki et al. | 375/240.03 |
| 5,801,650 | A | | 9/1998 | Nakayama | 341/67 |
| 5,818,970 | A | | 10/1998 | Ishikawa et al. | 382/248 |
| 5,841,381 | A | | 11/1998 | Nakayama | 341/67 |
| 5,872,599 | A | * | 2/1999 | Rosenbrg | 375/240.16 |
| 5,986,594 | A | | 11/1999 | Nakayama et al. | 341/107 |
| 6,125,140 | A | * | 9/2000 | Wilkinson | 375/240 |
| 6,160,844 | A | * | 12/2000 | Wilkinson | 375/240 |
| 6,408,102 | B1 | | 6/2002 | Nakayama | 382/246 |
| 6,549,676 | B1 | | 4/2003 | Nakayama et al. | 382/246 |
| 6,553,143 | B2 | | 4/2003 | Miyake et al. | 382/239 |
| 6,560,365 | B1 | | 5/2003 | Nakayama et al. | 382/233 |
| 6,567,562 | B1 | | 5/2003 | Nakayama et al. | 382/246 |
| 2002/0078113 | A1 | | 6/2002 | Nakayama | 708/300 |
| 2002/0136296 | A1 | * | 9/2002 | Stone et al. | 375/240.03 |
| 2003/0002743 | A1 | | 1/2003 | Ohta et al. | 382/239 |
| 2003/0031371 | A1 | | 2/2003 | Kato et al. | 382/239 |
| 2003/0043905 | A1 | | 3/2003 | Nakayama et al. | 375/240.04 |
| 2003/0086127 | A1 | | 5/2003 | Ito et al. | 358/462 |
| 2003/0086597 | A1 | | 5/2003 | Ohta et al. | 382/131 |
| 2003/0088598 | A1 | | 5/2003 | Nakayama | 708/300 |

* cited by examiner

*Primary Examiner*—Amir Alavi  
(74) *Attorney, Agent, or Firm*—Fitzpatrick, Cella, Harper & Scinto

(57) ABSTRACT

This invention reliably encodes an image while continuously inputting the image with a relatively simple configuration. For this purpose, in this invention, input image data is encoded by an encoder (102) and stored in first and second memories. An encoding sequence controller (108) monitors the code amount. Upon determining that the code amount has reached a set value, the encoding sequence controller discards the data in the first memory and instructs the encoder (102) to increase the quantization step and continue encoding. Preceding encoded data is stored in the second memory. The encoded data is re-encoded by a re-encoder (109) using the same quantization step as that of the encoder (102) after the parameter is changed. The re-encoded data is stored in the first and second memories. The quantization steps set in the encoder (102) and re-encoder (109) at this time have such values that re-encoding by the re-encoder (109) is ended before time when the code amount reaches the set value again.

39 Claims, 39 Drawing Sheets

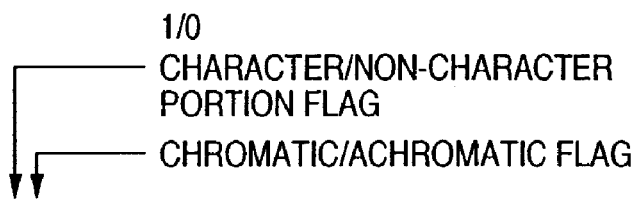
FIG. 19A  000000BB(8BITS)
FIG. 19B  1,1,1,1,2,3,2,3,2,2,2,2,2,1,0,1,0,0,0,0,0,0,2,
FIG. 19C  -4,1,4,2,3,2,3,-5,2,3,1,0,1,-6,0,
FIG. 19D  1,1,1,1,3,3,3,3,3,3,3,3,3,1,1,1,1,1,1,1,1,1,3,
FIG. 19E  -4,1,-9,3,-9,1,

∗ IS OUTSIDE SEARCH RANGE

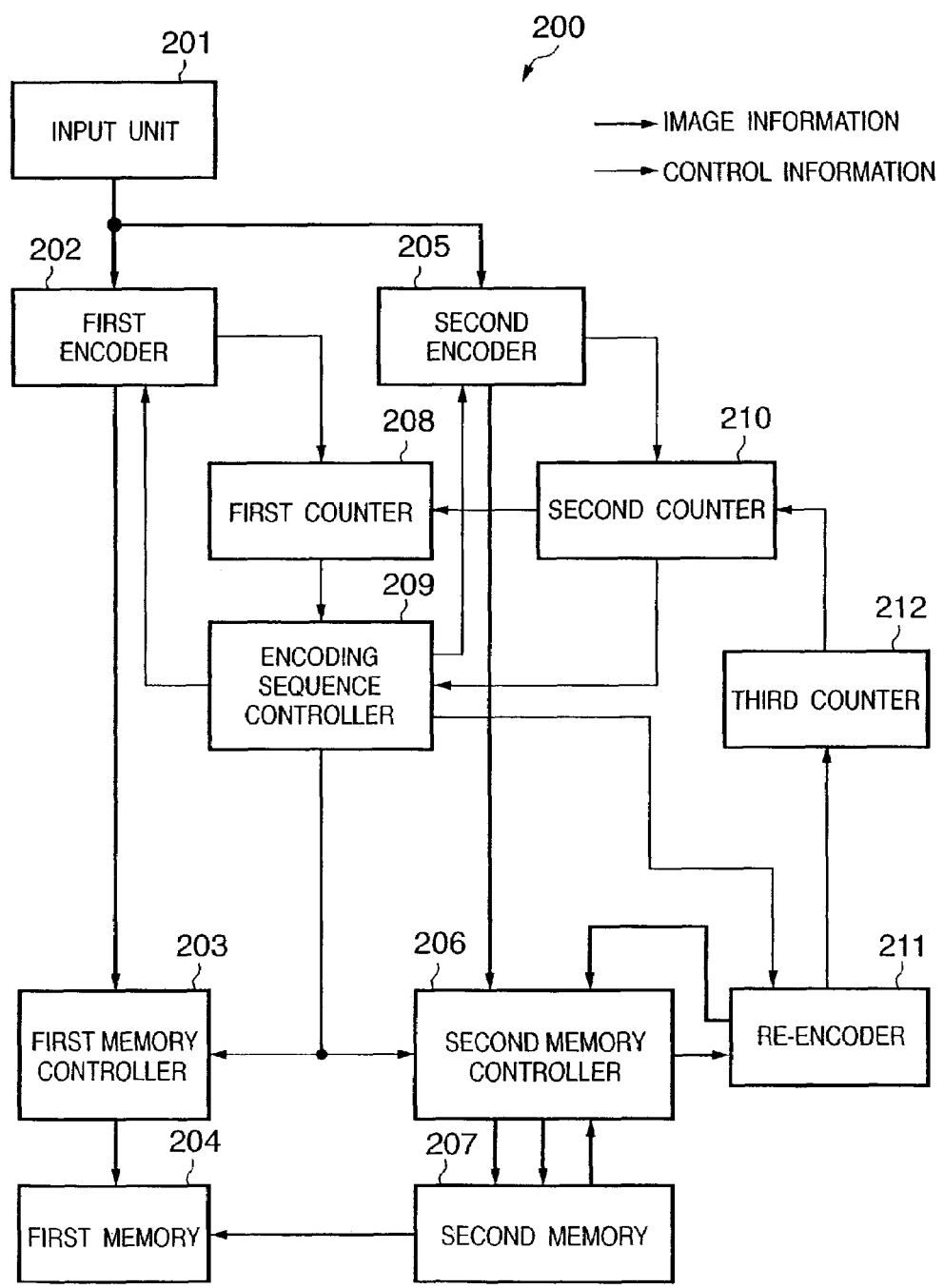

IMAGE PROCESSING APPARATUS, CONTROL METHOD OF THE SAME, COMPUTER PROGRAM, AND COMPUTER-READABLE STORAGE MEDIUM

FIELD OF THE INVENTION

The present invention relates to a technique for encoding image data.

BACKGROUND OF THE INVENTION

Conventionally, a JPEG system using discrete cosine transform (to be abbreviated as DCT hereinafter) and a system using Wavelet transform have been often used as still image compression systems. Since coding systems of this type are variable-length coding systems, the code amount changes from one image to be encoded from another.

In a JPEG system as an international standardized system, only one set of quantization matrices can be defined for an image, so the code amount cannot be adjusted without any prescan. Therefore, when this method is used in a system in which data is stored in a limited memory, memory overflow may occur.

To prevent this, a sufficient memory capacity must be secured. However, the sizes of input images are not unconditionally equal but are different in some cases. Accordingly, it is necessary to secure a memory having a capacity suitable to a maximum possible input size.

Unfortunately, in an apparatus in which a memory is thus secured in accordance with the maximum size, this memory is secured even when images smaller than the maximum size are input. That is, the memory cannot be effectively utilized.

It is, therefore, possible to secure a memory capacity in accordance with medium-sized images. In this case, however, coded data obtained by encoding exceeds this memory capacity.

As countermeasures against this inconvenience, the following methods are known. In one method, if a predetermined code amount is exceeded, the compression ratio is changed, and the original is reread. In another method, a code amount is estimated beforehand by prescan, and quantization parameters are reset to adjust the code amount.

In a conventionally known code amount control method which performs prescan, pre-compressed data is input to an internal buffer memory and expanded, and the expanded data is finally compressed by changing compression parameters and output to an external memory. In this method, the compression ratio of the final compression must be higher than that of the pre-compression.

In another known method, for example, an allowable code amount for each pixel block is obtained, and a coefficient obtained by level-shifting the DCT coefficient n times is Huffman-coded to decrease the code amount. The shift amount n is determined on the basis of the allowable code amount.

However, the method of executing prescan and final scan is time-consuming because an original is scanned twice.

Image information contains not only original image data but also image region information that accompanies the image data. The image region information is mainly used to execute color processing or adjust the number of tone levels by an image output unit such as a printer engine to obtain a fine-looking output image. A natural image contains chromatic colors and achromatic colors while a document original contains many black characters. When the type of black ink to be used is changed depending on the type of image, a natural image can be made more natural, and characters can be output more sharply.

In this way, 1-bit attribute flag data is added to each pixel to indicate that the pixel has a chromatic or achromatic color or the pixel corresponds to a character portion. Accordingly, when the image is output and, more particularly, printed, the image quality can be increased. The image region information also contains information other than the above-described information.

Hence, when image information should be compressed, not only the image data but also the image region information must be compressed. To make the compressed and encoded data have a target size or less, scan must be executed twice as prescan and final scan.

To solve this problem, the assignee of the present inventors has already proposed several techniques for encoding an image substantially within the encoding process time of one cycle using a small memory capacity. These techniques will be described later in detail, and only a brief description will be made here. When the code amount is going to exceed the target memory capacity, the compression ratio of the encoder is increased. In addition, data that has already been encoded is re-encoded to be equivalent to that compressed at the newly set compression ratio.

Although the above process is very effective, the re-encoder that executes the re-encoding process needs to have a high process capability. If the re-encoding process capability is low, the compression code amount at the newly set compression ratio may exceed the target value before the end of re-encoding. If this occurs, the re-encoding process cannot be activated. As a result, compression encoding fails.

For the above reason, a high re-encoding process capability is required. In fact, the above-described case occurs relatively rarely. Hence, a high process capability for re-encoding is excessive and leads to an increase in cost.

SUMMARY OF THE INVENTION

It is the first object of the present invention to provide an image processing apparatus and method which allow to reliably encode an image while continuously inputting the image with a relatively simple configuration, and a computer program and a computer-readable storage medium therefor.

It is the second object of the present invention to provide a technique for reducing the total code amount of image data and its image region information to a target size or less to effectively utilize a memory.

It is the third object of the present invention to provide a technique for reliably encoding an image to a target code amount or less while continuously inputting the image with a relatively simple configuration.

It is the fourth object of the present invention to provide a technique for suppressing a degradation in image quality as much as possible in compression encoding.

In order to achieve the above objects, an image processing apparatus according to the present invention has, e.g., the following configuration. That is, there is provided an image processing apparatus for compression-encoding image data, characterized by comprising:

a first compression encoding unit in which a quantization step can be changed;

a second compression encoding unit in which the quantization step can be changed and which is adapted to decode and re-compress code data compressed by the first compression encoding unit;

a code amount monitor unit adapted to monitor a code amount generated by the first compression encoding unit and determine whether the code data amount has reached a predetermined amount;

a setting unit adapted to, when it is determined by the code amount monitor unit that the code amount has reached the predetermined amount, determine and set a next quantization step in each of the first and second compression encoding units; and a control unit adapted to, when the quantization step is changed by the setting unit, cause the second compression encoding unit to re-encode the preceding code data precedingly generated by the first compression encoding unit, store the code data that has undergone re-encoding in a predetermine storage unit as code data after a parameter of the first compression encoding unit is changed, and store the code data generated by the first compression encoding unit in the storage unit as subsequent code data, wherein the setting unit includes a unit adapted to compare, for a quantization step as a candidate, first predicted time required for re-encoding for the preceding code data from the second compression encoding unit with second predicted time when the code amount reaches the predetermined amount again in encoding in the first compression encoding unit and obtain the quantization step for which the first predicted time is shorter than the second predicted time so as to determine the quantization step to be set for each of the first and second compression encoding units.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 19A to 19E are views showing the process contents of Packbits encoding;

FIGS. 20A to 20E are views showing the process contents of Packbits encoding according to the third example;

FIG. 39 is a block diagram showing the configuration of an image processing apparatus according to the seventh embodiment.

DETAILED DESCRIPTION OF THE PREFERRED EMBODIMENTS

Preferred embodiments of the present invention will now be described in accordance with the accompanying drawings. First, basic portions will be explained.

Figure 1:
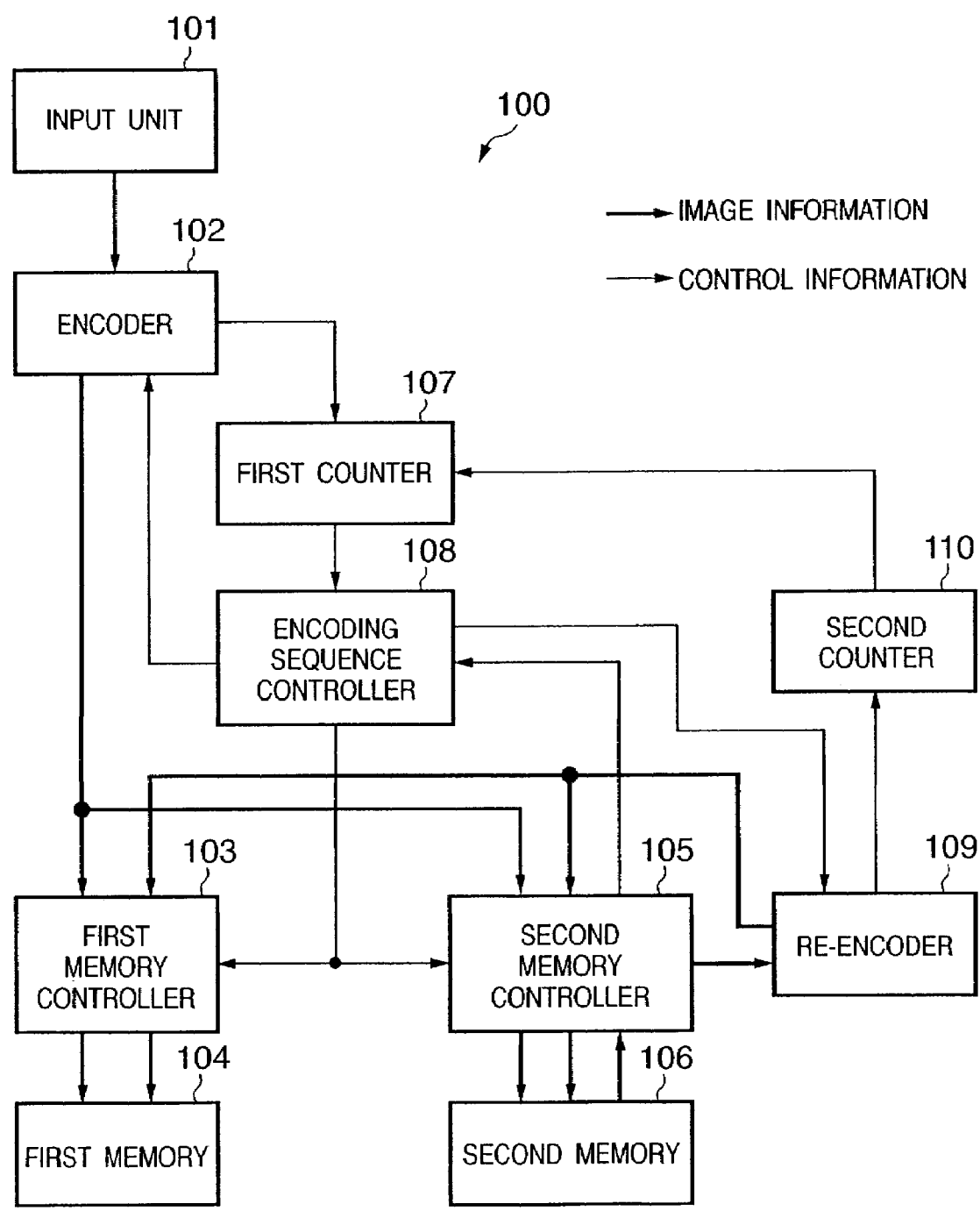
FIG. 1 is a block diagram showing the configuration of an image processing apparatus according to the first example as a presupposition of the present invention.

FIG. 1 is a functional block diagram of an image processing apparatus 100 according to an embodiment. Each part will be briefly described below.

The image processing apparatus 100 includes an input unit 101 for inputting images from an image scanner. The input unit 101 can input image data from, e.g., a unit adapted to render a page description language into a raster image, or can load an image file stored in a storage medium. Images can also be received from a network in some cases.

An encoder 102 encodes input image data. The method of encoding is a well-known JPEG coding system. That is, image data consisting of 8×8 pixels is DCT-transformed, quantized using a quantization step (determined by a compression parameter) (to be described later), and Huffman-coded.

First and second memory controllers 103 and 105 perform control such that the encoded data (the same encoded data) output from the encoder 102 is stored in first and second memories 104 and 106, respectively. The first memory 104 holds finally determined encoded data (compressed to a data amount within a target value) in order to output the encoded data to, e.g., a network apparatus, image output apparatus, or large-capacity storage device connected outside the basic configuration shown in FIG. 1. The second memory 106 is a work memory which assists compression encoding for forming the encoded data on the first memory.

A counter 107 counts the data amount of image data compression-encoded by the encoder 102 and holds the count value. In accordance with the result of counting, the counter 107 also outputs the count value to an encoding sequence controller 108 for controlling the encoding sequence.

This encoding sequence controller 108 detects whether the count value of the counter 107 has reached a certain set value. Upon detecting that the set value is reached (the target value is exceeded), the encoding sequence controller 108 outputs a control signal to the first memory controller 103 so as to discard encoded data stored in the memory 104. On the basis of this control signal, the first memory controller 103 discards the stored data by clearing a memory address counter or encoded data management table. At the same time, the encoding sequence controller 108 clears the first counter 107 to 0 to make its value coincide with the data amount in the first memory 104 (image data is continuously input from the input unit 101 during this time). The encoding sequence controller 108 also controls the encoder 102 to encode data at a compression ratio higher than before. More specifically, the encoding sequence controller 108 sets to double the quantization step to be used to quantize the DCT transform coefficient.

The quantization step is simply doubled here. However, for a color image, different quantization steps may be assigned to one luminance signal (luminance data) and two color difference signals (color difference data), which are generated upon color conversion, such that finer control can be executed by alternately doubling the quantization steps.

Encoded data after the compression ratio is changed is also stored in the first and second memories 104 and 106 via the first and second memory controllers 103 and 105, respectively. Note that the first memory 104 stores codes generated by encoding data input after the discard operation.

When the count value of the counter 107 reaches a certain set value, the encoding sequence controller 108 outputs a control signal to the second memory controller 105 to read out encoded data stored in the second memory 106 up to the point and output the readout encoded data to a re-encoder 109 as an encoded data converting unit in parallel to the above control.

The re-encoder 109 decodes the input encoded data, performs re-quantization and the like for reducing the data amount, and executes the encoding process again. The encoded data is stored in the first and second memories 104 and 106 through the first and second memory controllers 103 and 105, respectively. At this time, the quantization step for re-encoding by the re-encoder 109 is the same as that updated in the encoder 102. The code amount obtained by re-encoding the data by the re-encoder 109 is counted by a second counter 110.

The second memory controller detects whether the re-encoding process by the re-encoder 109 is complete. That is, when there is no more data to be read out and re-encoded, the second memory controller 105 informs the encoding sequence controller 108 that the re-encoding process is complete. In practice, the encoding process is regarded as being complete when not only the read process by the second memory controller 105 but also the processing by the re-encoder 109 is complete.

After the re-encoding processing is completed, the count value obtained by the second counter 110 is added to the count value held in the first counter 107. This addition is executed when the encoding sequence controller 108 receives a re-encoding completion notification from the second memory controller 105. As a result of addition, the first counter 107 holds a count value representing the total data amount in the first memory 104. That is, when the encoder 102 and re-encoder 109 completely encode one frame (one page), the count value held in the first counter 107 after the addition described above represents a total data amount generated when one frame (one page) is encoded by this apparatus (details will be described later).

Regardless of whether the re-encoding process is/is not complete, the encoder 102 keeps encoding image data from the input unit 101 as long as there is data to be encoded.

Whether the count value of the first counter 107 has reached the certain set value is repetitively detected until one-page image data input from the input unit 101 is completely coded (encoded and re-encoded). These encoding and re-encoding processes described above are executed under control corresponding to the detection result obtained.

The above process contents will be described below in more detail. Encoding of a monochrome image will be described below.

Image data input from the input unit 101 is compression-encoded by the encoder 102 in accordance with a quantization parameter Q1 at the initial stage. The resultant compression-encoded data is written in the first and second memories 104 and 106. At this time, the first counter 107 counts the generated code data amount. When the compression encoding process is ended before the code data amount reaches the set amount, the data stored in the first memory 104 is output to the outside. If a subsequent image (the image of the next page) is present, the counters 107 and 110 are reset, and the image is input.

On the other hand, assume that the encoding sequence controller 108 detects during encoding a given page that the generated encoded data amount has reached the set value. In this case, the data in the first memory 104 is discarded. A quantization parameter Q2 at the next level is set to increase the compression ratio in the encoder 102, and image data input is continuously done. At this time, the first counter 107 is reset. Accordingly, image data that is input after it is determined that the count value has reached the set value is encoded at a higher compression ratio. Encoded data (the data encoded using the quantization parameter Q1) before the encoded data amount reaches the set value is stored in the second memory 106. This data is re-encoded by the re-encoder 109, and the re-encoding result is stored in each of the first memory 104 and second memory 106. The quantization parameter used for re-encoding by the re-encoder 109 is the same as the quantization parameter Q2 of the encoder 102 after the setting is changed. When the previous encoded data stored in the second memory 106 is completely re-encoded, the code amount is held in the second counter 110. This code amount is added to the first counter 107.

As a result of the above processing, each of the first and second memories 104 and 106 stores encoded data obtained by compressing the image data from the top of one page using the quantization parameter Q2. When it is determined again during the compression encoding using the quantization parameter Q2 that the value of the counter 107 has reached the set value, a quantization parameter Q3 is set for the encoder 102 and re-encoder 109 to further increase the compression ratio, and the above processing is executed. If it is determined even with the quantization parameter Q3 that the count value has reached the set value, a quantization parameter Q4 is set.

The quantization step is increased by ×m (m>1) so that Q2=Q1×m, Q3=Q2×m, Q4=Q3×m, . . . (The quantization step need not always be uniformly increased). When the quantization step becomes large, a frequency component value obtained upon DCT transform can be expressed by a small value, i.e., a small number of bits. For this reason, the data amount can be reduced.

Figure 8:
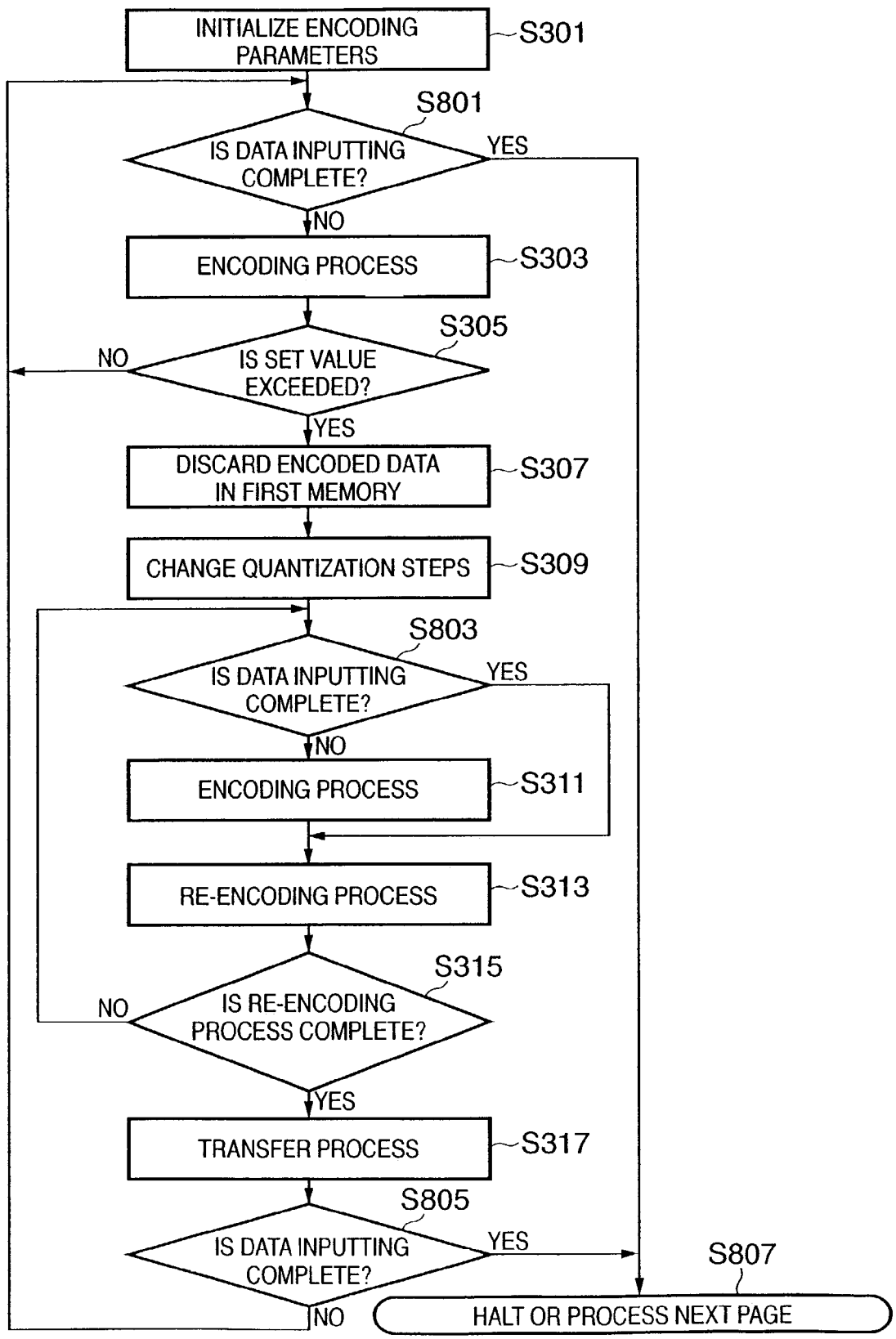
FIG. 8 is a flow chart showing details of the processing in the configuration shown in FIG. 1.

FIG. 8 shows a flow chart representing the flow of processing in the configuration shown in FIG. 1. For descriptive simplicity, however, the processing will be explained first with reference to a simplified flow chart shown in FIG. 3.

As already described above, the image processing apparatus 100 of the present invention compression-encodes one-page image data input from the input unit 101 such as a scanner into a predetermined data amount or smaller. To realize this encoding process, the image processing apparatus 100 includes the encoder 102, re-encoder 109, first and second memories 104 and 106, and the like, in addition to the input unit 101. By using these functional blocks, the image processing apparatus 100 encodes data on the basis of the flow chart shown in FIG. 3.

Figure 3:
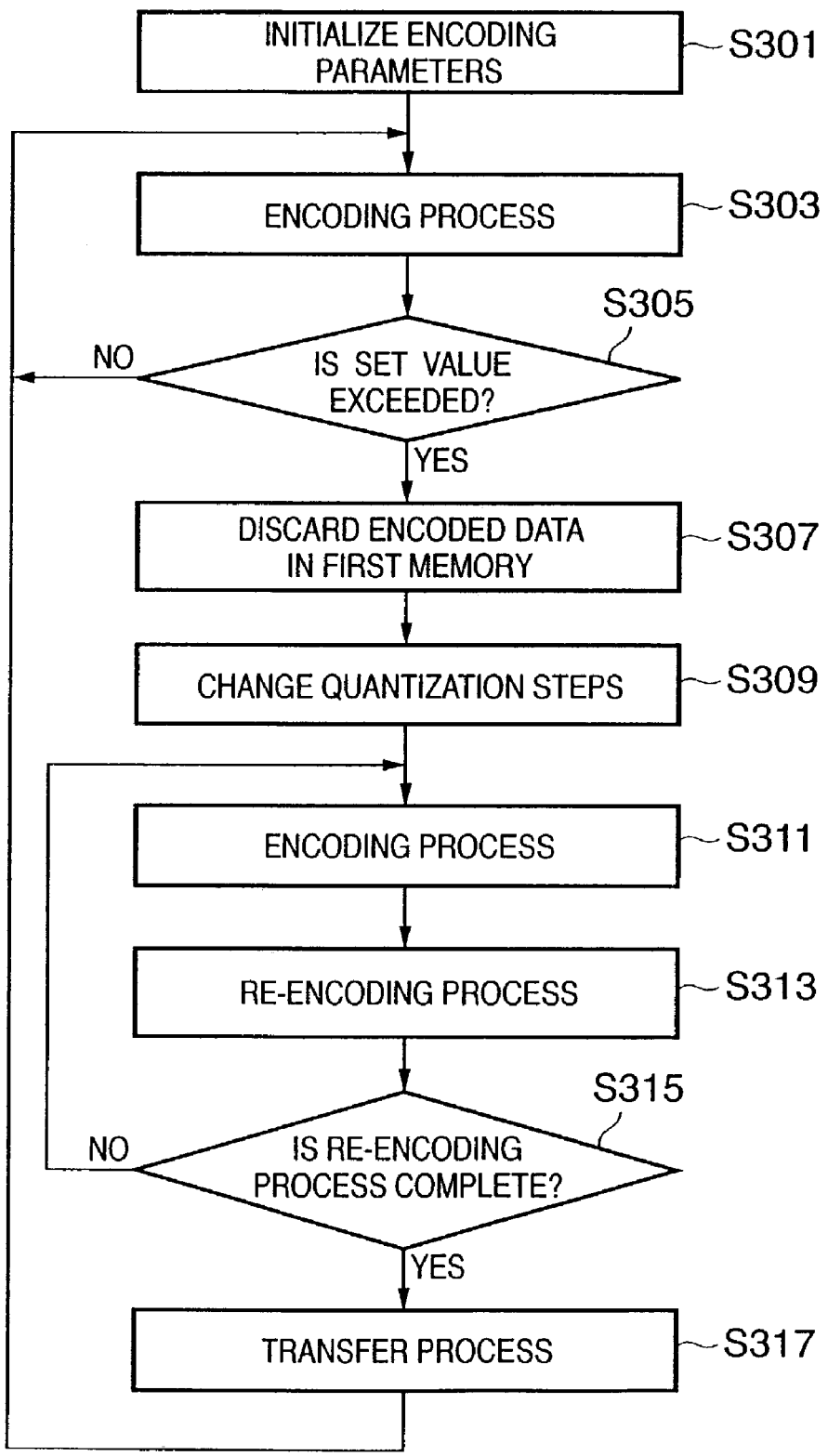
FIG. 3 is a flow chart schematically showing processing in the configuration shown in FIG. 1.

This flow chart shown in FIG. 3 is roughly divided into three processing phases present below.

(1) Encoding phase
(2) Encoding.re-encoding phase
(3) Transfer phase

FIGS. 4 to 7 illustrate, in a visually readily understandable manner, the way image data, encoded data, and the like are processed and stored in the memories in the individual processing phases.

Figure 4:
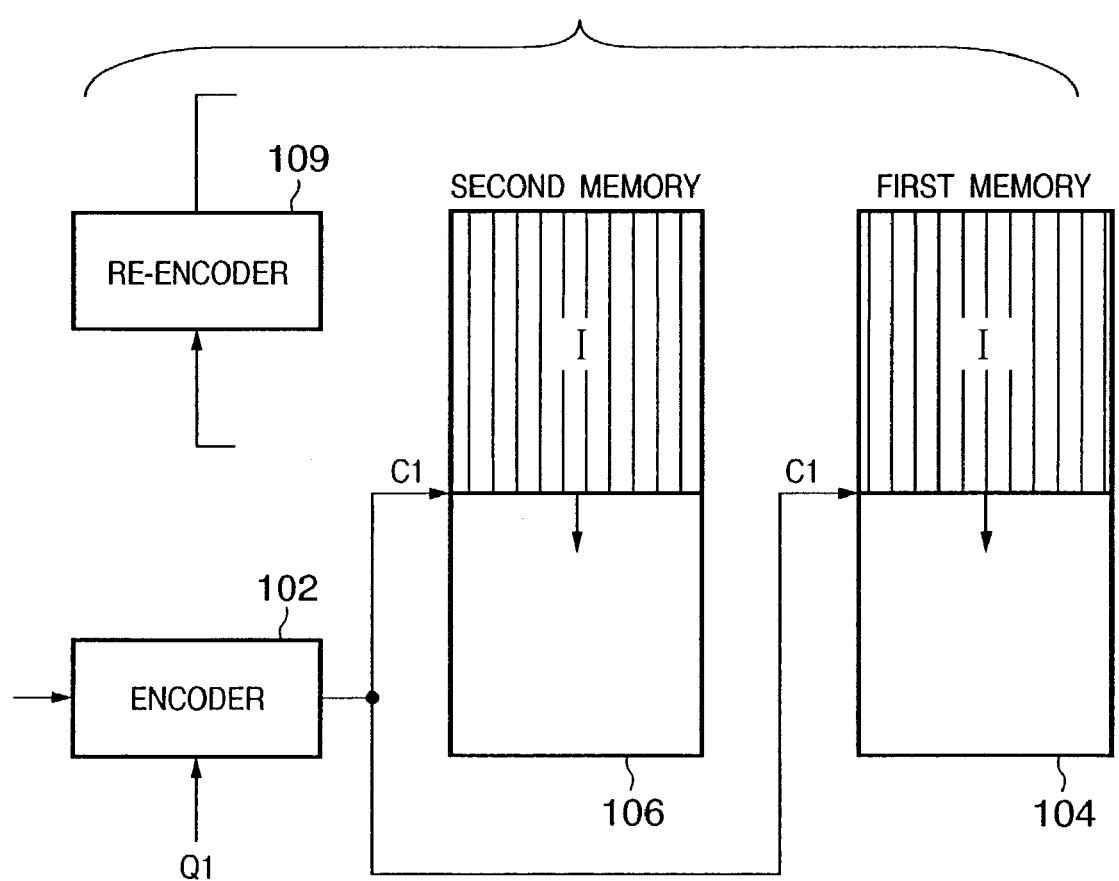
FIG. 4 is a view showing a data flow and memory contents in an encoding phase in the initial state.
Figure 5:
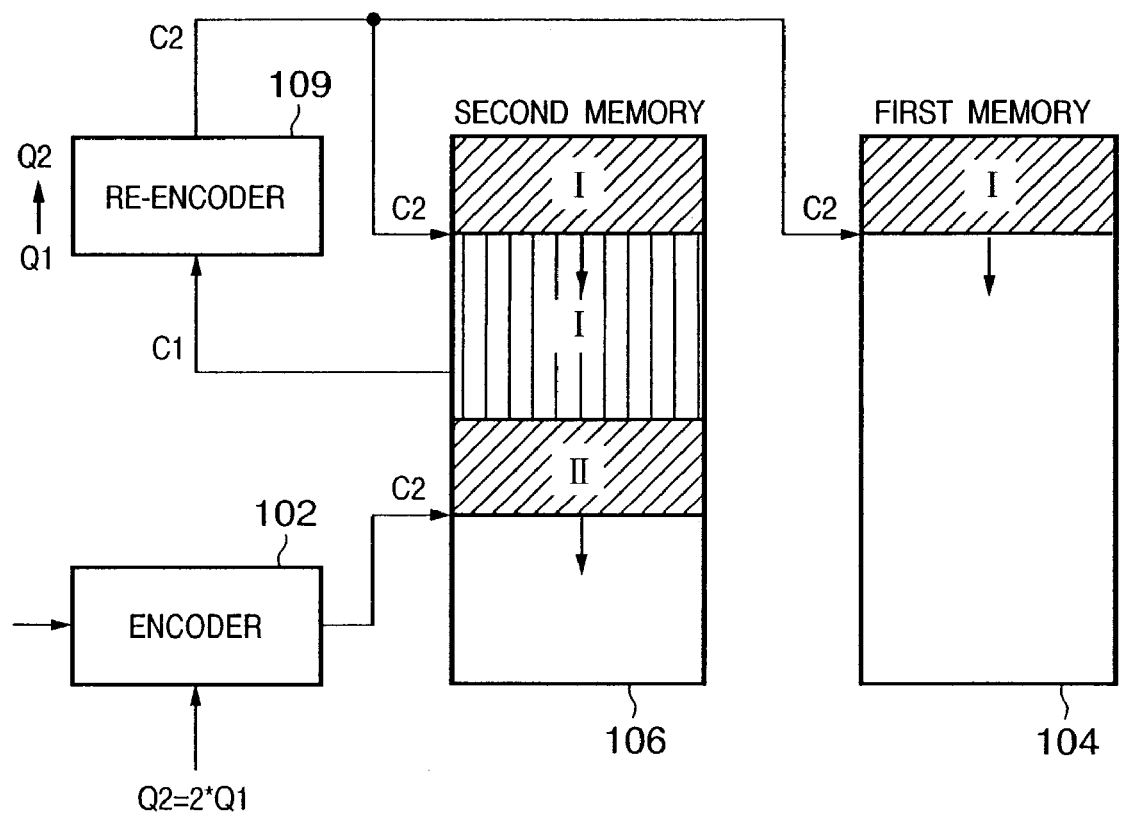
FIG. 5 is a view showing a data flow and memory contents in an encoding.re-encoding phase.
Figure 6:
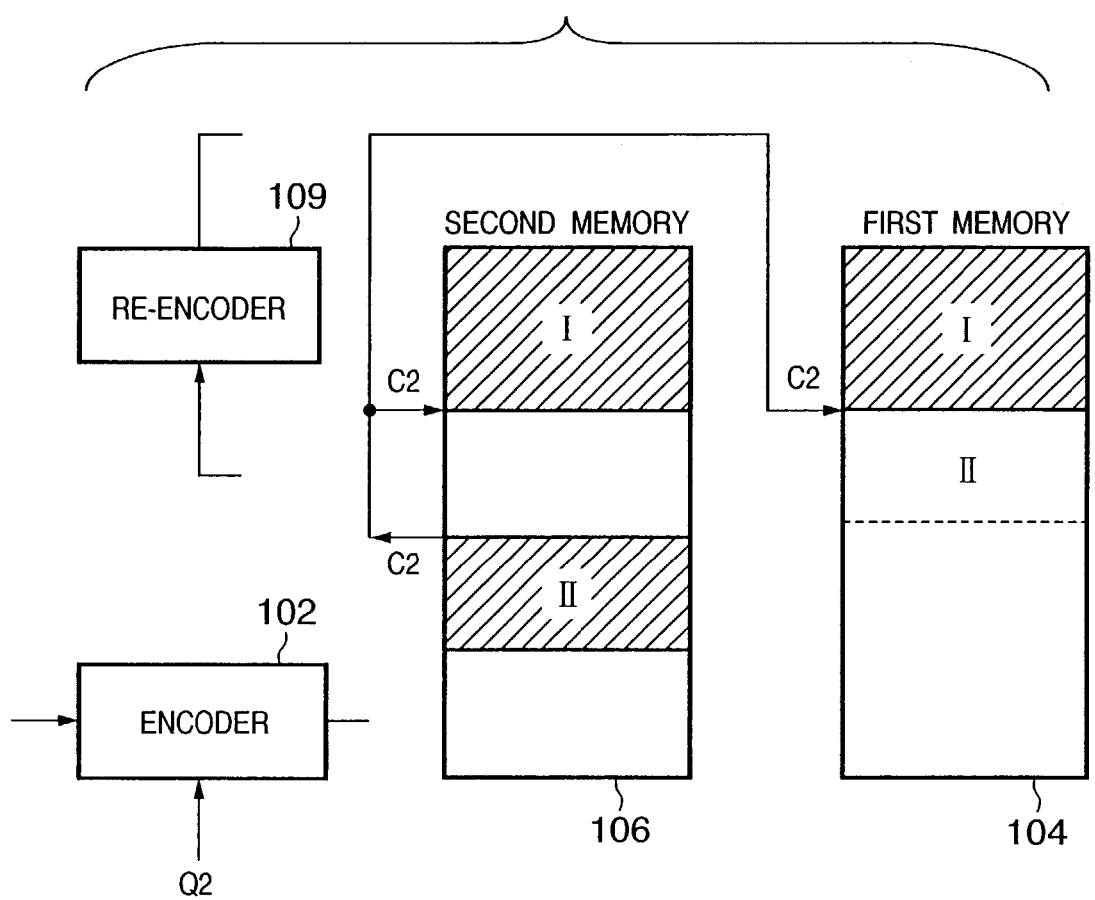
FIG. 6 is a view showing a data flow and memory contents in a transfer phase.
Figure 7:
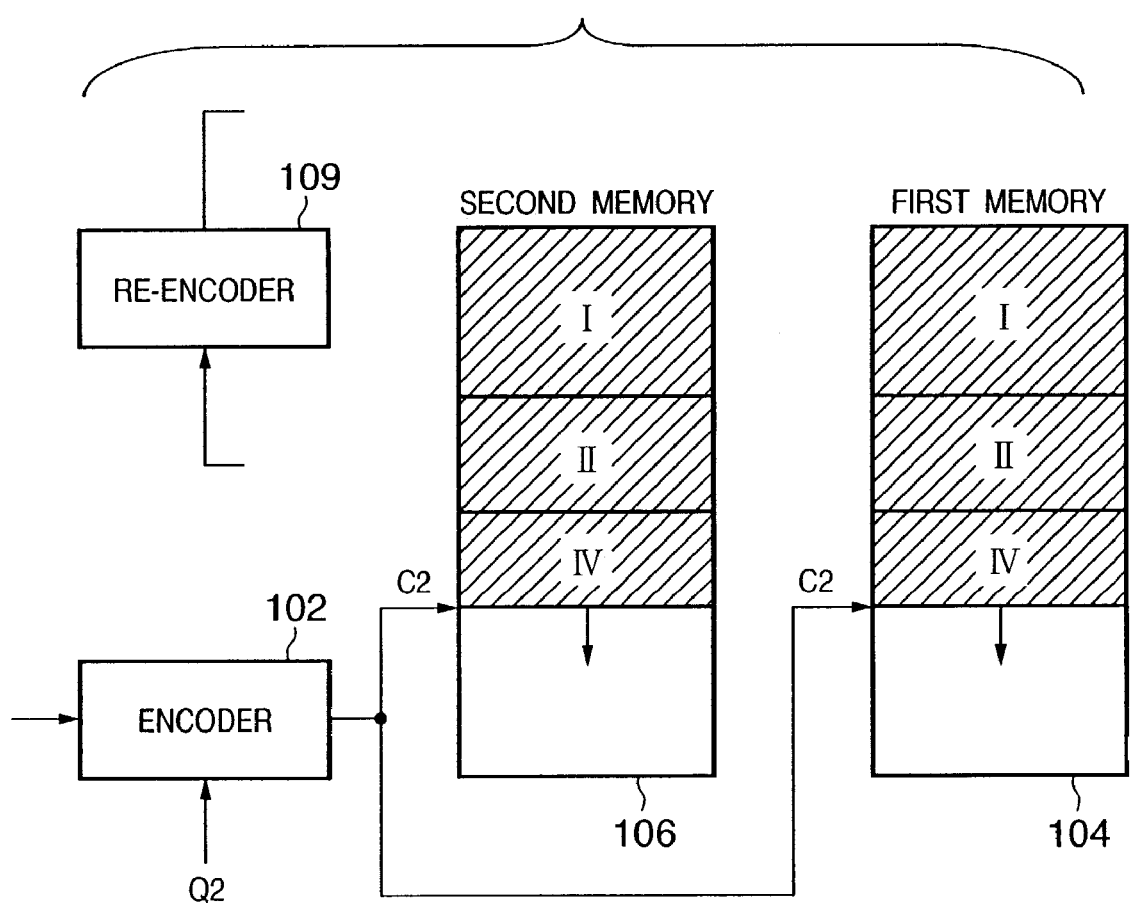
FIG. 7 is a view showing a data flow and memory contents in an encoding phase after the transfer phase.

FIG. 4 represents the initial state of the encoding phase corresponding to steps S303 and S305 in the flow chart of FIG. 3. FIG. 5 represents the processing state of the encoding.re-encoding phase corresponding to steps S307 to S315. FIG. 6 represents the processing state of the transfer state corresponding to step S317. FIG. 7 represents the processing state of the encoding phase after the transfer phase. Each phase will be explained below.

<<Encoding Phase>>

Encoding of one-page image data begins with encoding parameter initialization (step S301). In this process, the quantization step Q1 to be applied to the encoder 102 is set on the basis of the upper limit of an encoded data amount which is uniquely determined from an image size (a paper size read from the input unit 101 such as a scanner) to be encoded.

In step S303, the first counter 107 performs actual encoding (JPEG compression for every block consisting of 8×8 pixels of the image), and counts the data amount of output encoded data.

In step S305, whether the count value of the data amount has exceeded the aforementioned upper limit is detected. If NO in step S305, the JPEG encoding process in step S303 is continued. This is the initial state encoding phase.

As shown in FIG. 4, the output encoded data from the encoder 102 is stored in both the first and second memories 104 and 106. Regions indicated by the vertical stripes represent the stored codes.

<<Encoding.Re-encoding Phase>>

When the encoding process by the encoder 102 progresses and the count value of the data amount exceeds the set upper limit, the encoded data in the first memory 104 is discarded in step S307, and the quantization parameter of the encoder 102 is changed to Q2 in step S309.

When the count value of the data amount of encoded data exceeds the set upper limit as described above, the compressed data amount is larger than the target value. In this case, continuing the encoding process by using the same quantization step is meaningless. To make the data amount smaller than before, therefore, the quantization step is changed to Q2 having a quantization step width larger than that of Q1.

After the quantization step and quantization calculation contents are thus changed, in step S311, the encoding process by the encoder 102 is restarted and the encoded data is stored only in the second memory 106 as shown in FIG. 5. In parallel with this processing, re-encoding is performed in step S313. In this re-encoding process, the encoded data stored in the second memory 102 is read out, re-encoded by the re-encoder 109, and stored in the two memories 104 and 106. These encoding process and re-encoding process are continued until codes of vertical stripes I are entirely re-encoded.

More specifically, this re-encoding process is realized by performing bit shifting for quantization values after encoded data is once Huffman-decoded, such that the same results as when these values are divided by $2^n$ are obtained, and performing Huffman encoding again (when m=2). This method can perform a high-speed re-encoding process since the quantization steps are changed only by bit shifting and neither inverse orthogonal transform nor re-orthogonal transform is performed. In step S315, the completion of the re-encoding process is detected.

The re-encoded data amount is smaller than the data amount of the encoded data before re-encoding. Therefore, as shown in FIG. 5, the re-encoded data can be overwritten in the memory area in which the codes before re-encoding are stored. When this re-encoding processing is complete, the data amount of the encoded data of the vertical stripes I has reduced to the data amount of encoded data of oblique stripes I shown in FIG. 6.

Steps S307 to S315 explained above are processes performed in the encoding.re-encoding phase.

<<Transfer Phase>>

When the re-encoding process is complete, a transfer process is performed in step S317. In this transfer process, as shown in FIG. 6, the encoded data of oblique stripes II stored only in the second memory 106 in the encoding.re-encoding phase is transferred to and stored in an address connected to the encoded data of the oblique lines I in the first memory 104. At the same time, in order that the oblique stripe I encoded data and oblique stripe II encoded data dispersed on the second memory 106 be continuously stored on the first memory 104, the oblique stripe II encoded data is transferred and connected in the second memory 106. This is the processing performed in the transfer phase.

When the above transfer phase is complete, the flow returns to the encoding phase in steps S303 and S305. As shown in FIG. 7, codes of oblique stripes IV are output from the encoder 102 and stored in the two memories 104 and 106. This encoding phase is slightly different from the initial state encoding phase (FIG. 4). That is, the quantization step of encoding by the encoder 102 is changed from Q1 to Q2, and the encoded data stored in the two memories 104 and 106 is a group of codes processed in different phases. When these differences are ignored, the encoding phase immediately after the transfer phase and the initial state encoding phase can be regarded as the same.

Accordingly, by repeating the encoding phase, encoding.re-encoding phase, and transfer phase, codes obtained by compressing one-page image data to the set code amount or less can be stored in the first memory. In addition, the input unit 101 simply keeps inputting data until the series of processes are completed. This eliminates the need to again input images from the beginning.

To make the explanation readily understandable, the flow chart shown in FIG. 3 describes only the processes corresponding to the phases shown in FIGS. 4, 5, and 6. In practice, however, inputting of one-page image data is completed in one of these phases. Therefore, the subsequent processing slightly changes in accordance with the phase in which the image input is completed. A flow chart in FIG. 8 shows a flow taking this into consideration. This flow chart shown in FIG. 8 takes account of the relationships between the completion of inputting of one-page image data and the various processes explained in FIG. 3. That is, steps S801, S803, S805, and S807 are added to the flow chart in FIG. 3.

In steps S801, S803, and S805, whether inputting of one-page image data from the input unit 101 is complete in the encoding phase, encoding.re-encoding phase, and transfer phase, respectively, is detected.

If it is detected that inputting of the one-page image data is complete in the encoding phase or transfer phase (step S801 or S805), the flow advances to step S807, and compression encoding of that page is terminated. If image data to be compression-encoded next is present, compression encoding of the next one-page image data is started (each counter is reset, and the quantization parameter is set to the initial value). If there is no such data, the operation halts.

On the other hand, if it is detected that inputting of the one-page image data is complete in the encoding.re-encoding phase (step S803), the operation of the encoder 102 must be temporarily stopped until there is no more image data to be re-encoded. Therefore, the encoding process in step S311 is bypassed and, in step S313, only the re-encoding process is continued by which the image data already encoded by the encoder 102 up to the point is reduced to a predetermined encoded data amount. Encoded data of whole one-page image data cannot be collected on the first memory unless the re-encoding process is entirely completed and the subsequent transfer process is completed too. Hence, the re-encoding process and the following transfer process must be continued even after inputting of one-page image data is completed. In this case, if it is detected in step S315 that the re-encoding process is entirely complete, encoded data stored only in the second memory 106 during the encoding.re-encoding phase is transferred to the first memory (step S317). After that, the completion of inputting of one-page image data is detected in step S805, and the flow advances to step S807.

The foregoing is the operation and is also the explanation of the operation shown in FIG. 8.

<Modification of Memory Storage Method>

Figure 9:
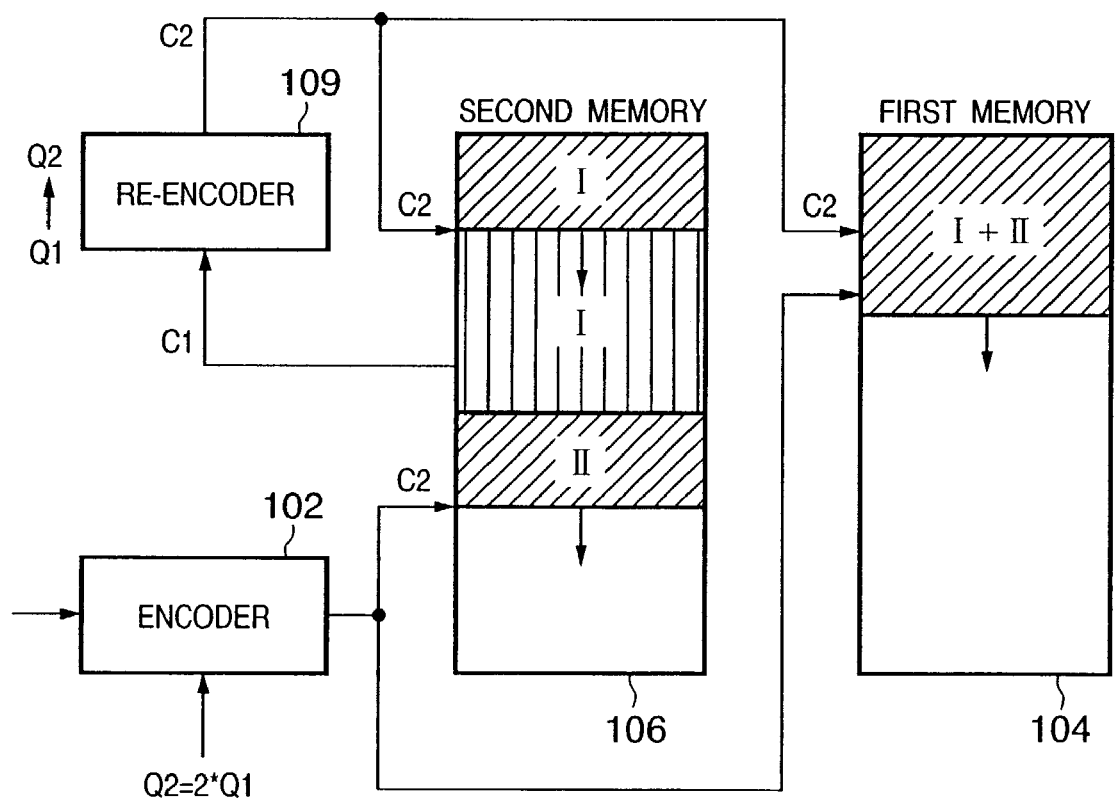
FIG. 9 is a view showing a data flow and memory contents in an encoding.re-encoding phase in a modification of the configuration shown in FIG. 1.
Figure 10:
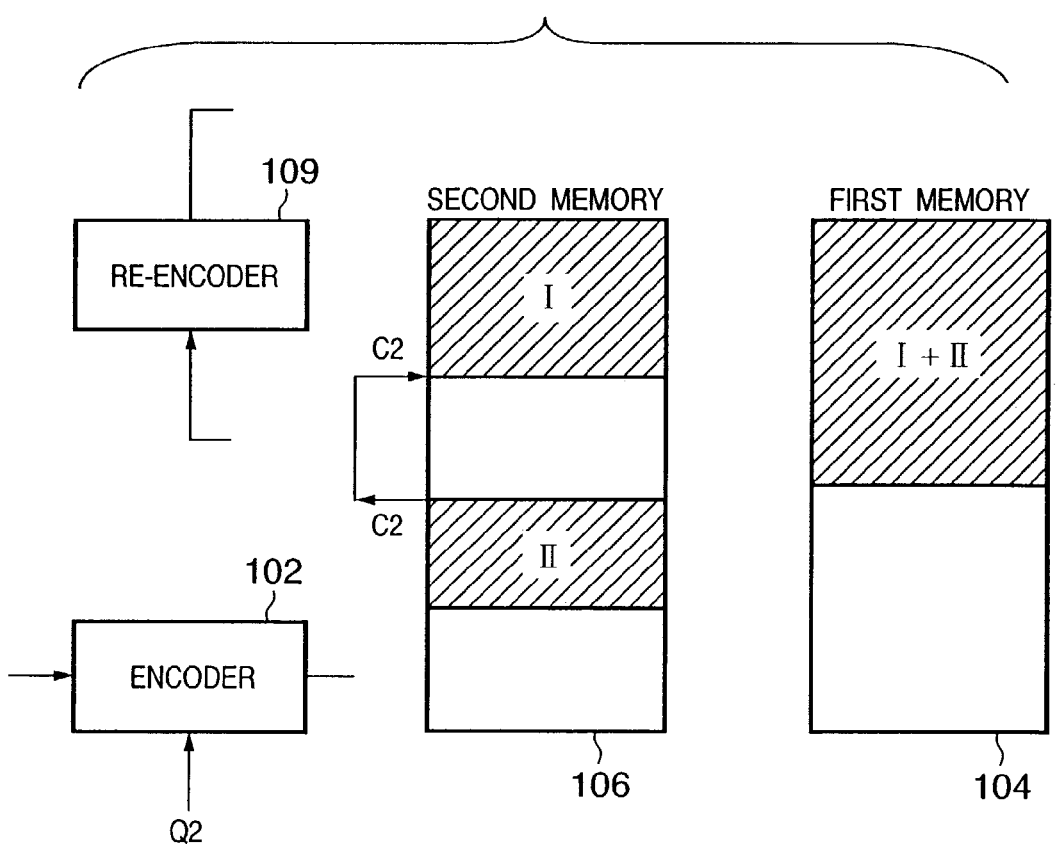
FIG. 10 is a view showing a data flow and memory contents in a transfer phase in the modification shown in FIG. 9.

FIGS. 9 and 10 are views showing a modification of the memory storage method shown in the conceptual views of FIGS. 5 and 6.

In the conceptual view of FIG. 5, in the encoding.re-encoding phase the output encoded data from the encoder 102 is stored only in the second memory 106. However, as shown in FIG. 9, the encoded data output from the encoder 102 during the encoding.re-encoding phase is stored directly in both the first and second memories.

From the viewpoint of the encoder 102, data encoded and output in any phase is stored in the two memories. Also, unlike in the conceptual view of FIG. 6, no data transfer between the memories is necessary in the transfer phase as shown in FIG. 10. In this modification, in the encoding.re-encoding phase the encoded data and re-encoded data are sequentially stored in order of transfer to the first memory 104. This poses the problem that two types of data are mixed.

In this modification, therefore, encoded data is divided in certain units and managed as files or packets. More specifically, a file management table or packet management table is separately formed and managed.

As one method, when data from the encoder 102 is stored in the first memory 104, the image data is assigned management numbers from its leading position for every appropriate unit (e.g., for every data of 8×i (i=integer of 1, 2, . . . ) lines since the unit of orthogonal transform is a block of 8×8), and a management table is formed in which the storage start addresses and encoded data amounts of encoded data corresponding to these management numbers can be stored in numerical order.

The encoder 102 and re-encoder 109 hold the management number of data being processed and, on the basis of this management number, write the start address and encoded data amount in the management table when the encoded data is stored. Even when encoded data processed by the encoder 102 and re-encoder 109 are randomly stored, these encoded data can be read out in turn from the leading position of the image by accessing the management table in order of management number and reading out the encoded data from the first memory 104 on the basis of the start addresses to be read out and encoded data amounts. With this management mechanism, data which continues on an image need not be continuously stored on the memory any longer.

Figure 11:
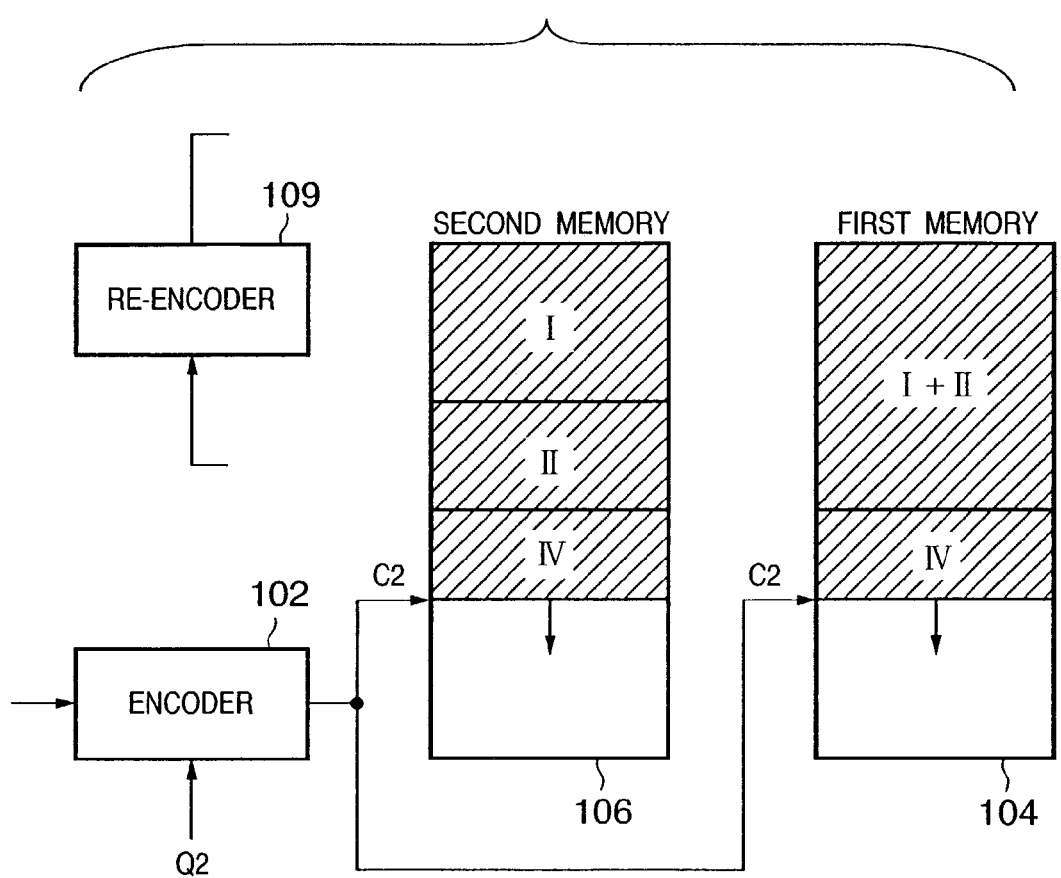
FIG. 11 is a view showing a data flow and memory contents in an encoding phase after the transfer phase in the modification shown in FIG. 9.

The encoding phase after the transfer phase in the conceptual view of FIG. 10 is substantially the same as the two encoding phases (FIGS. 4 and 7) explained so far, except that the way codes are stored in the first memory is slightly different as shown in FIG. 11. Therefore, the previous explanation and this modification are the same in that the processing is performed by repeating the three phases.

SECOND EXAMPLE

The second example (the configuration explained above will be referred to as the first example) for performing encoding characterizing the present invention will be described below with reference to FIG. 2.

Figure 2:
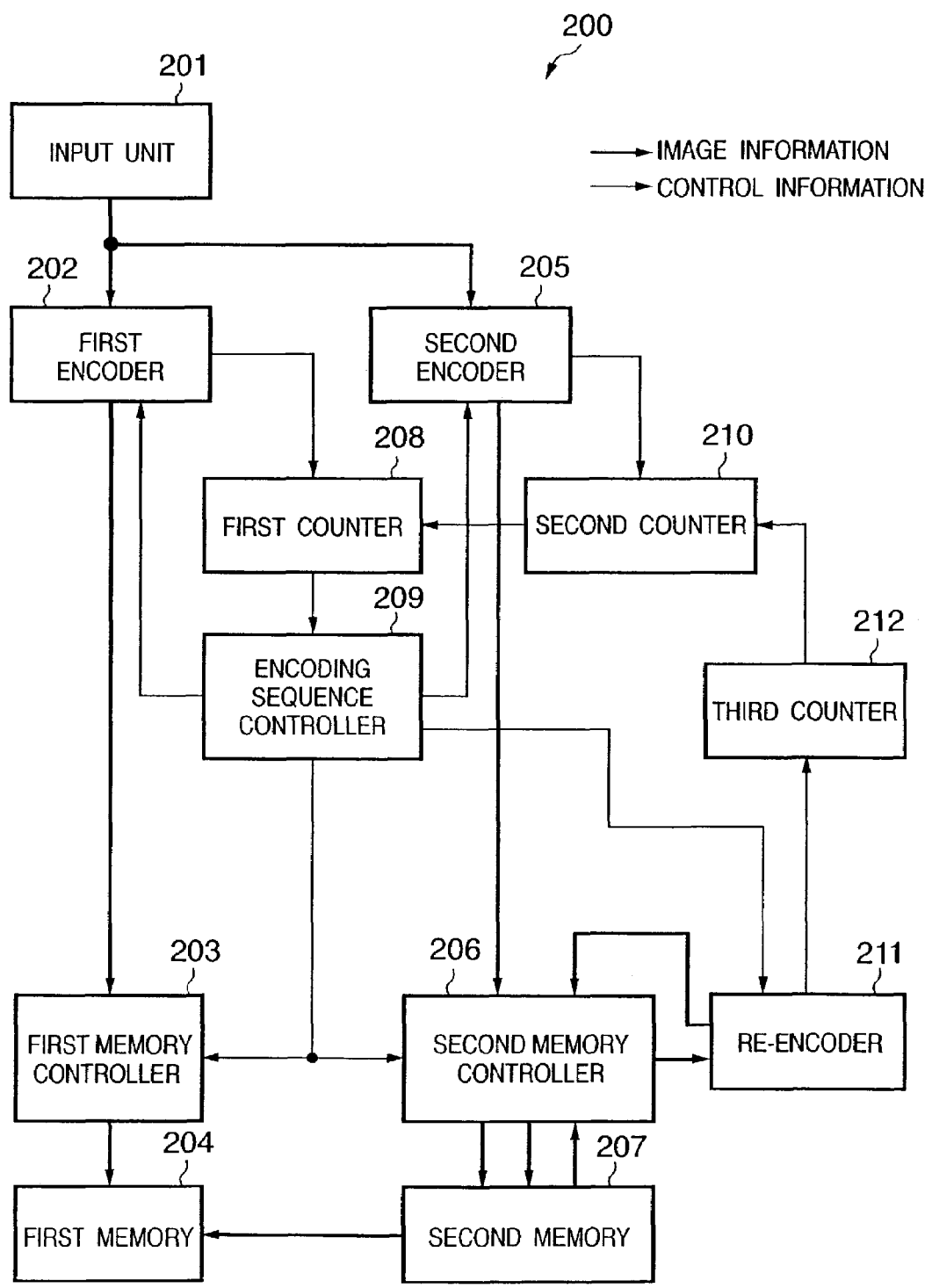
FIG. 2 is a block diagram showing the configuration of an image processing apparatus according to the second example.

FIG. 2 is a block diagram of an image processing apparatus 200 according to the second example.

A large difference from the image processing apparatus 100 of the first example shown in FIG. 1 is that two parallel encoders perform initial encoding. In this image processing apparatus 200, first and second encoders 202 and 205 encode input image data from an input unit 201 in parallel, thereby generating two types of encoded data different in compression ratio. Even in the second example, a well-known JPEG coding system is used as the encoding system, and image data corresponding to a block of 8×8 pixels is orthogonally transformed, quantized using a quantization step (to be described later), and Huffman-coded.

In this example, an operation in which the compression ratio of the second encoder 205 is set to be higher than that of the first encoder 202 will be explained. More specifically, a quantization parameter in the first encoder 202 is Q1, and a quantization parameter in the second encoder 205 is Q2 (the quantization step Q2 is larger than the quantization step Q1).

The output encoded data from the encoder 202 is stored in a first memory 204 via a first memory controller 203. A first counter 208 counts the data amount of this output encoded data from the encoder 202, holds the count value, and also outputs the count value to an encoding sequence controller 209.

On the other hand, the data encoded by the encoder 205 is stored in a second memory 207 via a second memory controller 206. A second counter 210 counts the data amount of this output encoded data from the encoder 205, and holds the count value. Furthermore, when the encoded data stored in the second memory 207 is transferred to the first memory 204 (this will be described later), the count value of the second counter 210 is transferred to the first counter 208.

If the count value has reached a certain set value while the first counter 208 is counting the data amount of the output encoded data from the encoder 202, as in the first example, the encoding sequence controller 209 outputs a control signal to the memory controller 203 to discard the data stored in the first memory 204.

The encoding sequence controller 209 then outputs control signals to the memory controllers 206 and 203 to read out the encoded data stored in the second memory 207, transfer the readout data to the first memory 204, and store the data in the first memory 204. As a consequence, the count value of the second counter 210 is transferred to the first counter 208 and loaded (overwritten) as the count value of this first counter 208.

In short, the count value of the second counter 210 represents the data amount of the encoded data stored in the second memory 207. So, the count value and encoded data corresponding to the count value are regarded as being directly copied to the first counter and first memory, respectively.

Furthermore, the encoding sequence controller 209 outputs control signals to the second encoder 205 to encode data such that the encoded data amount becomes smaller than before. On the other hand, setting for the first encoder 202 is changed such that it takes over the quantization step Q2 in the second encoder 205 immediately before the switching.

For example, the quantization step in the first encoder 202 is switched to a double value, and the second encoder 205 uses the larger quantization step Q3 to encode with a higher compression ratio preparing for the next overflow.

Encoded data output from the encoders 202 and 205 whose quantization steps are thus switched are stored in the corresponding memories 204 and 207 via the corresponding memory controllers 203 and 206, respectively.

Although the magnification ratio of the quantization step is doubled in this example, it can also be set to any arbitrary value. For example, for a color image, different quantization steps may be assigned to one luminance signal (luminance data) and two color difference signals (color difference data), which are generated upon color conversion, such that finer setting can be done by alternately doubling the quantization steps.

The encoding sequence controller 209 outputs a control signal to the memory controller 206 to read out the encoded data already stored in the second memory 207 and transfer the readout data to a re-encoder 211. The re-encoder 211 re-encodes the encoded data in the same manner as the re-encoder 109 shown in FIG. 1.

A third counter 212 counts the output data amount from the re-encoder 211. That is, this third counter 212 is reset immediately before the start of re-encoding and counts the output data amount during the re-encoding process. When this re-encoding process is complete, the counter 212 transfers the obtained count value to the second counter 210.

The second counter 210 adds the transferred data amount count value to the count value held in this second counter 210, thereby calculating the total data amount of the encoded data and re-encoded data stored in the memory 207 during the re-encoding process. That is, the data amount stored in the memory 207 matches the count value of the counter 210.

Regardless of whether the re-encoding process is/is not complete, the encoding process by the two encoders 202 and 205 is continued as long as image data to be encoded is input from the input unit 201. Whether the count value of the counter 208 has reached the certain set value is repetitively monitored until coding (encoding and re-encoding) of one-page image data input from the input unit 201 is completed. The encoding process and re-encoding process described above are executed under control corresponding to the detection result obtained.

The above operation will be briefly summarized. The second encoder 205 executes encoding at a compression ratio higher than that of the first encoder 202 by one step. When the code amount generated by the first encoder 202 has reached a set value, the quantization parameter of the first encoder 202 is set to be the same as that of the second encoder 205 immediately before. The quantization parameter of the second encoder 205 is set to obtain a higher compression ratio. Data in the first memory 204 is discarded. Data stored in the second memory 207 is transferred to the first memory 204. The value of the second counter 210 is written in the first counter 208. To re-encode the data in the second memory at a higher compression ratio, the same quantization parameter as that newly set for the second encoder 205 is set for the re-encoder 211. As a result, encoded data that is equivalent to that compressed using the newly set quantization parameter from the top of the page is stored in the second memory 207.

Figure 12:
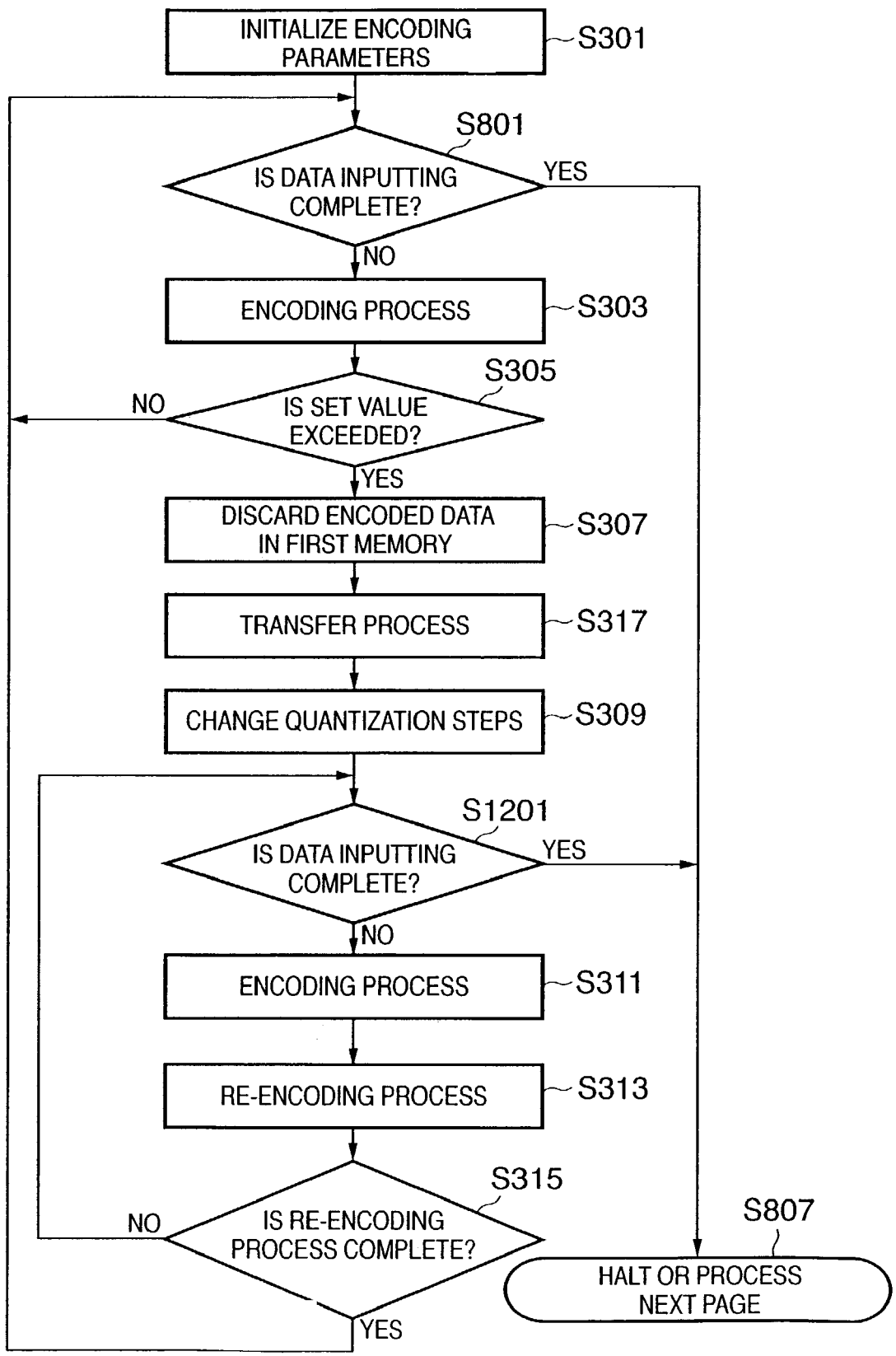
FIG. 12 is a flow chart showing a procedure in the configuration shown in FIG. 2.

When two encoders are used as explained in FIG. 2, one-page image data is encoded on the basis of the flow chart shown in FIG. 12. Note that the explanation of FIG. 12 is generally analogous to FIG. 8 which is a flow chart when one encoder is used, so those skilled in the art can well understand the characteristic of this second example from the above explanation. Therefore, the processing will be described by three phases as when one encoder is used, and differences from FIG. 8 will be principally explained.

The biggest difference between the above-mentioned flow shown in FIG. 8 and the flow of this example is that the transfer process in step S317 is inserted between steps S307 and S309. In other words, the encoding.re-encoding phase and transfer phase are switched (except for the encoded data discarding process in step S307).

In encoding parameter initialization in step S301, the quantization parameter Q1 is set in the first encoder 202, and the quantization parameter Q2 is set in the second encoder 205. The quantization step represented by the quantization parameter Q2 is larger than that of Q1.

Figure 13:
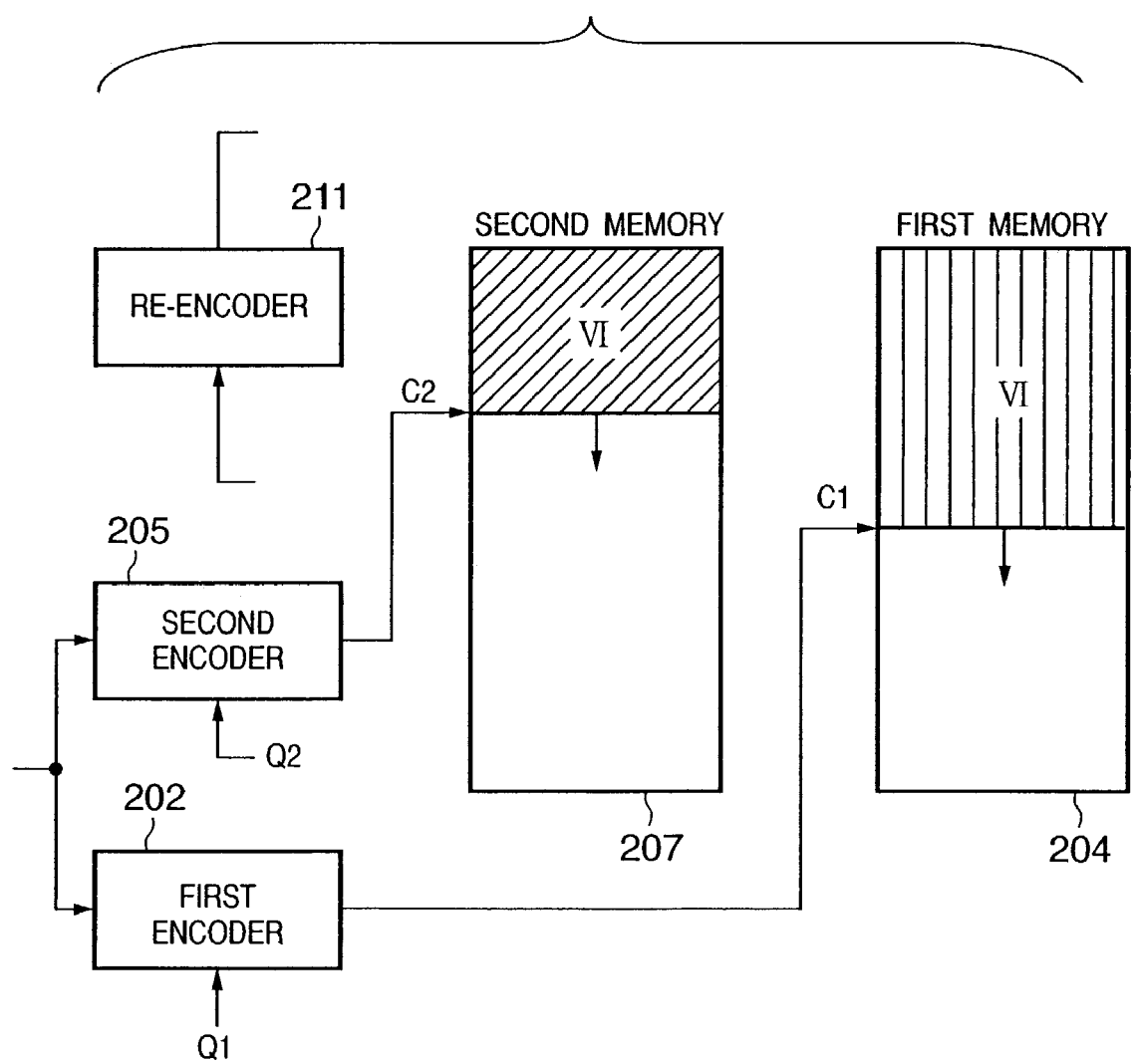
FIG. 13 is a view showing a data flow and memory contents in an encoding phase in the initial state in the configuration shown in FIG. 2.

In the encoding phase, steps S801, S303, and S305 are repetitively executed. Steps S801 and S305 are the same processes as when one encoder is used. Only the encoding process in step S303 is different as shown in FIG. 13.

To gradually raise the compression ratio of encoded data to be stored in the first memory 204, data encoded by the quantization parameter Q1 having the lowest compression ratio is stored first, and data encoded by the quantization parameter Q2 is stored in the second memory.

Figure 14:
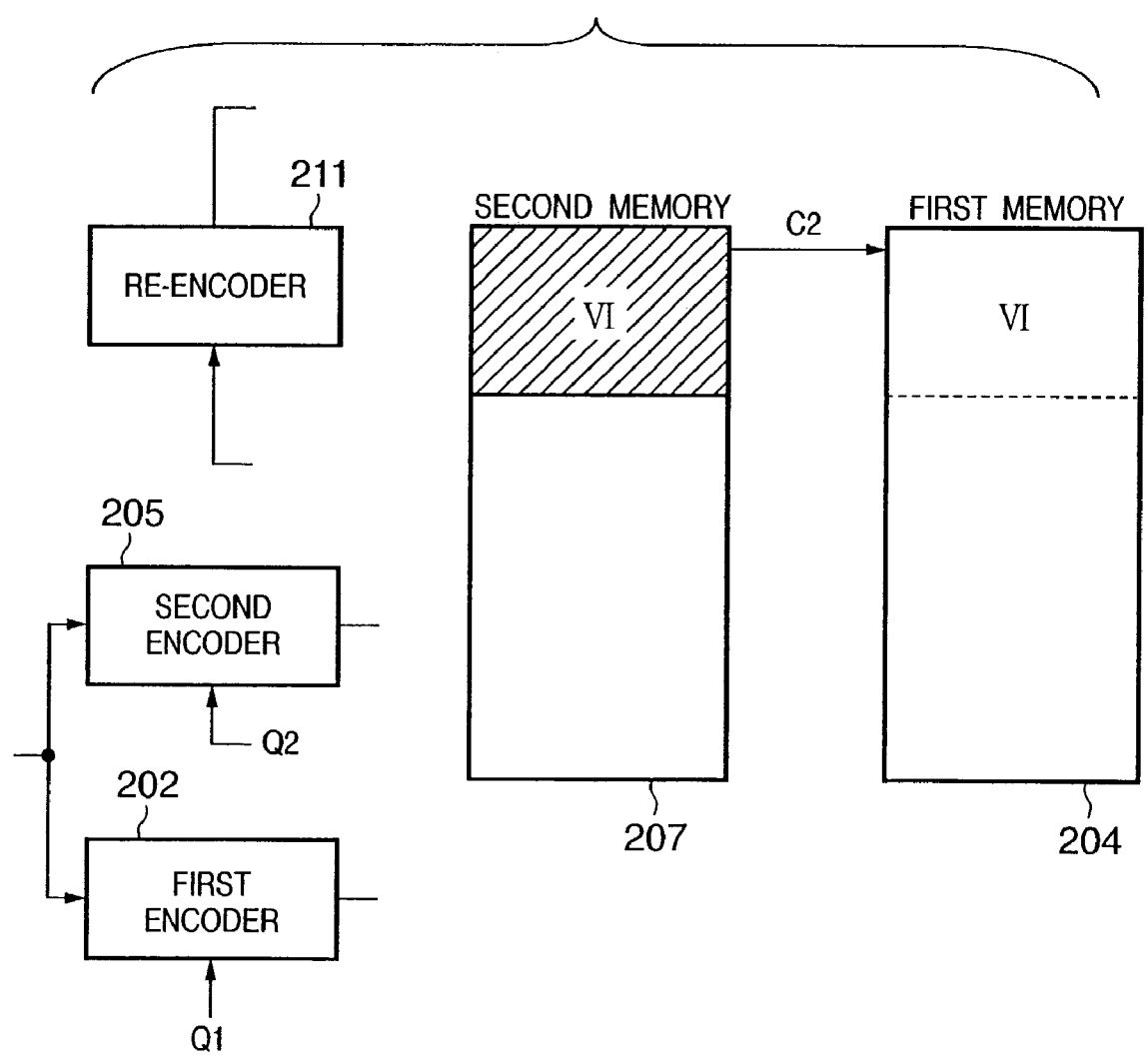
FIG. 14 is a view showing a data flow and memory contents in a transfer phase in the configuration shown FIG. 2.

If the data amount being stored in the first memory 204 exceeds a set upper limit (step S305), the encoded data held in this first memory 204 is immediately discarded (step S307), and the encoded data with the high compression ratio held in the second memory 207 is transferred to the first memory 204 (step S317 in FIG. 14). Consequently, encoded data as a second appropriate candidate which does not exceed the upper limit can be immediately stored in the first memory 204 before the completion of the first re-encoding process explained in the first example. This is the greatest advantage which the application of FIG. 2 using the two encoders has over FIG. 1.

In this second example, it is considered useless to have encoded data with the same compression ratio in the two memories 204 and 207. Therefore, the second memory 207 stores encoded data having a compression ratio higher than that of encoded data stored in the first memory 204. Accordingly, the subsequent processing is performed on the basis of this consideration. That is, after the process (transfer phase) of transferring the encoded data in the second memory 207 to the first memory 204 is completed, the encoded data in the second memory 207 is re-encoded so as to hold encoded data having a compression ratio higher by one step.

Figure 15:
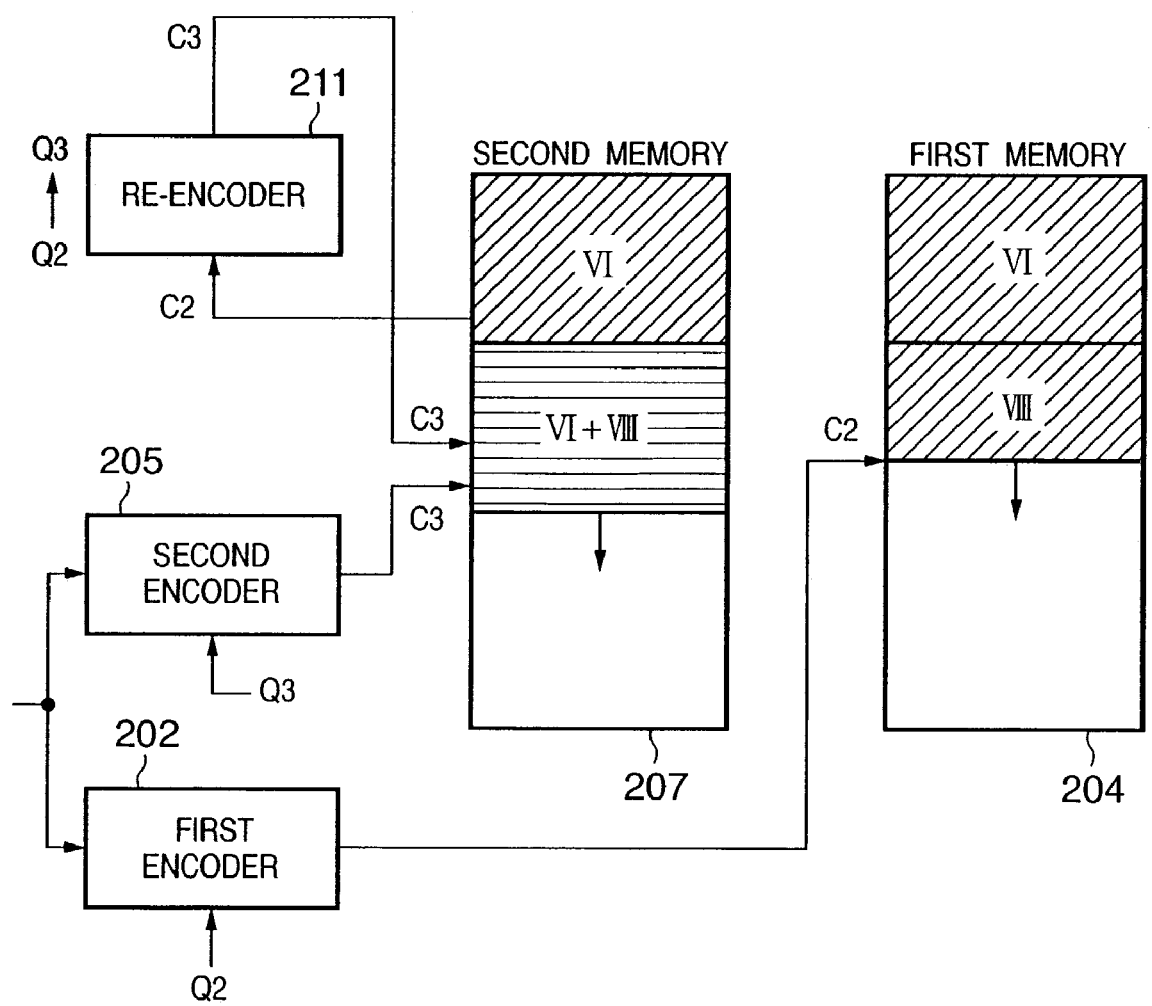
FIG. 15 is a view showing a data flow and memory contents in an encoding.re-encoding phase in the configuration shown FIG. 2.

More specifically, as shown in FIG. 15, in the encoding.re-encoding phase following the transfer phase, the quantization parameters Q1 and Q2 applied to the two encoders 202 and 205 are changed to Q2 and Q3, respectively, before re-encoding described above is performed (step S309). If inputting of one-page image data is not complete (step S803), subsequent input image data is encoded by the two encoders for which the new quantization steps are set (step S311), and stored in the corresponding memories 204 and 207. In parallel with this encoding process, the encoded data (transferred to the first memory 204) stored in the second memory is re-encoded by the re-encoder 211 to obtain data encoded by using the quantization parameter Q3 (S313), so that this encoded data is changed to encoded data having the compression ratio higher by one step than the encoded data in the first memory. The re-encoded data is stored in the second memory 207.

As in the first example, this re-encoding process is realized by performing bit shifting for quantization values after encoded data is once Huffman-decoded, such that the same results as when these values are divided by $2^n$ are obtained, and performing Huffman coding again. This method can perform a high-speed re-encoding process since quantization steps are changed only by bit shifting and neither inverse orthogonal transform nor re-orthogonal transform is performed.

When two encoders are used as in this second example, as shown in FIG. 15, both encoded data and re-encoded data are mixedly stored in the second memory 207. As described previously, therefore, encoded data in this second memory 207 must also be divided in certain units and managed as files or packets. For this purpose, the same arrangement as in the modification of the first embodiment can be used.

Figure 16:
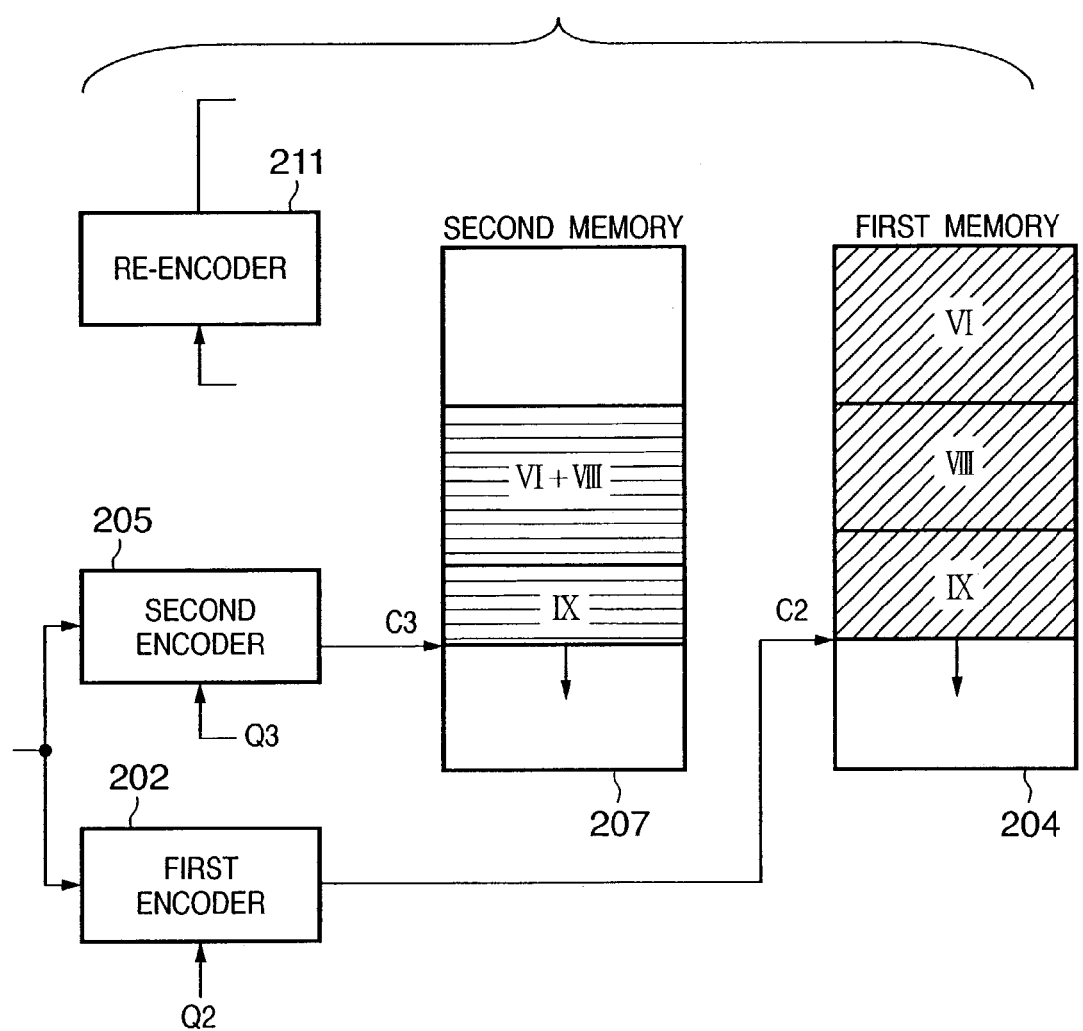
FIG. 16 is a view showing a data flow and memory contents in an encoding phase after the encoding.re-encoding phase in the configuration shown FIG. 2.

Referring to FIG. 12, if the completion of the re-encoding process is detected in step S315, the flow proceeds to the encoding phase (steps S801 and S303). In this encoding phase after the encoding.re-encoding phase, as shown in FIG. 16, the encoded data held in the two memories 204 and 207 are different not only in compression ratio but also in way (address) these encoded data are mixed. Accordingly, if the data amount in the first memory 204 exceeds the set value again, the encoded data (codes of a lateral-stripe region VI+VIII) held in the second memory 207 must be transferred to the first memory 204. When these are taken into consideration, encoded data must be managed as files or packets in the first memory 204, as well as in the second memory 207. Hence, the first memory 204 also requires a managing mechanism using the management table described earlier.

The state of the encoding phase shown in FIG. 16 is the same as the initial state encoding phase (FIG. 13) except that the quantization parameters and the way the encoded data are mixed before re-encoding are different from those after re-encoding. Accordingly, by repeating the encoding phase, transfer phase, and encoding.re-encoding phase, encoded data obtained by compressing one-page image data to the set upper limit or smaller can be reliably stored in the first memory 204.

Note that the positions of the transfer phase and encoding.re-encoding phase are switched from those in the first example. Therefore, the timing at which the completion of inputting of one-page image data is detected after the transfer process in FIG. 8 (step S805) is substantially the same as the timing at which the completion of inputting of one-page image data is detected in the encoding.re-encoding phase (step S803). Also, these two detection processes are the same in function as step S805, and the same in timing as step S803. Accordingly, these two steps are integrated as a step of detecting the completion of inputting of new one-page image data, and are represented as step S1201.

In the above first and second examples, the first and second memories are explained as physically different memories. This is because accesses to independent memories are more advantageous. However, the present invention also includes a case in which the first and second memories are not physically different memories. That is, on a physically single memory, two areas corresponding to the first and second memories are secured. When the explanation so far is reread by rephrasing the first and second memories with first and second memory areas, respectively, it will be understood that the present invention can also be realized with a single memory.

When each of the above examples is to be implemented by a single memory, some data transfer processes explained in the transfer phase are unnecessary. The details will be omitted because each case is readily imaginable. When the two memory areas are to be used as they are strictly separated, it is necessary to perform the same data transfer as when two physically different memories are used. However, if the same data is shared by these two areas, it is possible not only to make the data transfer process unnecessary but also to reduce the storage capacity.

For example, when encoded data held in the second memory area is to be transferred to the first memory area, two pieces of information, i.e., the start address in which the encoded data is stored and the data size need only be transferred from the second memory controller to the first memory controller. This achieves the same effect as when the encoded data is transferred.

When the encoded data is stored in the form of a file or packet, the amount of information transferred between the memory controllers slightly increases, so management table information related to the encoded data must be transferred. Still, the efficiency is higher than that when the encoded data is transferred.

THIRD EXAMPLE

Figure 17:
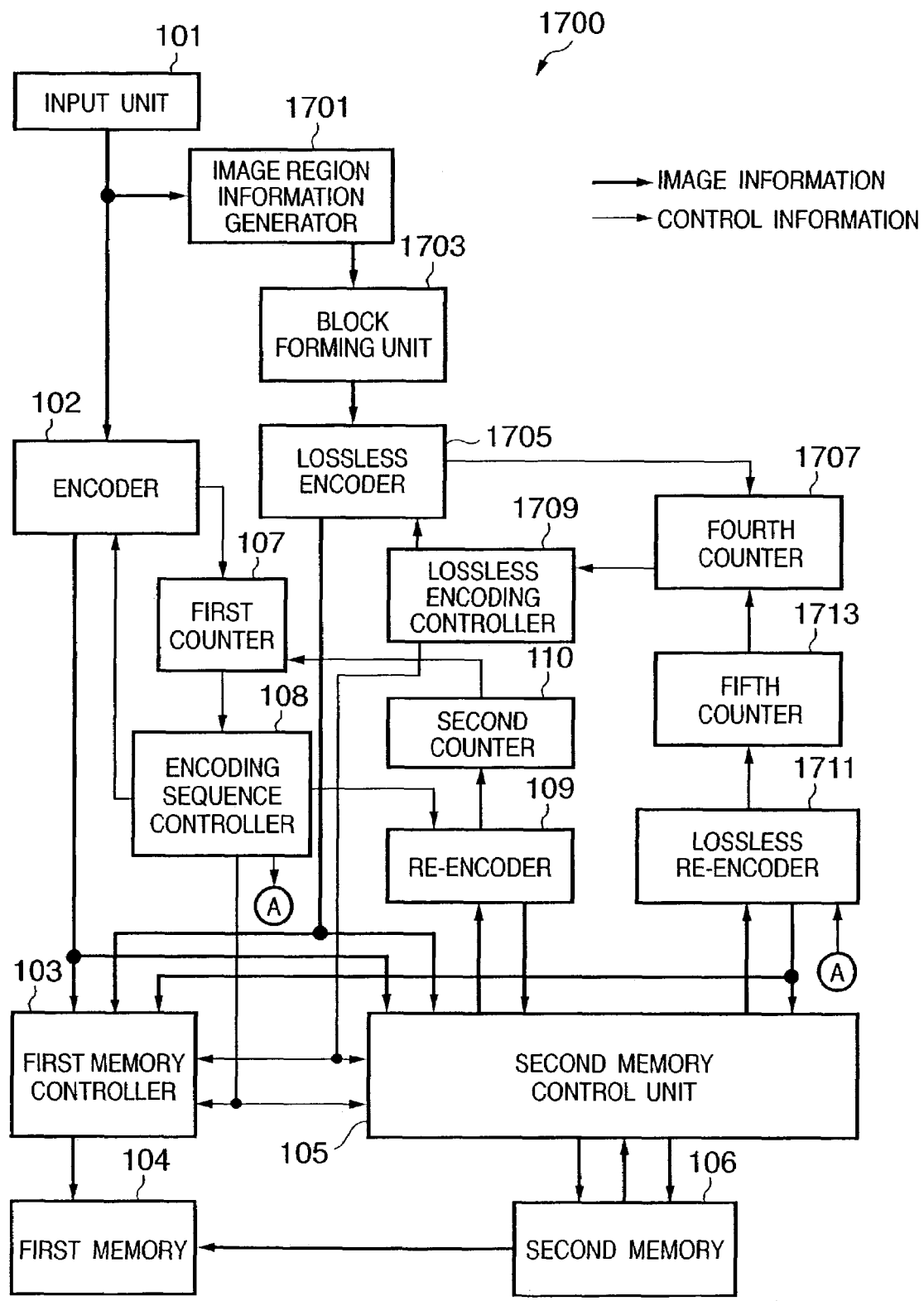
FIG. 17 is a block diagram showing the configuration of an image processing apparatus according to the third example.

Example in Which Image Region Information Compression Function is Added to First Example In the first and second examples, image data is encoded by the JPEG scheme, and only JPEG codes are stored. FIG. 17 shows the configuration of an image processing apparatus which also executes lossless encoding of image region information in parallel to JPEG encoding and stores lossless codes, too. FIG. 17 shows a configuration obtained by adding an image region information processing system to the basic configuration shown in FIG. 1. This will be described below. The same reference numerals as in FIG. 1 denote the same functional blocks in FIG. 17, and a description thereof will be omitted.

Image data input from an image scanner or page description language rendering through an input unit 101 repeatedly undergoes encoding and re-encoding processes on the basis of the already described processing method so that the encoded data obtains a code amount that falls within a set range.

The image data is also sent to an image region information generator 1701 to generate the above-described image region information. For a scanner input image, image region information is generated on the basis of only the image data. However, for an image obtained by bitmapping and rendering a page description language (PDL), image region information is generated also by referring to the PDL information. Image region information may also be generated by an image input device such as a scanner. In this case, the image region information is also input through the input unit 101 and sent to the next unit through the image region information generator 1701.

In this example, for the descriptive convenience, image region information is assumed to contain a total of 2 bits for each pixel, i.e., 1 bit that discriminates between a chromatic color and an achromatic color and 1 bit that discriminates between a character line image and a halftone image. For discrimination between a chromatic color and an achromatic color in input image data that has the RGB format, when the values of the respective color components almost equal to each other, the color is determined as achromatic. Otherwise, the color is determined as chromatic. When the density (or luminance) of a pixel of interest steeply changes with respect to an adjacent pixel (changes more than a preset threshold value), it is determined as the edge of a character line image. If the change is moderate, it is determined as a halftone image. Image region information can take four binary data values 00, 01, 10, and 11 (0 to 3 in decimal notation).

A block forming unit 1703 puts the pieces of generated image region information into a block having the same size (8×8 pixels as in the first example) as that of the data to be encoded together by an encoder 102.

Multilevel compression like JPEG that is to be used to compress image data is inefficient and lossy upon compression of image region information that is a set of binary data. To compress image region information, lossless compression such as JBIG or run-length encoding such as PackBits is used. A lossless encoder 1705 executes lossless encoding of the image region information.

The encoded image region information is stored in a first memory 104 through a first memory controller 103. The same data is stored in a second memory 106 through a second memory controller 105. Simultaneously, the code amount output from the lossless encoder is counted by a fourth counter 1707. The count value is sent to a lossless encoding controller 1709.

A target value is set for the register in the lossless encoding controller 1709. When the code amount exceeds the target value, a control signal is output to the first memory controller 103 to discard the encoded data (the encoded data of the image region information) stored in the first memory 104. The way the data is discarded is the same as the method of discarding the encoded data of the image data. Subsequently, the lossless encoding controller 1709 outputs a control signal to the second memory controller 105 to read out the encoded image region data from the second memory 106 and send the readout data to a lossless re-encoder 1711.

That is, like the encoder 102 or a re-encoder 109 which executes a compression process in accordance with instruction information (compression parameter) from an encoding sequence controller 108, the lossless encoder 1705 and lossless re-encoder 1711 also compress the image region information in accordance with a compression parameter (a parameter that determines the compression ratio) from the lossless encoding controller 1709.

Upon receiving encoded data, the lossless re-encoder 1711 decodes it, discards some of a plurality of attribute flag data or replaces them with fixed values, and then executes lossless encoding again. As will be described later, even when some of the attribute flags are replaced with fixed values, the data amount after run-length encoding decreases because the information entropy decreases. The attribute data after re-encoding is stored in the second memory 106 again and also in the first memory 104. The code amount after re-encoding is count by a fifth counter 1713.

On the other hand, the lossless encoding controller 1709 sends a control signal to an image region information converter prepared in the lossless encoder 1705 to discard some of the attribute flags or replace them with fixed values such that attribute flag data having the same information entropy as that of the attribute flag data whose information amount is reduced by the lossless re-encoder 1711, thereby continuing the encoding process. The encoded data is stored in only the second memory. At the same time, the lossless encoding controller 1709 also sends a control signal to the fourth counter 1707 to reset the counted and held value and newly count the code amount generated by encoding after the contents of image region information conversion are changed.

When there is no more encoded data of the image region information, which is to be re-encoded, the encoded data stored in only the second memory is transferred to and stored in the first memory. Simultaneously, the count value of the fifth counter 1713 is transferred to the fourth counter 1707 and added. With this operation, the counter 1711 counts the total code amount of losslessly encoded data after the contents of image region information conversion are changed. The encoded data corresponding to the count value is stored in each of the first and second memories. This state is almost the same as the initial state wherein only lossless encoding is being executed. From this point, the encoded data output from the lossless encoder 1705 is stored on both the first memory and the second memory so that the initial state wherein only lossless encoding is being executed is restored, and the code amount is monitored continuously.

Every time the count value of the fourth counter exceeds the target value set for the register in the encoding controller 1709, the number of attribute flags to be discarded or replaced with fixed values is increased. With this processing, the code amount of image region data can be decreased stepwise, and the code amount of the image region data can be decreased to the target value or less.

Figure 18:
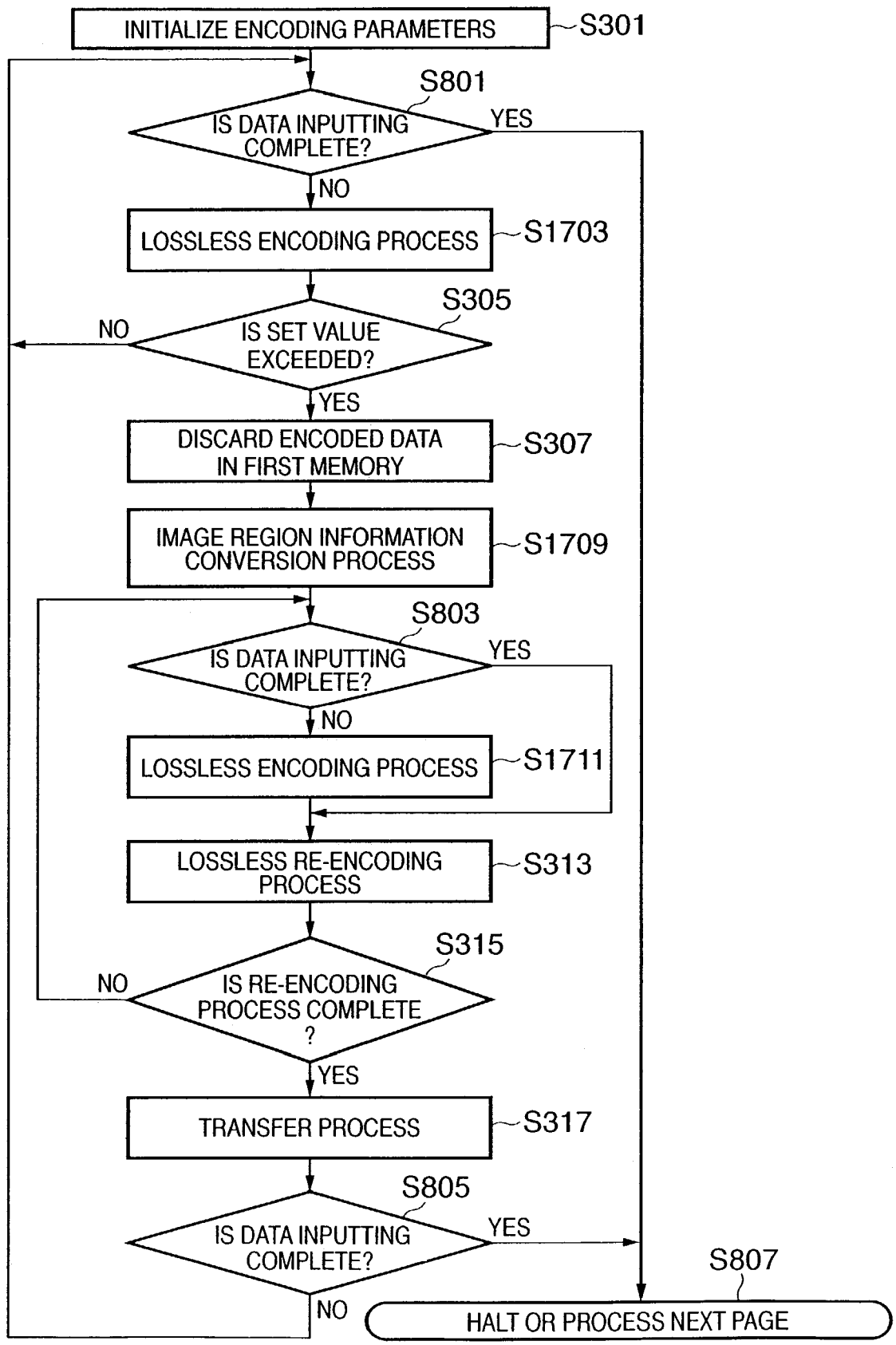
FIG. 18 is a flow chart showing a processing procedure according to the third example.

FIG. 18 is a flow chart showing the process contents of the image processing apparatus shown in FIG. 17. A description will be done with reference to this flow chart. The processing by the image processing apparatus is basically the same as the image data code amount control method in the configuration shown in FIG. 1, as described above. Only the contents of individual processes are slightly different, and the differences will be listed below.

(1) Encoding process→lossless encoding process
(2) Change of quantization step→change of image region information conversion process
(3) Re-encoding process→lossless encoding.re-encoding process The flow chart shown in FIG. 18 corresponds to the flow chart shown in FIG. 8 on which the differences in processing are reflected. The processes in steps S303, S309, S311, and S313 in FIG. 8 are replaced with the processes in steps S1703, S1709, S1711, and S1713 in FIG. 18. In initially setting an encoding parameter, the upper limit value of the losslessly encoded data amount determined by the image size is set for the register in the lossless encoding controller, and the contents of the image region information conversion process are set to the initial state. The remaining processes are the same as in the flow chart shown in FIG. 8.

Next, detailed process contents when 6-bit data "000000" is added to the image region information that contains 2 bits per pixel to form 8-bit data (this is because a computer generally has a high processing efficiency for 8-bit data), and Packbits encoding is then performed as lossless encoding will be described with reference to FIGS. 19A to 19E.

In the 8-bit data before the Packbits encoding, all the six upper bits are 0, as shown in FIG. 19A. The upper-side bit of the lower two bits has flag data representing whether the corresponding pixel data is a character portion, and the lower-side bit has flag data representing whether the pixel data has a chromatic color. Hence, the 8-bit data can take a value from 0 to 3. The characteristic of an image region is determined depending on whether each bit is 0 or 1 and has a nature as a flag. For this reason, image region information will be referred to as an image region flag or image region flag data hereinafter.

Assume that the 8-bit data is output from the image region information generator 1701 for each pixel. As detailed output data, data shown in FIG. 19B will be examined.

When this data is encoded by Packbits encoding, it is compressed to data shown in FIG. 19C. In the compressed data, a negative value represents the number of continuous data, and a positive value represents the number of discontinuous data. These data are called length information. It can be discriminated on the basis of the sign binary digit of the length information whether subsequent data is consecutive or discontinuous data. The compressed data is 8-bit (1-byte) data, as in FIG. 19B. The maximum value that can be represented by the 1-byte length information is 128 that is almost ½ of 255. If the length information has a smaller value, the data can be encoded as a set of length information and subsequent image region flag data. If the value of the length information exceeds the maximum value, the data is divisionally encoded as a plurality of sets of length information+image region flag data.

The compressed data shown in FIG. 19C will be examined in more detail. The first length information "−4" has a negative value and therefore represents the number of continuous data, i.e., that four image region flag data "1" immediately follow the length information.

The next data "4" also represents length information. The length information has a positive value and therefore represents that discontinuous data follow. Four data "2, 3, 2, 3" following "4" represent discontinuous data. In FIG. 19C, only the pieces of positive length information are underlined to make it easy to discriminate between length information and image region flag data.

Continuous data length information "−5" next to the above discontinuous data represents that five image region flag data "2" immediately follow the length information. The next underlined data "3" is discontinuous data length information. It represents that the following three data "1, 0, 1" are image region flag data. The next "−6, 0" represents that six image region flag data "0" follow.

What should take place when the compressed data is re-encoded by the lossless re-encoder 1711 (this processing is executed when the code amount has reached the set target value) will be described with reference to FIGS. 19D and 19E. In this example, all the chromatic/achromatic color flags are set to "1" to represents a chromatic color in the re-encoding process.

The encoded image region data is temporarily decoded and returned to the data shown in FIG. 19B. After that, the flag data are replaced to convert the data into the data shown in FIG. 19D. When the converted data is encoded by Packbits encoding again, the encoded data shown in FIG. 19E is obtained. As is apparent from FIGS. 19A to 19E, the code amount of the 15-byte encoded data before re-encoding decreases to 6 bytes after re-encoding.

Assume that the above-described re-encoding process is executed, and nevertheless, the count value of the total code amount exceeds the target value set for the register in the encoding controller again. In such a case, when the re-encoding process has been completed, the next re-encoding process is immediately started. If the re-encoding process has not been completed, the re-encoding process is ended, and the next re-encoding process is immediately started.

In the new re-encoding process, the remaining 1-bit image region flag is also replaced with "1" (this represents halftone). With this operation, all the image region flag data (8-bit) have a value "3". Letting N be the number of bytes of data, the data amount after encoding is approximately given by $(2N/128)+2$ bytes.

This is because every time the number of continuous data exceeds 128, a new set of 2-byte encoded data (length information and continuous data) is added.

The Packbits encoding circuit, decoding circuit, and data conversion circuit are known techniques, and a description of the individual circuit arrangements will be omitted.

In the above description, the image region flag of each pixel has two bits, for descriptive simplicity. However, some other pieces of information can also be used as image region flags. In the above re-encoding process, 2-bit image region flag data can be re-encoded twice at maximum. Four-bit image region flag data can be re-encoded four times at maximum. As the number of bits of an image region flag increases, the number of times of re-encoding processes can be increased. Hence, the code amount can be controlled by multiple steps.

When a method of degenerating the number of states is used, the code amount can be controlled by a larger number of steps. For example, a 2-bit image region flag can represent four states. The number of states is degenerated to three states by the first re-encoding process and then to two states by the second re-encoding process. With this process, the information entropy before encoding is gradually decreased to decrease the data amount (code amount) after encoding by fine steps.

When the above-described process for replacing every bit of flag data with a fixed value is expressed using the term "the number of states", the number of states is halved every time image region flag data is re-encoded.

The code amount can be more finely decreased by decreasing the number of states one by one than by halving the number of states by one re-encoding process.

FIGS. 20B to 20E show a process result when the number of states is reduced one by one. This will be described. FIG. 20A shows data wherein all the four states each represented by two bits are present, like the image region flag data shown in FIG. 19B. The four states will be listed below again.

(1) Character portion of chromatic color (corresponding to data "3")
(2) Character portion of achromatic color (corresponding to data "2")
(3) Non-character portion of chromatic color (corresponding to data "1"; also referred to as image portion of chromatic color)
(4) Non-character portion of achromatic color (corresponding to data "0"; also referred to as image portion of achromatic color)

In the first re-encoding process, two of the four states, i.e., (3) non-character portion of chromatic color and (4) non-character portion of achromatic color are combined and degenerated to one state (3') non-character portion. With this process, the following three states are obtained.
(1) Character portion of chromatic color
(2) Character portion of achromatic color
(3') Non-character portion More specifically, data "0" is replaced with "1" to degenerate the states. The data after the state degeneracy is shown in FIG. 20B. When this data is encoded by Packbits encoding, encoded data shown in FIG. 20C is obtained. As is apparent from FIG. 20C, the code amount is slightly smaller than that of the encoded data before re-encoding shown in FIG. 19C.

In the second re-encoding process, two states, i.e., (1) character portion of chromatic color and (2) character portion of achromatic color are combined and degenerated to one state (1') character portion. With this process, the following two states are obtained.
(1') Character portion
(3') Non-character portion Data "2" is replaced with "3" to degenerate the states. The data after the state degeneracy is shown in FIG. 20D. This data is the same as that shown in FIG. 19D. Encoded data shown in FIG. 20E, which is obtained by encoding the above data by Packbits encoding, is the same as the encoded data shown in FIG. 19E.

When the number of states is decreased one by one, the data amount of 15-byte data before re-encoding is decreased to 11 bytes by the first re-encoding and then to six bytes by the second re-encoding. In this way, the code amount can be decreased by fine steps, compressed data of an image region flag having an amount close to the target code amount can be obtained.

As described above, the lossless encoding process of image region flag data is controlled independently of the compression encoding process of image data so that the code amounts of the two compressed data are respectively decreased to target code amounts or less.

The two types of encoded data are multiplexed and output to an externally connected network device, image output device, or large-capacity storage device. In consideration of the multiplexing, the same encoding unit are applied to the two types of data. Encoded data generated by encoding one unit is managed/stored as one packet or file. In multiplexing the data, two types of packet data corresponding to the same image position are connected in the order of, e.g., image data and image region data to form one packet and output to the outside.

FOURTH EXAMPLE

Figure 21:
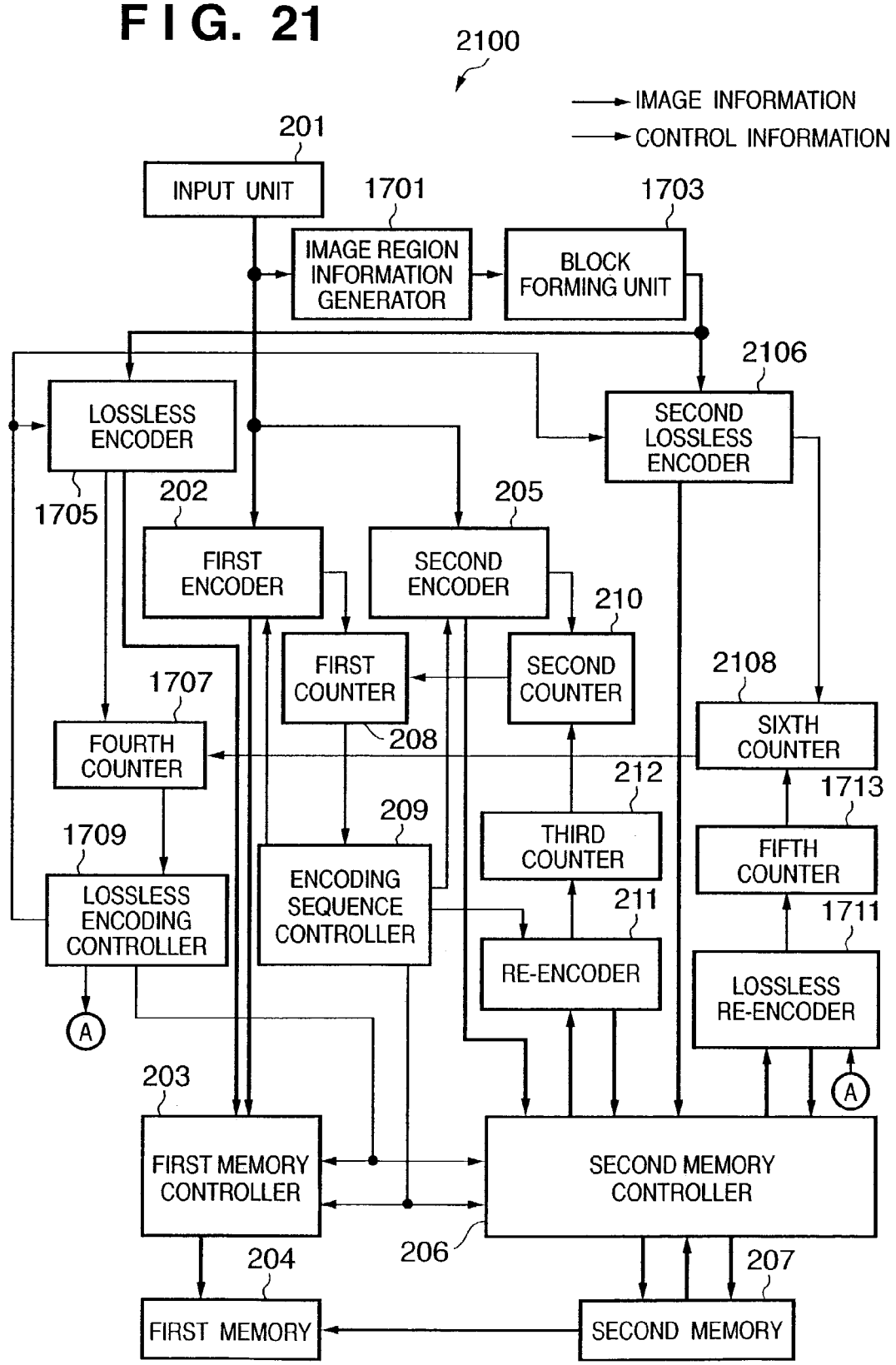
FIG. 21 is a block diagram showing the configuration of an image processing apparatus according to the fourth example.

Example in Which Image Region Information Compression Function is Added to Second Example An image processing apparatus shown in FIG. 21 executes lossless encoding of image region information in parallel to an image data encoding process and stores lossless codes, too, unlike the second example. FIG. 17 shows a configuration obtained by adding an image region information processing system to the basic configuration shown in FIG. 2. This will be described below. The same reference numerals as in FIGS. 2 and 17 denote the same functional blocks in FIG. 21, and a description thereof will be omitted.

In the image processing apparatus shown in FIG. 21, two types of image region information having different information entropies are losslessly encoded by two encoders, as in the image data compression encoding process in the configuration shown in FIG. 2. The two encoders are a first lossless encoder 1705 and second lossless encoder 2106. The second lossless encoder 2106 added here encodes image region information having a lower entropy than in the first lossless encoder.

Otherwise, only a sixth counter 2108 which counts the code amount output from the second lossless encoder 2106 is added.

Referring to FIG. 21, blocks that compression-encode image data and blocks that losslessly encode image region information have the following correlation.
(1) First and second encoders and first and second lossless encoders
(2) First, second, and third counters and fourth, fifth, and sixth counters
(3) Re-encoder and lossless re-encoder
(4) Encoding sequence controller and lossless encoding controller Image data is compression-encoded using the former blocks in each item, and image region information is losslessly encoded using the latter blocks. The two encoding processes are independently controlled in accordance with almost the same procedure, thereby compressing each data to a target code amount or less.

The code amount of image data is decreased stepwise by changing the quantization step. The code amount of losslessly encoded image region information is decreased by changing the number of states of flag data of the image region information before lossless encoding to decrease the entropy.

In the initial state, the first lossless encoder 1705 encodes all image region information of the respective pixels. However, the second lossless encoder 2106 decreases the number of states of flag data of the image region information by the above-described image region information conversion process and then executes lossless encoding.

When the code amount output from the first lossless encoder exceeds the target value (or has reached the target value), lossless codes stored in a first memory 104 are discarded. lossless codes stored in a second memory 106 are transferred to the first memory. The first lossless encoder takes over the image region information conversion process that has been executed by the second lossless encoder. The encoded data is stored next to the lossless codes transferred to the first memory.

The second lossless encoder executes an image region information conversion process to further decrease the number of states of flag data, and losslessly encodes the flag data. With this process, lossless codes whose code amount is smaller than that in the first lossless encoder are generated and stored in the second memory.

The lossless codes that are already encoded by the second lossless encoder and stored in the second memory, i.e., the lossless codes that are also transferred to the first memory are decoded by a lossless re-encoder 1711 and subjected to the image region information conversion process by the lossless re-encoder such that the number of states equals to that obtained by the image region information conversion process by the second lossless encoder. The lossless codes are losslessly encoded again and written back to the second memory. As described above, even in the configuration shown in FIG. 21, the code amount can be controlled by encoding image region information in accordance with the same procedure as in the image data compression encoding process.

Figure 22:
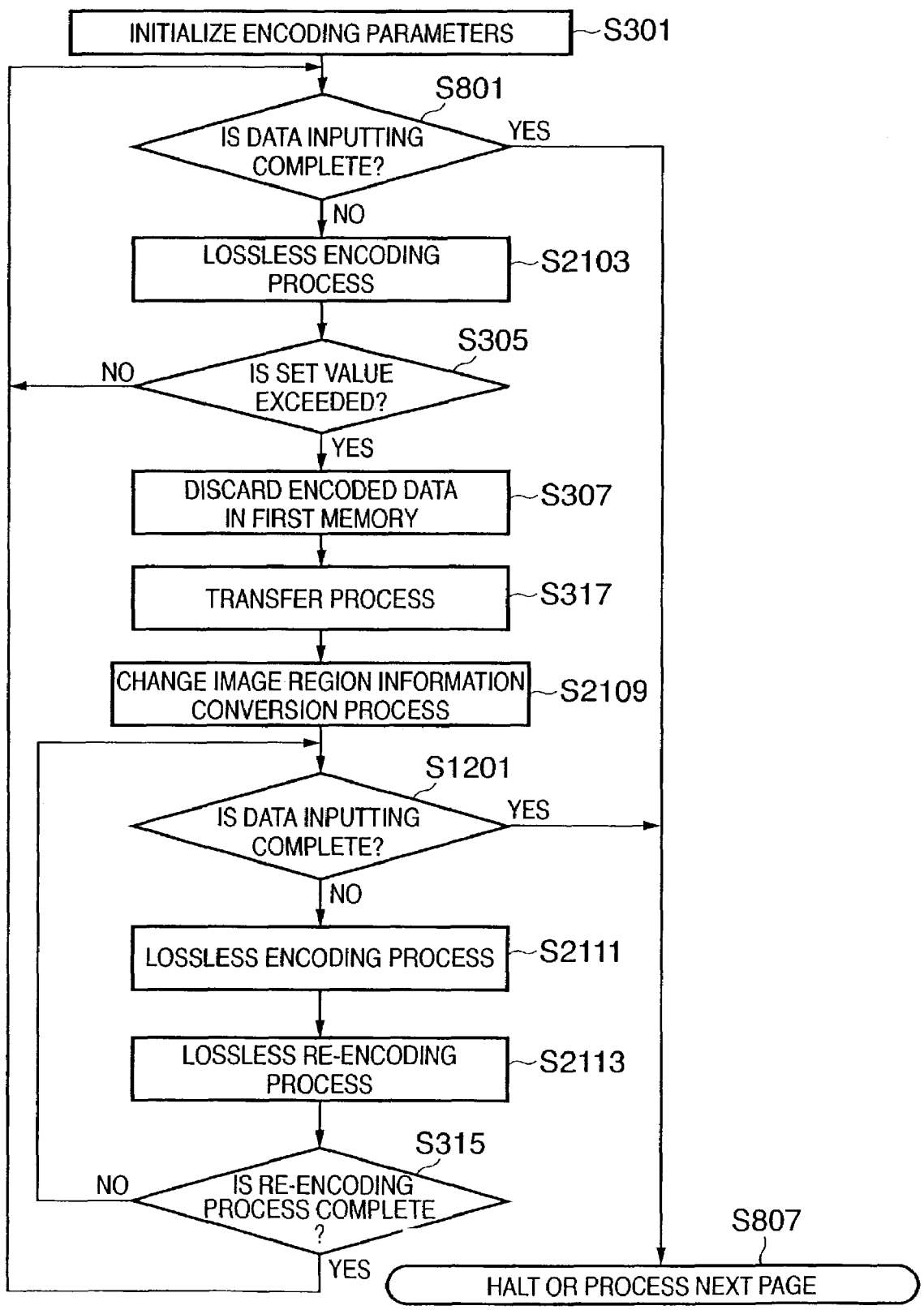
FIG. 22 is a flow chart showing a processing procedure according to the fourth example.

Hence, when expression of the flow chart of image data compression encoding process shown in FIG. 12 is only partially changed, a flow chart for the above-described process can be obtained. The following three points are changed, like the flow chart shown in FIG. 18 changed from FIG. 8.
(1) Encoding process→lossless encoding process
(2) Change of quantization step→change of image region information conversion process
(3) Re-encoding process→lossless encoding.re-encoding process FIG. 22 shows a flow chart with the above three points changed. Four process contents in steps S2103, S2109, S2111, and S2113 change as follows.

The image data compression encoding process and the image region information encoding process are executed in parallel and independently controlled. Hence, the process flow of the image processing apparatus shown in FIG. 21 can be defined by the two flow charts shown in FIGS. 12 and 22.

First Embodiment

In the first and second examples, if the re-encoder 109 or 211 has a low re-encoding capability, the code amount by the first encoder 202 reaches the target value again before re-encoding is ended, and the encoding process cannot be continued.

The first embodiment of the present invention provides a control method to solve the problem in the configuration shown in FIG. 1.

When encoded data that is being encoded causes overflow, the encoding process is continued using a new setting with a higher compression ratio. Conversion from encoded data before the setting is changed to encoded data after the setting is changed is done by the re-encoding process. In the first embodiment, the re-encoding process is reliably ended before the new encoded data after the setting is changed causes overflow.

Figure 23:
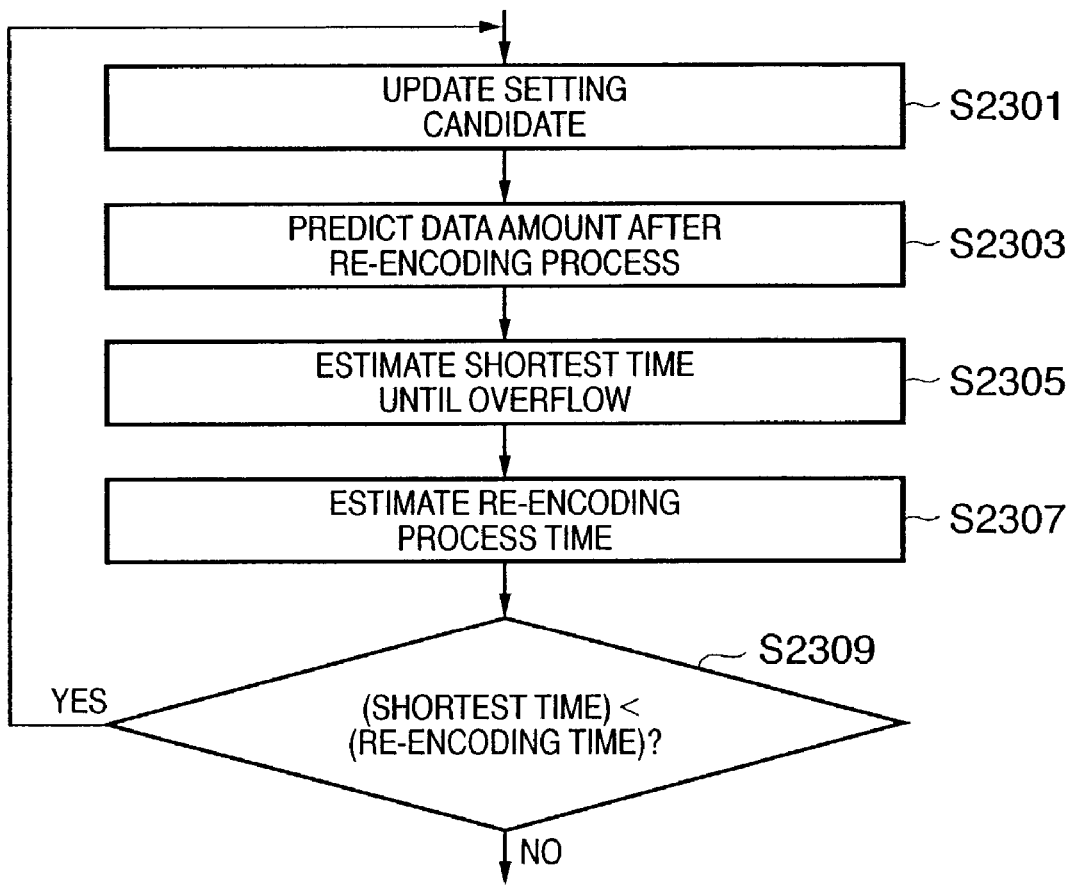
FIG. 23 is a flow chart showing part of process contents according the first embodiment.

For this purpose, new setting with a higher compression ratio is determined on the basis of the flow chart shown in FIG. 23. The flow chart shown in FIG. 23 is inserted between steps S305 and S307 or between steps S307 and S309 of the flow chart shown in FIG. 3, which represents the process-flow of the configuration shown in FIG. 1.

That is, the flow chart shown in FIG. 23 represents a process executed after it is detected in step S305 that the encoded data is to cause overflow until the quantization step of an encoder 102 is changed in step S309.

Referring to FIG. 23, in step S2301, the immediately preceding setting or setting candidate (quantization step) is updated to a setting candidate with a higher compression ratio (quantization step). In step S2303, the decreased code amount that will be obtained when the encoded data is re-encoded using the quantization step of the setting candidate is estimated. In step S2305, the shortest time until the overflow that may be caused by the encoded data encoded using the quantization step of the setting candidate is estimated. In step S2307, the time necessary for the re-encoding process for converting the encoded data before the setting is changed into encoded data encoded using the setting candidate is estimated. In step S2309, the shortest time and the re-encoding process time are compared. If the time necessary for re-encoding is equal to or shorter than the shortest time, the process is continued with the setting. Otherwise, the flow returns to step S2301 to set a higher compression ratio again.

A case wherein a method of doubling the quantization step is employed as the above-described method of increasing the compression ratio will be described in more detail.

In step S2301, the immediately preceding quantization step is doubled. The immediately preceding quantization step indicates the quantization step when the encoded data has caused overflow or the quantization step before one loop in the loop process in steps S2301 to S2307. The quantization step doubled in step S2301 is the candidate value of the quantization step to be newly set in the encoder 102.

It is determined in steps S2303 to S2307 whether the candidate value is adapted to the above purpose. If the candidate value is adapted to the purpose, the candidate value is set in the encoder 102 in step S309 in FIG. 3. Otherwise, the loop process in steps S2301 to S2307 is repeated.

In step S2303, the decreased code amount that will be obtained when the encoded data is re-encoded using the quantization step of the setting candidate is estimated. The decrease ratio changes depending on the quantization step and also depending on the image. In the image processing apparatus that scans image data only once and encodes it, the unencoded portion is an unknown image. Since the data to be input is unknown, the decrease ratio cannot be estimated on the basis of the image. Hence, the process is realized by preparing in advance a table representing the compression ratio of each quantization step on the basis of many sample input images assumed by the image processing apparatus, and obtaining the decrease ratio in accordance with the compression ratio difference between the immediately precedingly set quantization step and the quantization step as a change candidate.

The accuracy of the decrease ratio can be increased by referring other information. For example, the decrease ratio changes between a case wherein the code amount is large and a case wherein the code amount is small even when the same quantization step is used, as can easily be imagined. The code amount has a lower limit. As the code amount becomes smaller, it gradually becomes more difficult to further decrease the code amount. Hence, a decrease ratio table based on the quantization step and the current compression ratio is prepared. Alternatively, the decrease ratio in the next re-encoding process may be more accurately predicted by referring to the actual decrease ratio in the re-encoding process.

In step S2305, the shortest time until the overflow that may be caused by the encoded data encoded using the quantization step of the setting candidate is estimated. The maximum value of the encoded data amount generated by encoding a pixel block is obtained for each quantization step on the basis of a plurality of sample images to prepare a table in advance. The minimum number of blocks that fill the capacity of the memory is calculated by looking up the table. The capacity of the memory indicates a value obtained by subtracting the code amount after the re-encoding process from the target code amount (set memory capacity).

The calculated number of blocks is converted into the number of clocks or actual time (shortest time) on the basis of the number of clocks that are necessary for the image processing apparatus to encode one block.

In preparing the table, if the maximum value of the encoded data amount is obtained for each block, a small number of blocks having excessively large code amounts are dominant, and appropriate prediction may be impossible. Hence, the table is prepared by obtaining the maximum value from an average value for a plurality of blocks.

In step S2307, the time necessary for the re-encoding process for converting the encoded data before the setting is changed into encoded data encoded using the setting candidate is estimated. In this image processing apparatus, as described above, to execute a high-speed re-encoding process, inverse DCT transform is not executed in the decoding process. Instead, bit shifting is executed for a quantization coefficient portion contained in a symbol obtained by Huffman decoding to halve the coefficient value and convert the symbol. After that, Huffman encoding is performed again.

Hence, the re-encoding process time is proportional to the number of symbols. When the number of symbols is counted in the encoding process, the number of clocks required for the re-encoding process, i.e., the re-encoding process time can easily be estimated.

For this purpose, a first counter 107 in the block diagram of FIG. 1 counts not only the encoded data amount but also the number of symbols. Alternatively, a symbol counter is arranged next to the first counter 107.

In step S2309, the shortest time and the re-encoding process time are compared. If the latter is longer, the flow returns to step S2301. If the former is equal to or shorter than the latter, the process shown in FIG. 23 is ended. The quantization step candidate value at the time of end is the new set value for the encoder 102 or re-encoder 109.

Figure 24A:
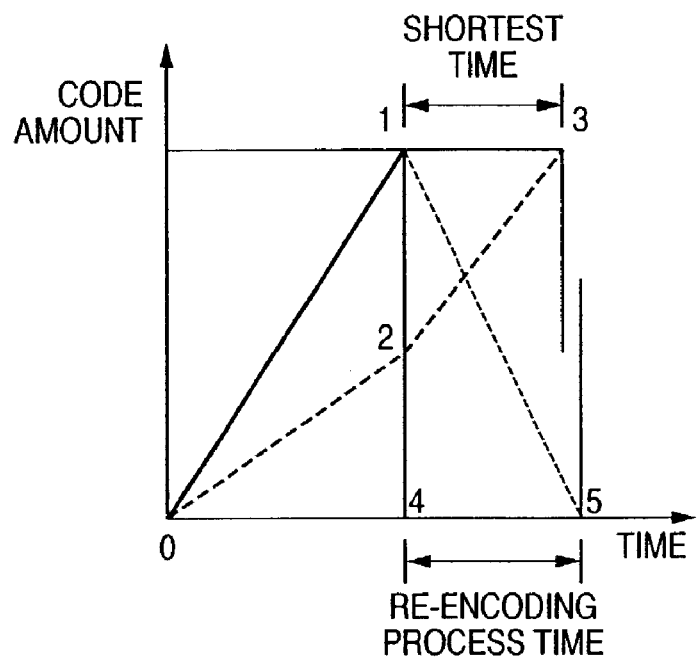
FIGS. 24A and 24B are graphs showing two states with different determination results.
Figure 24B:
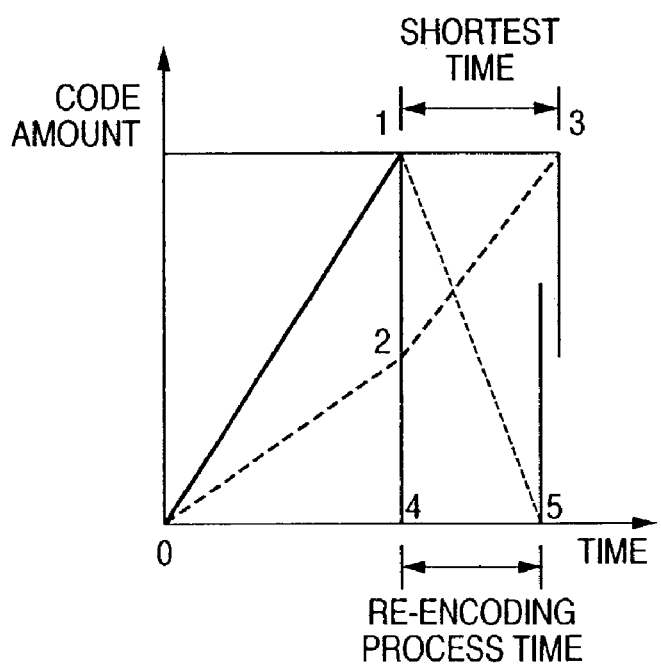

FIGS. 24A and 24B are graphs showing two states with different determination results. In this embodiment, only one encoder is used, and therefore, the two states can easily be understood without expressing them by graphs. However, it may be hard to understand if complex graph expression is used in the second embodiment (to be described later), so graph expression is used in the first embodiment.

The ordinate of each graph represents the encoded data amount output from the encoder 102, and the abscissa represents the process time. As the encoding process time elapses, the encoded data amount output from the encoder 102 increases. This state is indicated by a solid line 0-1. The encoded data causes overflow (reaches the set amount) at end point 1 of the solid line 0-1. This overflow activates the re-encoding process.

A broken line 0-2 represents the transition of encoded data amount after re-encoding, which probably occurs when the re-encoding process is parallelly executed in synchronism with the encoded data output from the encoder 102. A broken line 2-3 connected to the broken line 0-2 indicates the transmission of the maximum value of the (second) encoded data generated after the quantization step of the encoder 102 is doubled in accordance with the overflow. At end point 3 of the broken line 2-3, the second encoded data causes overflow. Hence, the length of a line segment 1-3 indicates the shortest time until the overflow.

On the other hand, a broken line 1-5 indicates information about the re-encoding process. The re-encoding process time is proportional to the number of symbols, as described above. However, there is no measure to express the number of symbols. For this purpose, it is assumed that the re-encoding process time is proportional to the encoded data amount before the re-encoding process, which is almost proportional to the number of symbols, and the broken line 1-5 is drawn. The gradient of the broken line represents the speed (performance) of the re-encoding process. The ordinate represents the encoded data amount that has not undergone the re-encoding process yet. Hence, a line segment 4-5 represents the time from the activation to the end of the re-encoding process, i.e., the re-encoding process time.

The above descriptions related to FIGS. 24A and 24B are common. The difference between FIGS. 24A and 24B is the difference in relationship between the shortest time and the re-encoding process time. FIG. 24A corresponds to a case wherein the re-encoding process time is longer, i.e., the process flow shown in FIG. 23 is repeated again from step S2301. FIG. 24B corresponds to a case wherein the shortest time is longer, i.e., the process flow shown in FIG. 23 is ended, and the quantization step to be set next is determined.

In determining the quantization step, the relationship between the quantization step used before (preceding quantization step) and the quantization step candidate to be used next is as follows.

| Preceding quantization step | | Quantization step candidate |
|---|---|---|
| Q1 (initial value) | → | Q2, Q3, Q4, |
| Q2 | → | Q3, Q4, Q5, ... |
| Q3 | → | Q4, Q5, QG, ... |

That is, in the initial state, the next quantization step that can be used when overflow occurs is selected from Q2, Q3, Q4, . . . If the quantization step Q3 is selected, and overflow occurs again, the next quantization step is selected from Q4, Q5, Q6, . . .

An example of monochrome image input has been described above. For a color image, finer adjustment can be performed. When a color image is encoded, luminance data (Y) and two color difference data (C) are obtained by known color conversion. Hence, the following relationship is obtained. Y represents the luminance, C represents the color difference, $QYi$ (i=1, 2, 3, . . . ) represents the quantization step for the luminance component, and $QCi$ (i=1, 2, 3, . . . ) represents the quantization step for the color difference component. When the value i increases, the quantization step increases.

| Preceding quantization step | Quantization step candidate |
|---|---|
| (QY1, QC1) → | (QY1, QC2), (QY2, QC2), (QY2, QC3), (QY3, QC3) . . . |
| (QY1, QC2) → | (QY2, QC2), (QY2, QC3), (QY3, QC3), (QY3, QC4) . . . |
| (QY2, QC2) → | (QY2, QC3), (QY3, QC3), (QY3, QC4), (QY4, QC4) . . . |

When the process flow shown in FIG. 23 described above is added, the next overflow can be prevented from occurring during the re-encoding process.

<Modification>

As described above, the re-encoding process time is proportional to the number of symbols of the original encoded data. On the basis of this fact, the re-encoding process is estimated first and defined as the shortest time until the overflow. The memory capacity necessary after re-encoding is estimated from the shortest time and the table which stores the maximum value of the encoded data amount. The data decrease ratio after re-encoding is calculated from the memory capacity and compared with the expected ratio of the code amount before the change of the quantization step to that after the change of the quantization step. If the expected ratio is lower than the decrease ratio, the quantization step is set in the encoder. With this process, the same effect as described above can be obtained. The above-described modification is equivalent to the first example. Those skilled in the art can well anticipate that many equivalent processes except the above modification are present. The object to be compared finally is not limited to the time or decrease ratio. The value may be converted into the number of blocks of image data and then compared.

Second Embodiment

The second embodiment of the present invention provides a control method to solve the above-described problem in the configuration shown in FIG. 2.

As in the first embodiment, when encoded data that is being encoded causes overflow, the encoding process is continued using a new setting with a higher compression ratio. Conversion from encoded data before the setting is changed to encoded data after the setting is changed is done by the re-encoding process. At this time, the re-encoding process is reliably ended before the new encoded data after the setting is changed causes overflow.

Figure 25:
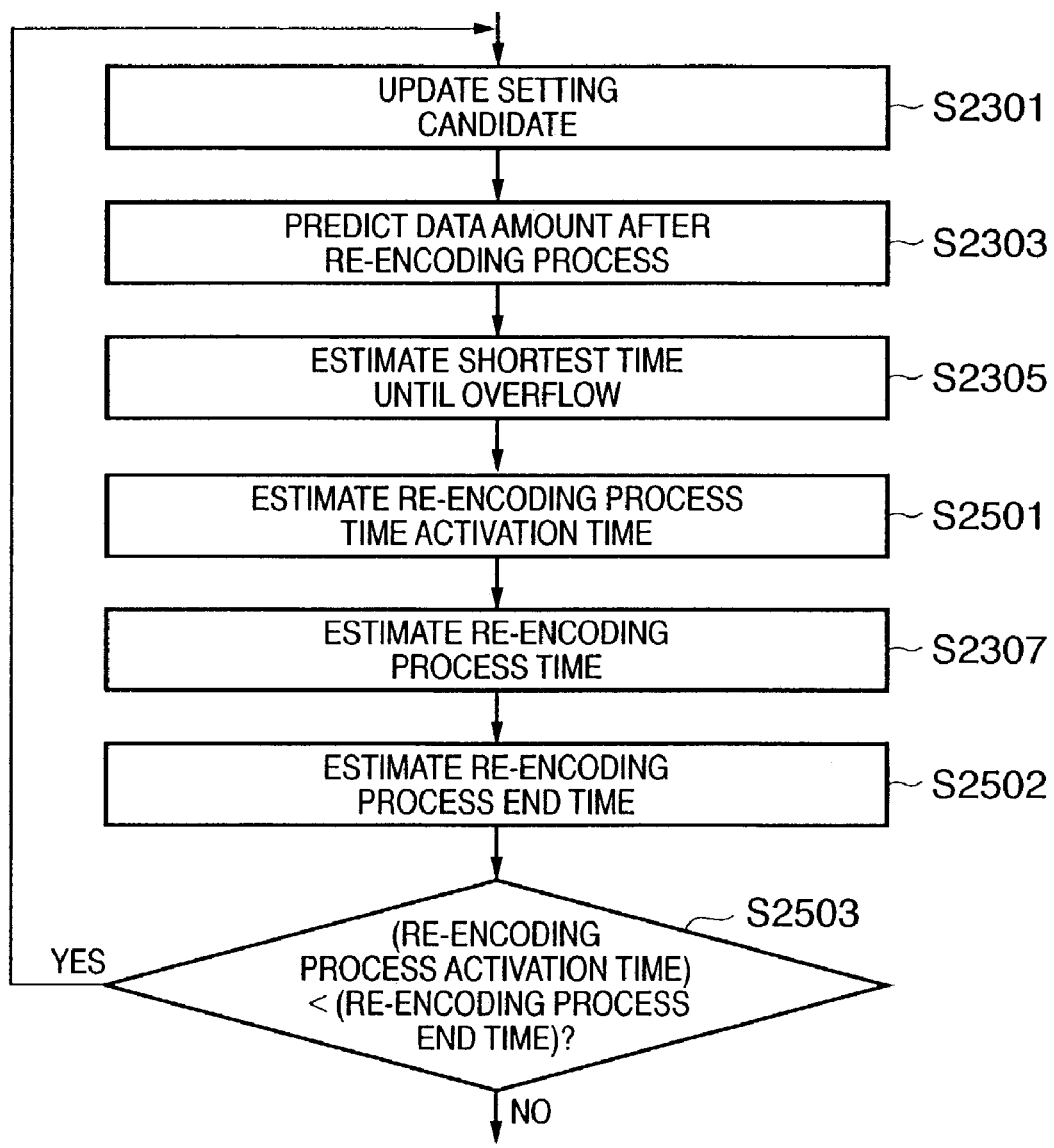
FIG. 25 is a flow chart showing part of process contents according the second embodiment.

In the second embodiment, the flow chart shown in FIG. 25 is inserted into the flow chart shown in FIG. 8, which represents the process flow of the configuration shown in FIG. 2. The flow chart is inserted between the step of determining that the code amount has reached the set value and the step of setting the quantization step, as in the first embodiment.

The basic arrangement of the flow chart shown in FIG. 25 is almost the same as in FIG. 23 except the following point.

A "re-encoding process activation time" is defined for encoded data output from a second encoder 205. In place of the shortest time in the first embodiment, the time until the "re-encoding process activation time" is compared with the re-encoding process time. The remaining points are almost the same as in the first embodiment. The "re-encoding process activation time" will be described first in detail, and then, the flow chart shown in FIG. 25 will be briefly described.

The "re-encoding process activation time" is defined for only encoded data output from the second encoder, as described above. For this reason, codes or encoded data here is limited to codes output from the second encoder.

When the time necessary for re-encoding encoded data that has undergone the encoding process matches the expected shortest time until the encoded data causes overflow at a certain time, that time is called the "re-encoding process activation time". The time required for the re-encoding process and the shortest time, which are necessary for obtaining the "re-encoding process activation time", can be obtained in accordance with the same procedure as in the first embodiment.

When the re-encoding process is activated after this time, the re-encoding process time becomes longer than the matching time while the shortest time is shortened conversely. Hence, the encoded data may cause overflow before the end of the re-encoding process.

This "re-encoding process activation time" has such an important meaning because the object of the present invention is to activate the re-encoding process before the "re-encoding process activation time".

Encoded data output from the second encoder conceptually includes two types of encoded data. One type is entity encoded data which has actually been encoded and output, i.e., encoded data on the flow chart shown in FIG. 8. The other type is encoded data that is assumed to have been encoded under a certain setting, i.e., virtual encoded data and, more specifically, encoded data on the flow chart shown in FIG. 25.

Figure 26A:
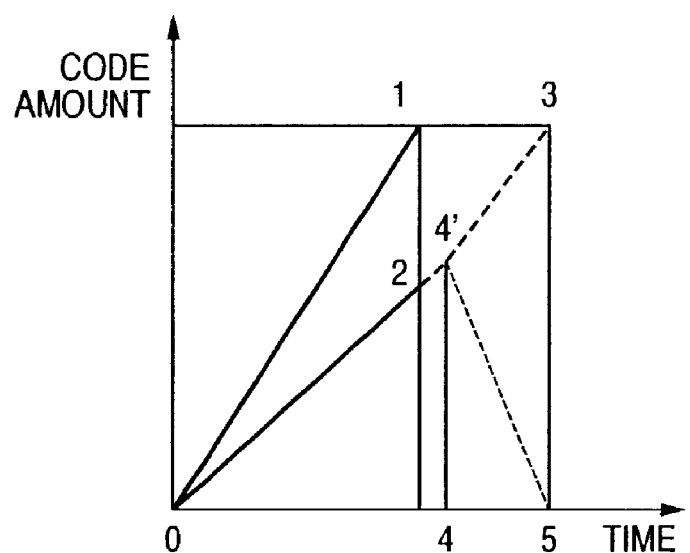
FIGS. 26A and 26B are graphs showing two "re-encoding process activation times"
Figure 26B:
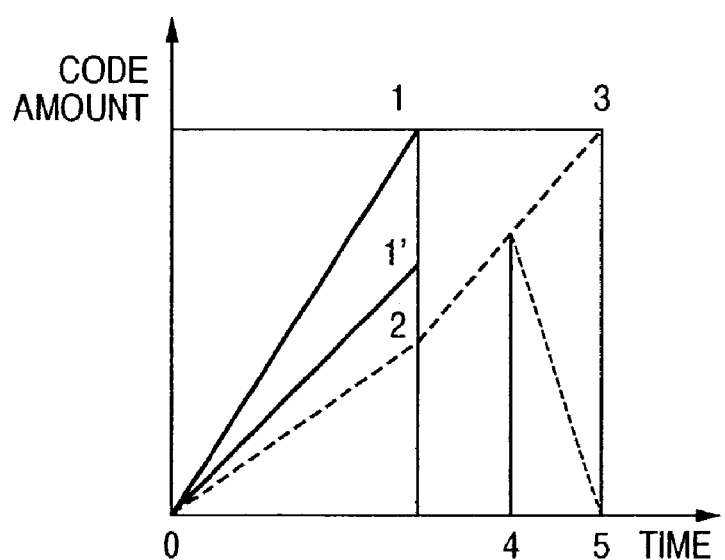

The "re-encoding process activation time" can be defined for either of the above two types of encoded data. FIGS. 26A and 26B are graphs showing the difference. FIG. 26A is a graph related to encoded data that is being encoded. FIG. 26B is a graph related to virtual encoded data. Expressions common to the graphs shown in FIGS. 24A and 24B described above are used as much as possible. The differences between FIGS. 24A and 24B and FIG. 26A will be summarized below.

(1) Since two encoders are used, and two types of encoded data are output simultaneously, the broken line 0-2 in FIG. 24A or 24B changes to a solid line 0-2 in FIG. 26A.

(2) In FIGS. 24A and 24B, encoded data that should cause overflow is re-encoded. In FIG. 26A, encoded data having a smaller code amount at a higher compression ratio is re-encoded. Hence, the line that indicates the re-encoding process starts not from the end point 1 but from a point 4' on a broken line 2-3.

(3) The point 4' is determined such that the time corresponding to an end point 3 equals that corresponding to an end point 5. Time 4 corresponding to the point 4' is "re-encoding process activation time".

FIG. 26B has a difference (4) in addition to those of FIG. 26A.

(4) The solid line 0-2 is changed to a solid line 0-1'. The transition of encoded data, which should occur when the re-encoding process is parallelly executed in synchronism with the encoded data of the solid line 0-1', is represented by the broken line 0-2. The broken line 2-3 connects to the broken line 0-2.

In the present invention, the quantization step to be set next is determined on the basis of the flow chart shown in FIG. 25 to solve the above-described problem. Hence, the "re-encoding process activation time" in FIG. 26B is important.

In the flow chart shown in FIG. 25, step S2501 is added after step S2305 in the flow chart shown in FIG. 23, step S2502 is added after step S2307, and the final comparison process step S2309 is changed to step S2503.

In step s2501, the "re-encoding process activation time" for encoded data when the encoding process is executed using the quantization step of setting candidate is obtained by the above-described method. In step S2502, the re-encoding process end time is obtained by adding the re-encoding process time to the current time at which the process of this flow chart is progressing. In step S2503, the "re-encoding process activation time" is compared with the immediately preceding re-encoding process end time. Note that the process in step S2307 is executed for encoded data output from the second encoder 205 of the two encoders.

Figure 27A:
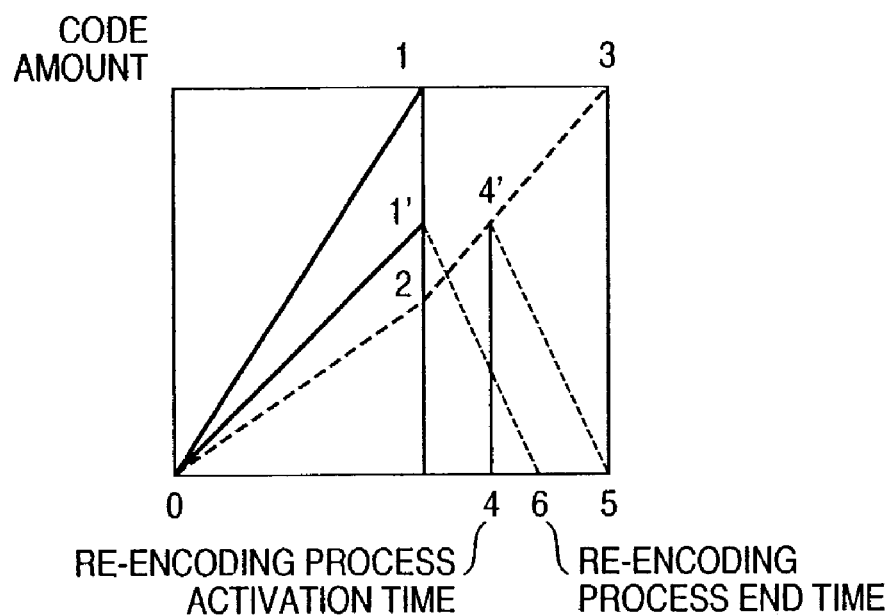
FIGS. 27A and 27B are graphs showing two states with different determination results.
Figure 27B:
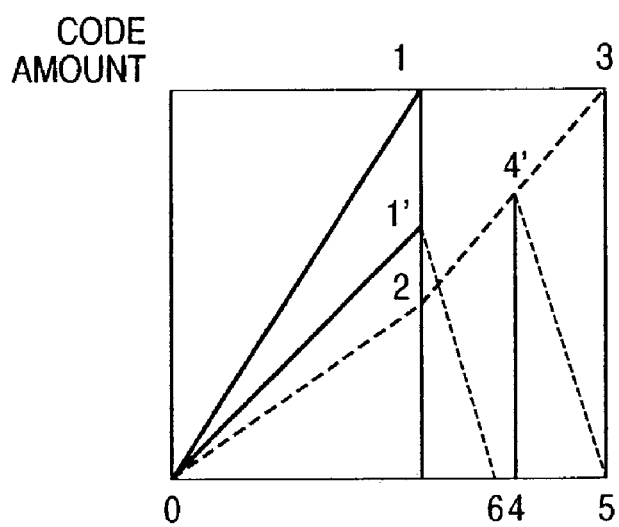

FIGS. 27A and 27B are graphs showing the difference in comparison result in step S2503. These graphs are based on FIG. 26B and represent the timing at which the encoded data output from the second encoder is re-encoded by a broken line 1'-6. FIG. 27A shows a case wherein the re-encoding process end time is located after the "re-encoding process activation time". FIG. 27B shows a case wherein the "re-encoding process activation time" is located after the re-encoding process end time.

The time of point 4 indicates the "re-encoding process activation time". The time of point 6 indicates the re-encoding process end time. FIG. 27A having the point 6 on the right side of the point 4 indicates that the re-encoding process is not ended before the "re-encoding process activation time". In this case, the process flow shown in FIG. 25 is executed again from the first step. On the other hand, FIG. 27B having the point 6 on the left side of the point 4 indicates that the re-encoding process is ended before the "re-encoding process activation time". In this case, the quantization step to be set in the second encoder is determined.

In the first embodiment, if encoded data output from the only encoder 102 causes overflow, the re-encoding process must be activated accordingly. To do this, the re-encoding process that has been activated before must be ended.

This also applies to the second embodiment. More specifically, when the "re-encoding process activation time" comes, and the corresponding re-encoding process has not been activated yet because the encoded data has not caused overflow, the re-encoding process must be activated upon determining that the "re-encoding process activation time" has come. Hence, the immediately preceding re-encoding process must be ended before the "re-encoding process activation time".

As is apparent from the above description, the re-encoding process must be ended before occurrence of overflow of corresponding encoded data. In addition, the re-encoding process must also be ended before the "re-encoding process activation time".

In fact, when the re-encoding process is activated at the "re-encoding process activation time", it guarantees that the re-encoding process is always ended before occurrence of overflow of corresponding encoded data. Hence, the description of the process flow has been made with emphasis on only the "re-encoding process activation time".

When the process flow shown in FIG. 25 described above is added to the flow chart shown in FIG. 8, the next overflow can be prevented from occurring during the re-encoding process.

As in the first embodiment, an equivalent modification process can easily be considered in the second embodiment. The equivalent modification process is also incorporated in the present invention, as a matter of course.

In the above embodiments, an apparatus which reads an image from an image scanner has been exemplified, and the functional operation of the apparatus has been described. Most of the functions (including the encoding process) can be implemented by a computer program, as described above.

Hence, the present invention may be applied to an application program which runs on a general-purpose information processing apparatus such as a personal computer. When the present invention is applied to an application program, GUI which causes a user to designate an image file to be compressed and select a target size is used. At this time, the target value can be arbitrarily set by the user. It is however difficult to set a numerical value, so the user is caused to select a desired setting from an intuitively understandable menu considering the original size and image quality (high/medium/low).

When the present invention is to be implemented by software, it must be taken into consideration that there are processors with various operation frequencies, as can be seen from current popular PCs. Hence, when the present invention is to be implemented by software, the table is preferably updated in accordance with the capability of the processor.

The above embodiments have been described on the basis of a monochrome image. However, they may be applied to a color image.

As described above, according to the first and second embodiments, even when the encoding performance is not so high, the re-encoding process can be reliably ended before the code amount of next codes causes overflow. Hence, the encoded data can be reliably stored with a small capacity within the encoding process time of one cycle.

As described above, according to the first and second embodiments, an image can be reliably encoded while continuously inputting the image with a relatively simple configuration.

Third Embodiment

The third embodiment provides a configuration and control method to solve the above-described problem in the third and fourth examples. For descriptive simplicity, the third embodiment is applied to the configuration shown in FIG. 21 (fourth example). However, those skilled in the art can easily understand that this embodiment can be applied to the third example (FIG. 17).

In FIG. 21, the code amounts of image data and image region information are independently controlled by the encoding sequence controller and lossless encoding controller such that each code amount decreases to a corresponding set encoded code amount or less. For this reason, when each control is reliably executed, the total code amount also reliably decreases to the sum of the two set code amounts or less.

However, if one of the code amounts is excessively small, over-compression occurs for the entire code amount. When one of the code amounts is surely smaller than the set code amount, and the remaining code storage memory should be effectively used, control must be executed in consideration of both code amounts.

Figure 28:
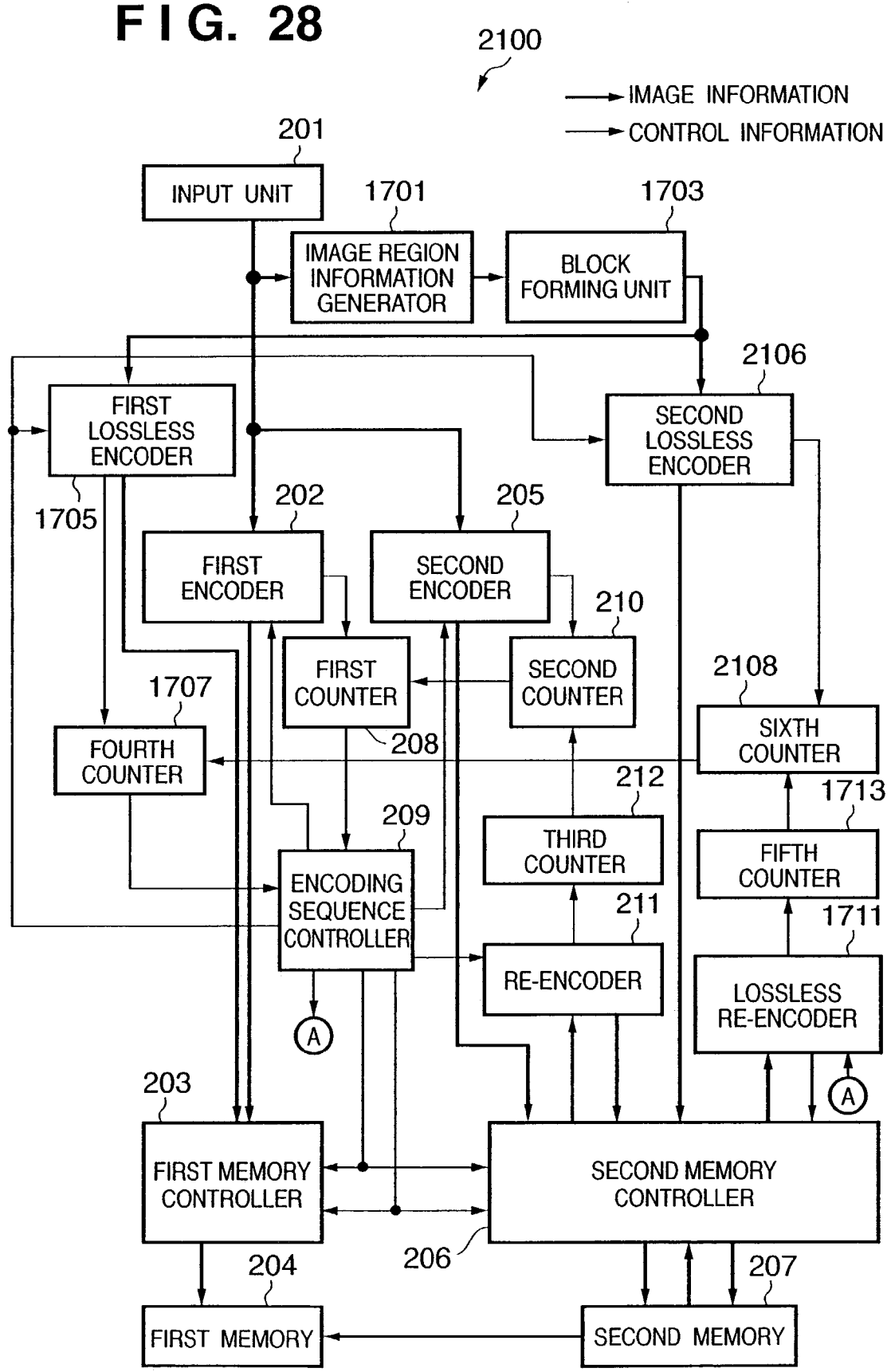
FIG. 28 is a block diagram showing the configuration of an image processing apparatus according to the third embodiment.

For this purpose, in the third embodiment, both a lossy-encoded code amount and a losslessly encoded code amount are input to an encoding sequence controller 209, as shown in FIG. 28.

Figure 29:
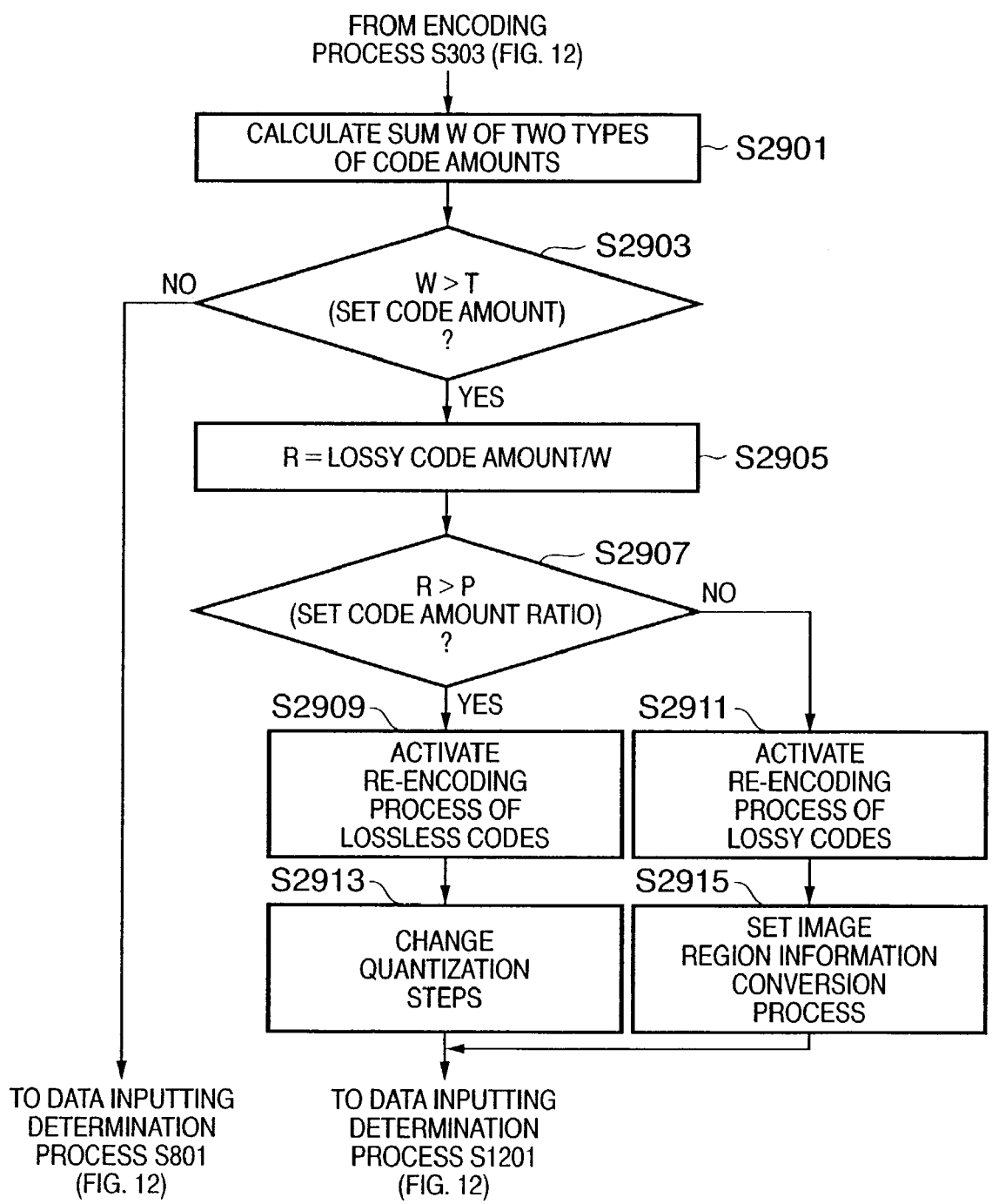
FIG. 29 is a flow chart showing the main part of a processing procedure according to the third embodiment.

In the encoding process flow according to the third embodiment, some steps (S305, S307, S309, and S317) of the flow chart shown in FIG. 12 are replaced with the flow chart shown in FIG. 29. In the encoding processes in steps S303 and S311, a lossless encoding process and a lossy encoding process are executed in parallel.

In step S2901, a sum W of two types of code amounts (a code amount by a first encoder 202 and a code amount by a first lossless encoder 1705) obtained by encoding input image information is calculated.

In step S2903, the sum W is compared with a set code amount T set as the upper limit of the total code amount.

In step S2905, the lossy code amount (the code amount of image data) is divided by the sum to obtain a ratio R of the lossy code amount to the total code amount. In step S2907, the ratio is compared with a set code ratio P. The set code ratio P is a threshold value serving as a reference value of the ratio of the lossy code amount to the total code amount.

To effectively use the code storage memory for the two types of codes, the sum W of the two types of codes is calculated in step S2901, and it is detected in step S2903 whether the sum W exceeds the set code amount T. Even when one of the code amounts exceeds the corresponding set code amount, the encoding process is continued in that state unless the sum W exceeds the set code amount T. Hence, unless W>T, the flow advances to step S801 while skipping steps S2905 to S2915, and the encoding process of the next block is executed.

However, if the sum W exceeds the set code amount T, the total code amount cannot be the set code amount T or less unless at least one code is re-encoded. To determine which code should be re-encoded, the ratio R of the lossy code amount to the total code amount is calculated in step S2905, and the ratio R is compared with the set code ratio P in step S2907.

When the ratio R is higher than the set code ratio P, the code amount of lossy codes (JPEG) is larger than the reference amount. So the flow advances to step S2909 to control to activate the re-encoding process of the lossy codes. Otherwise, the flow advances to step S2911 to control to activate the re-encoding process of lossless codes (Packbits).

In either case, uncompressed image information is encoded to codes at the same compression ratio (setting) as that of the codes after the re-encoding process. For this purpose, the compression condition and the like of the corresponding encoder are updated in step S2913 or S2915, and the flow advances to a loop process comprising the encoding process in step S311 and the re-encoding process in step S313 in FIG. 12. The various determination processes above are executed by the encoding sequence controller 209 which controls the four encoders and two memory controllers.

As described above, instead of independently re-encoding the two types of codes, a code whose ratio is higher than the set ratio is re-encoded when the total code amount W exceeds the set code amount T. With this operation, the number of times of re-encoding process can be decreased, and the code storage memory can be effectively used.

The set code ratio P need not always be the ratio of lossy code amount to the total code amount. It may be the ratio of lossless code amount to the total code amount. In addition, the value calculated in step S2905 need not always be the ratio of lossy code amount to the total code amount W. It may be a value obtained by dividing the lossy code amount by the set code amount T.

Each of these values represents the occupation ratio of the lossy code amount in the code storage memory. Either value can be used because the two values immediately after the total code amount W exceeds the set code amount T can be regarded as almost the same. When the set code amount T is to be used, it is more advantageous in terms of calculation speed that a reciprocal is obtained in advance and multiplied.

In step S2907, the ratio of the two types of codes and, for example, (lossless code amount)÷(lossy code amount) may be compared. In this case, no problem is posed when a value corresponding to the ratio is set as the set code ratio.

Furthermore, if the difference between the set code ratio P and the lossy code amount ratio R at the time of detection of overflow is small, both types of codes may be simultaneously re-encoded. To implement this process, a step of obtaining the absolute value of the difference between the ratios, comparing the value with a set threshold value, and detecting that the absolute value is smaller than the threshold value is added.

In short, according to the technical idea of this embodiment, the object to the compression-encoded is determined such that the correlation between the lossless code amount and the lossy code amount comes closer to a preset preferable correlation (balance).

Even in the configuration shown in FIG. 17, when both the lossy code amount (the output from the first counter) and the lossless code amount (the output from the fourth counter) are input to an encoding sequence controller 108, and the same control as described above is executed, the code storage memory can be effectively used.

The configuration shown in FIG. 21 is more complex than that shown in FIG. 17. However, as described above, the configurations shown in FIGS. 17 and 21 are well relevant to each other, so those skilled in the art can well understand that the control method that can be applied to in FIG. 17 can also be applied to FIG. 21 basically. The next and subsequent embodiments will be described in association with only the configuration shown in FIG. 17.

The third embodiment has been described on the basis of the fourth example (FIG. 21). However, the embodiment may be based on the third example. The configuration based on the third example is as follows.

That is, there is provided an image processing method of compression-encoding image data and image region information of the image data, characterized by comprising:

a first lossy compression encoding step in which a compression parameter can be changed and which is executed for the image data;

a second lossy compression encoding step, in which the compression parameter can be changed and which is executed for the image data, of compression-encoding the image data using a compression parameter for a higher compression ratio than in the first lossy compression encoding step;

a third lossy compression encoding step, which is executed for the image data, of decoding and re-encoding code data compressed in the second lossy compression encoding step;

a first lossless compression encoding step in which the compression parameter can be changed and which is executed for the image region information;

a second lossless compression encoding step, in which the compression parameter can be changed and which is executed for the image region information, of compression-encoding the image region information using a compression parameter for a higher compression ratio than in the first lossless compression encoding step;

a third lossless compression encoding step, which is executed for the image region information, of decoding and re-encoding code data compressed in the second lossless compression encoding step;

a code amount monitor step of determining whether a total code amount of the code amounts generated in the first lossy compression encoding step and the first lossless compression encoding step has reached a predetermined amount while the codes are being compression-encoded in the first lossy compression encoding step and the first lossless compression encoding step;

a determination step of, when it is determined in the code amount monitor step that the total code amount has reached the predetermined amount, determining information for which the compression parameter is to be changed, on the basis of a correlation between the code amount by the first lossy compression encoding step and the code amount by the first lossless compression encoding step; and a control step of controlling the first to third lossy compression encoding steps and the first to third lossless compression encoding steps on the basis of contents determined in the determination step, wherein in the control step, when it is determined in the determination step that the information for which the compression parameter is to be changed is the image data, the compression parameters in the first and second lossy compression encoding steps are updated, the first lossy compression encoding step is executed to take over the second lossy compression encoding step and continue the compression process, and the third lossy compression encoding step is executed to re-encode the image data compression-encoded in the second lossy compression encoding step before it is determined that the total code amount has reached the predetermined amount, and when it is determined in the determination step that the information for which the compression parameter is to be changed is the image region information, the compression parameters in the first and second lossless compression encoding steps are updated, the first lossless compression encoding step is executed to take over the second lossless compression encoding step and continue the compression process, and the third lossless compression encoding step is executed to re-encode the image region information compression-encoded in the second lossless compression encoding step before it is determined that the total code amount has reached the predetermined amount.

Fourth Embodiment

The control method of the third embodiment is very effective when the speed of the re-encoding process is very high, i.e., when the re-encoding process for any setting is always ended before the total code amount W exceeds the set code amount T (W>T).

In some cases, however, the code amount may hardly decrease even after the re-encoding process. In this case, the time until the next overflow is very short, and it may be difficult to end the re-encoding process within the time limit.

The fourth embodiment proposes an example to solve the problem. For descriptive simplicity, an example which implements a control method will be described, in which on the basis of the configuration shown in FIG. 17, the re-encoding process is always ended before a total code amount W exceeds a set code amount T (W>T) while effectively using the storage memory, as in the third embodiment.

Figure 30:
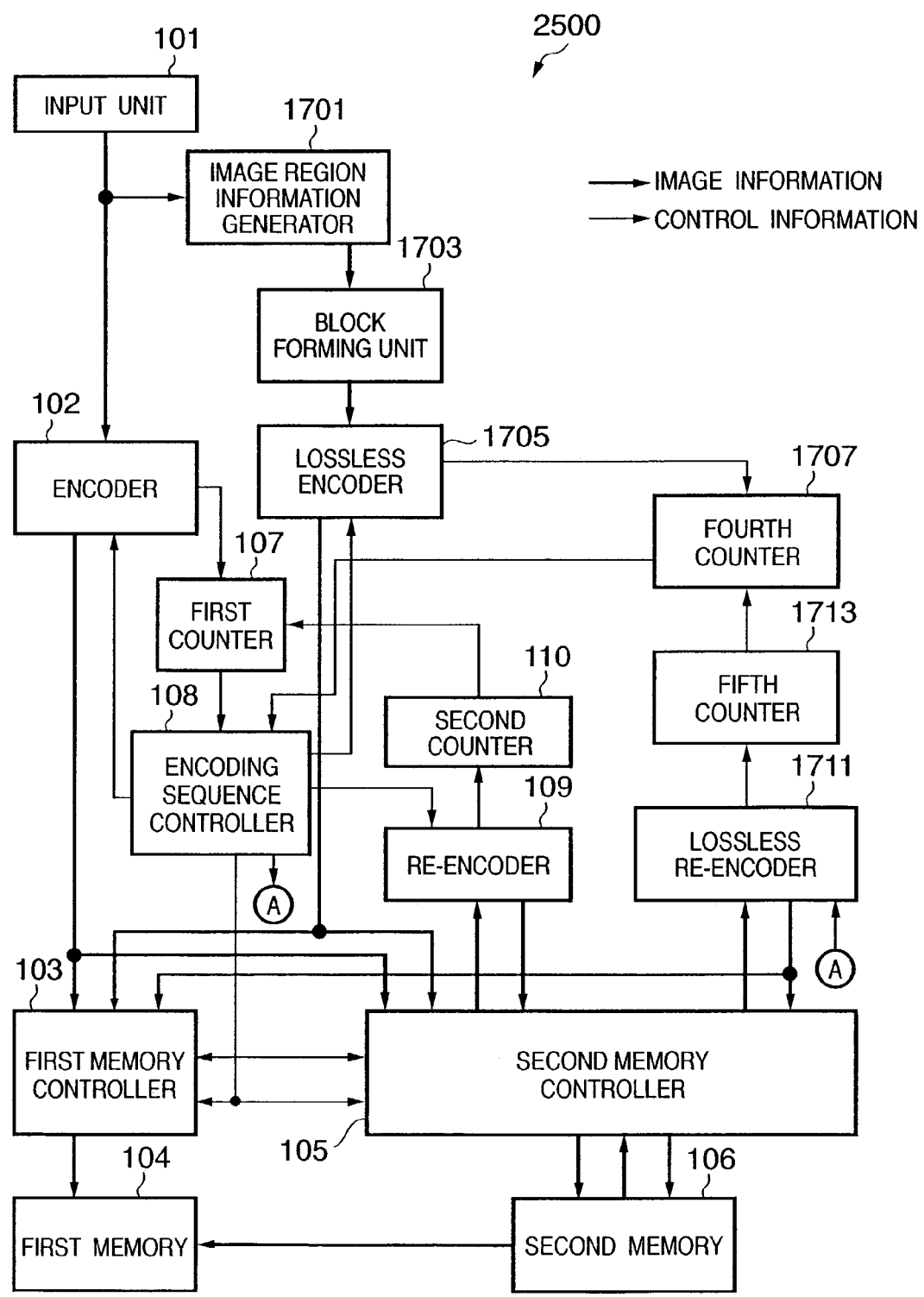
FIG. 30 is a block diagram showing the configuration of an image processing apparatus according to the fourth embodiment.

When the fourth embodiment is applied to the configuration shown in FIG. 17, both a lossy-encoded code amount (the output from the first counter) and a losslessly encoded code amount (the output from the fourth counter) are input to an encoding sequence controller 108, as described above. FIG. 30 is a block diagram of the configuration.

Figure 31:
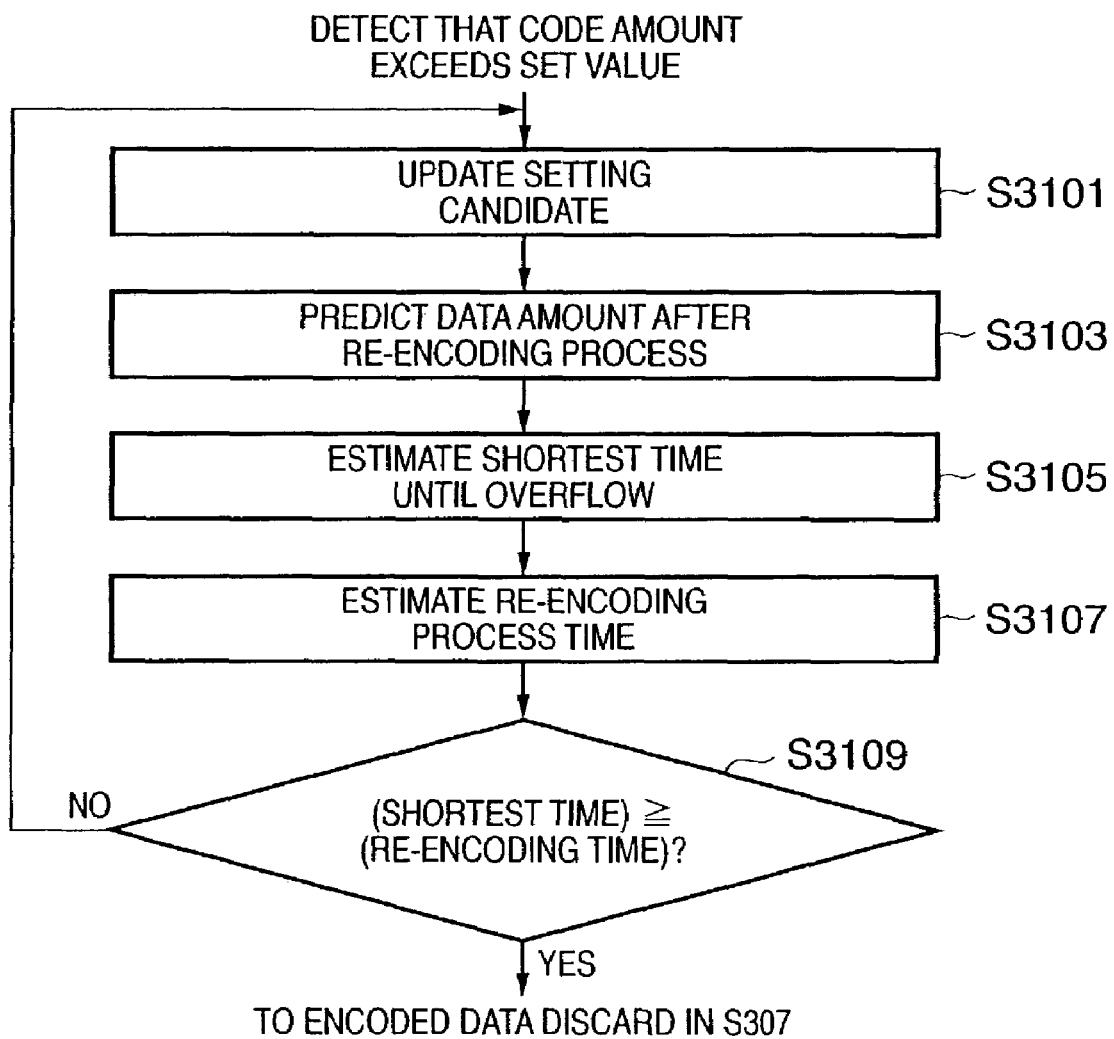
FIG. 31 is a flow chart showing the main part of a processing procedure according to the fourth embodiment.

The flow chart shown in FIG. 31 is inserted and executed before or after step S307 in FIG. 12 which is the flow chart showing the process flow of the configuration shown in FIG. 2.

The process flow shown in FIG. 31 will be briefly described below. When it is detected in step S305 (FIG. 3 or 12) that the code amount exceeds the set value, an encoding setting condition under which a higher compression ratio can be obtained is defined as a setting candidate (S3101). The code amount which should be obtained by encoding using the setting candidate is estimated (S3103). In addition, the shortest time until overflow is estimated from the remaining memory capacity at that time and the generated code amount predicted with the setting candidate (S3105). On the other hand, the re-encoding process time is estimated on the basis of the statistical amount such as the number of symbols of the codes to be re-encoded (S3107). When the estimated re-encoding process time is longer than the estimated shortest time (S3109), there is no guarantee that the actual re-encoding process is ended before the code amount exceeds the set value. Hence, the setting candidate is updated by one step to define an encoding setting condition for a higher compression ratio as a setting candidate (S3101). The higher the compression ratio becomes, the larger the decrease amount of the code amount after the re-encoding process becomes, and the longer the shortest time becomes. Hence, when a certain encoding setting condition is set, a relation represented by (estimated shortest time)≧(estimated re-encoding process time) holds. This guarantees that the actual re-encoding process is ended before the code amount exceeds the set value.

Encoded data after the re-encoding process at a certain time and the encoded data obtained by encoding input data are controlled to have the same encoding setting condition such that a uniform image quality can be obtained. Hence, the encoding setting condition can also be regarded as a re-encoding setting condition.

When the relation "(estimated) shortest time≧(estimated) re-encoding process time" holds (S3109), the flow returns to step S307 in FIG. 3 or 12 (discard of encoded data in the first memory) to reflect the setting candidate. The setting candidate is set as a quantization step in the quantization step change step S309.

Figure 32:
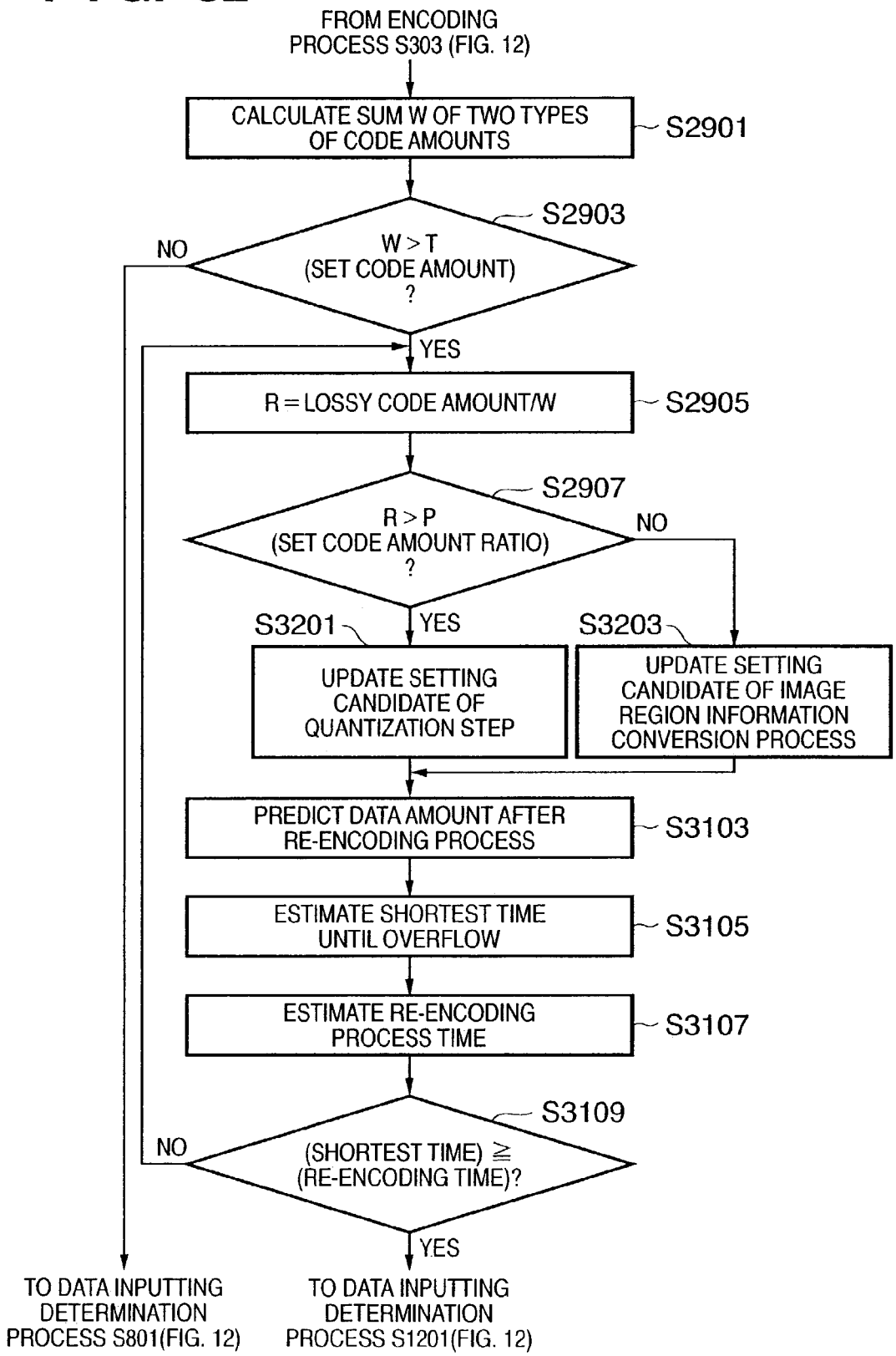
FIG. 32 is a flow chart showing the main part of the processing procedure according to the fourth embodiment.

The basic viewpoint of the control flow according to this embodiment will be described by using the above-described process flow. The process flow shown in FIG. 31 is integrated with that shown in FIG. 29 to take advantage of the characteristic features of both process flows. More specifically, a control method of always ending the re-encoding process before the total code amount W exceeds the set code amount T (W>T) while effectively using the storage memory is implemented, as in the third embodiment. FIG. 32 shows the integrated process flow. The process flow shown in FIG. 32 will be described below using a detailed example.

Let Q1 (JPEG) be the quantization step set level at the start of encoding, and M1 (Packbits) be the image region information conversion set level. The compression ratio increases as the number representing the set level becomes large.

The overall process flow is almost the same as in FIG. 29. FIG. 32 shows the process following the encoding process in step S303 (FIG. 12). First, in step S2901, the sum W of the two types of codes, i.e., the lossy code and lossless code (the output from a first counter 107 and the output from a fourth counter 1707 in FIG. 30) is calculated. It is detected in step S2903 whether the sum W exceeds the set code amount T. When the sum W exceeds the set code amount T, at least one of the two types of codes must be re-encoded. To determine which code should be re-encoded, a ratio R of the lossy code amount to the total code amount is calculated in step S2905. The ratio R is compared with a set code ratio P in step S2907.

For descriptive simplicity, assume that the first comparison result indicates that the ratio R is higher than the set code ratio P. This indicates that the lossy code amount (JPEG) is larger than the reference amount. The flow advances to step S3201 to set the quantization step setting candidate to Q2. The lossy code amount which is to be obtained when the re-encoding process is executed using the setting Q2 is predicted in step S3103. In step S3105, the shortest time until overflow is estimated. In step S3107, the re-encoding process time is estimated. In step S3109, it is determined whether the re-encoding process is to be ended in time. If the re-encoding process is not to be ended in time, i.e., (re-encoding process time)>(shortest time), the re-encoding process must be executed at a higher compression ratio. The flow returns to step S2905 to calculate the ratio R of the new lossy code amount on the basis of the predicted code amount obtained when the re-encoding process is executed using the setting Q2.

If the ratio R is higher than the set code ratio P again, the quantization step setting candidate is updated by one more step to Q3 (S3201). For the setting Q3, prediction of the lossy code amount (S3103), estimation of the shortest time until overflow (S3105), and estimation of the re-encoding process time (S3107) are executed, as described above. Then, it is determined whether the re-encoding process is to be ended in time (S3109).

Assume that the determination result indicates again that the re-encoding process is not to be ended in time. The flow returns to step S2905 to calculate the ratio R of the lossy code amount corresponding to the quantization step Q3 (S2905). The ratio R is compared with the set code ratio P (S2907). Assume that the ratio R of the lossy code amount is lower than the set code ratio P. Then, the flow advances to step S3202 to update the image region information conversion setting candidate from M1 to M2.

For the new setting candidate, prediction of the lossless code amount (Packbits) (S3103), estimation of the shortest time until overflow (S3105), and estimation of the re-encoding process time (S3107) are executed. Then, it is determined whether the re-encoding process is to be ended in time (S3109). When it is determined that the re-encoding process is to be ended in time, the setting candidates Q3 and M2 are defined as the final compression setting conditions, and the flow advances to step S1201 in FIG. 12.

As described above, when the lossy code or lossless code compression setting condition is updated stepwise until the re-encoding process time does not exceed the shortest time until overflow, the control method of always ending the re-encoding process before the total code amount W exceeds the set code amount T (W>T) while effectively using the storage memory can be implemented.

Fifth Embodiment

In the fourth embodiment, the lossy code or lossless code compression setting condition is updated stepwise, and the description thereof is easy to understand. However, even in the fourth embodiment, a certain compression setting condition may cause over-compression. More specifically, in the above description, Q3 and M2 are defined as the final compression setting conditions. However, the re-encoding process time may not exceed the shortest time until overflow even with the settings Q2 and M2 for a less degradation in image quality. When skipping over this setting is avoided, the embodiment can be improved. The fifth embodiment provides an improvement for this point.

In the fifth embodiment, every combination of compression setting candidates of the two types of codes is searched except combinations that can obviously be excluded. More specifically, when the code for which the compression setting condition is to be updated changes, it is determined for unsearched compression setting candidates whether the re-encoding process time exceeds the shortest time until overflow.

More specifically, in the fourth embodiment, when the compression setting candidate of the lossless code is updated from M1 to M2, the lossy compression condition Q3 is returned to Q1. It is then determined whether the re-encoding process is to be ended in time in an order of (Q1,M2), (Q2,M2), and (Q3,M2).

Next, when the compression setting candidate of the lossless code is updated from M2 to M3, Q3 is returned to Q1 again. It is then determined whether the re-encoding process is to be ended in time in an order of (Q1,M3), (Q2,M3), and (Q3,M3). When the compression setting candidate of the lossless code is updated from M3 to M4, Q3 is returned to Q1. It is then determined whether the re-encoding process is to be ended in time in an order of (Q1,M4), (Q2,M4), and (Q3,M4). After that, when the compression setting candidate of the lossy code is updated from Q3 to Q4, M4 is returned to M1. It is then determined whether the re-encoding process is to be ended in time in an order of (Q4,M1), (Q4,M2), (Q4,M3), and (Q4,M4).

Although the number of processes increases slightly, this process is necessary for preventing compression more than necessity and suppressing any degradation in image quality. The following modification is available as a method of suppressing an increase in number of processes.

In the above description, when a lossless compression condition Mn is determined, Qn is returned to Q1. However, when Qn is returned to Q((n+1)/2) and, more specifically, Q3 is returned to Q2, the return amount is halved, and the process amount is also almost halved. Alternatively, an effective return amount when n is small may be reflected on the return amount when n becomes large. The search range of the two types of compression setting candidates can thus be adjusted in various ways.

Assume that, for example, a combination (Q4,M2) remains as a candidate in the compression settings, the encoding process and re-encoding process are executed for these settings, and the codes before re-encoding disappear while the codes for the new settings are generated. When the image is encoded to the end using these settings, and the sum W of the two types of codes does not cause overflow (does not exceed the set code amount T), the settings are defined as the final compression setting conditions for the image. When the sum W causes overflow, it is detected in step S2907 in FIG. 32, and a new compression setting candidate is searched. When the compression setting conditions of the code to be re-encoded are (Q4,M2), it is insignificant to search the settings Q1, Q2, Q3, and M1 for lower compression ratios. This is because information that is lost upon the re-encoding process cannot be restored. Hence, in the above description, the process of "returning Qn to Q1" changes to a process of "returning Qn to Q4". In other words, the condition is returned to the compression setting condition of the code to be re-encoded.

Figure 33A:
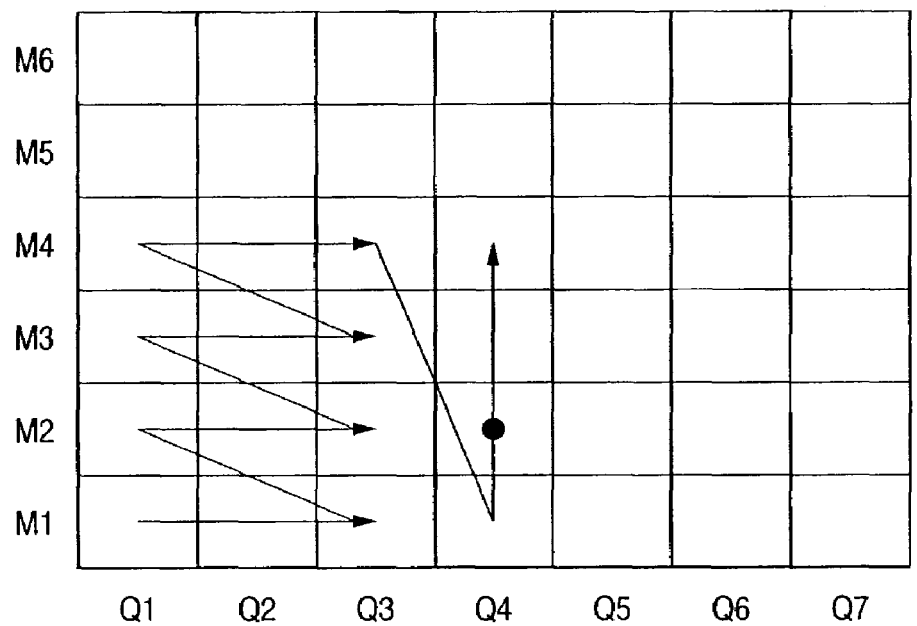
FIGS. 33A and 33B are views showing the transition of an encoding parameter according to the fifth embodiment.
Figure 33B:
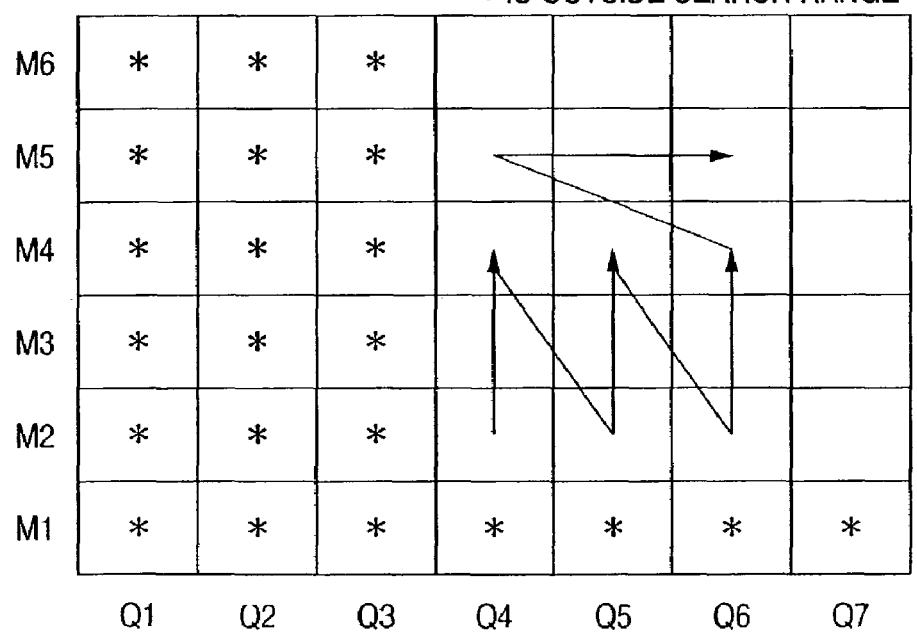

FIG. 33A shows the search range in the initial state (Q1,M1) and the search example of the above description. FIG. 33B shows the next search range and search example for the determined compression setting candidates (Q2,M4).

In the above embodiments, an apparatus which reads an image from an image scanner has been exemplified, and the functional operation of the apparatus has been described. Most of the functions (including the encoding process) can be implemented by a computer program, as described above.

Hence, the present invention may be applied to an application program which runs on a general-purpose information processing apparatus such as a personal computer. When the present invention is applied to an application program, a GUI which causes a user to designate an image file to be compressed and select a target size is used. At this time, the target value can be arbitrarily set by the user. It is however difficult to set a numerical value, so the user is caused to select a desired setting from an intuitively understandable menu considering the original size and image quality (high/medium/low).

As described above, since the present invention can be implemented by an application program that runs on a general-purpose apparatus, the present invention also incorporates a computer program. A computer program is executed normally by setting a storage medium such as a floppy (registered trademark) disk or CD-ROM in the apparatus and copying or installing the program. Hence, such a storage medium is also incorporated in the present invention.

In the above embodiments, image data is input from a scanner. However, the present invention may be applied to a printer driver that runs on a host computer. In a printer driver to which the present invention is applied, when data to be printed is received from a host process (e.g., an application), it can be determined at that time whether the data is a halftone image or a character/line image. Hence, a configuration related to the image region information generation process can be omitted. Alternatively, a more simple configuration can be used.

The present invention can also be applied to a combination of a computer program and appropriate hardware (e.g., an encoding circuit).

As described above, according to this embodiment, the image processing apparatus comprises a lossy encoding unit adapted to lossy-compress image data and a unit adapted to re-encode encoded data obtained by the encoding unit at a higher compression ratio, a lossless encoding unit adapted to losslessly compress image region information and a lossless encoding/re-encoding unit adapted to rewrite and convert the image region information into lossless compressed encoded data so as to reduce an entropy of the image region information, and a storage unit which has a predetermined capacity and can store the two types of encoded data.

When encoded data to be re-encoded and a compression setting condition are searched on the basis of the data amount of each code, an estimated code amount after re-encoding, an estimated shortest time until overflow of the total code amount, and a re-encoding process time, compression can be executed such that the total amount of the two types of codes obtained by encoding the image data and image region information decreases to a target value or less.

The third to fifth embodiments according to the present invention have been described above. Those skilled in the art can well understand that the spirit and scope of the invention are not limited to the specific descriptions and drawings of the specification, and various changes and modifications can be made within the spirit and scope as set forth in the appended claims.

As described above, according to the third to fifth embodiments, even when the total code amount has reached the set amount during compression encoding while inputting image data and image region information, control can be performed such that the degradation in image quality is minimized, and a code amount almost equal to the set amount is obtained while continuously inputting the image data and image region information.

Sixth Embodiment

In the first and second examples, if the re-encoder 109 or 211 has a low re-encoding capability, the code amount by the first encoder 202 reaches the target value again before re-encoding is ended. In this case, the encoding process cannot be continued, and the original image must be read again.

The sixth embodiment of the present invention provides a control method to solve the problem in the configuration shown in FIG. 1 by an approach different from that of the first embodiment described above.

In the sixth embodiment, first and second counters 107 and 110 measure not only generated encoded data amounts but also the numbers of symbols of the encoded data. The number of symbols is measured to accurately obtain the time required for the re-encoding process by a re-encoder 109. More specifically, re-encoding by the re-encoder 109 requires a certain time (cycle) per symbol. For this reason, when the number of symbols is determined, the time required for re-encoding of all the symbols can easily and accurately be calculated. For example, when a time of one cycle is required for one symbol, a time required for re-encode code data containing 300 symbols can be calculated as 300/1 (symbol/cycle)=300 cycles, so time information can be obtained at a high calculation accuracy. If the accuracy need not be so high, the time required for the re-encoding process may be calculated on the basis of the fact that the number of symbols and the code amount are almost proportional to each other.

Figure 34A:
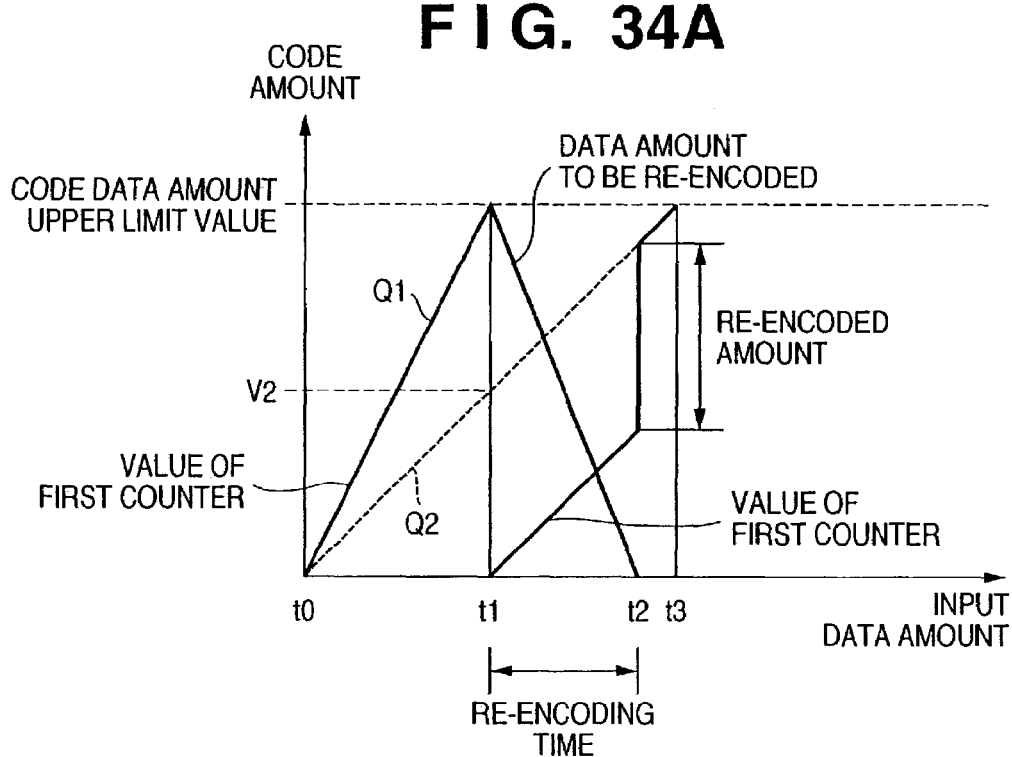
FIGS. 34A and 34B are graphs for explaining the setting principle of a re-encoding process start timing according to the sixth embodiment.

Referring to FIG. 34A, the abscissa represents the amount of input image data, and the ordinate represents the relationship with the code amount.

FIG. 34A shows a case wherein at time t0, image data input from an input unit 101 is started, and an encoder 102 starts to encode using an initial quantization step Q1, and at time t1, the code data amount counted by the first counter 107 reaches the upper limit value. At time t1, data stored in a first memory 104 is discarded. Simultaneously, a quantization step Q2 is set in the encoder 102 to encode image data input from time t1 using the quantization step Q2. At this time, the counter 107 is cleared to zero. As a result, the encoder 102 continuously encodes the image data input from time t2 using the newly set (updated) quantization step Q2. When the code data encoded using the quantization step Q1 is to be re-encoded using the quantization step Q2, the code data need not be decoded to the image data. The code data only needs to be restored to a state immediately after DCT transform and then re-encoded using the quantization step Q2. When quantization step Q2=Q1×2, the DCT transform coefficient is simply shifted to the lower side by one bit.

The data compression-encoded using the quantization step Q2 before time t1 remains in a second memory 106. The re-encoder 109 temporarily decodes the data and then re-encodes it using the quantization step Q2. Hence, the encoded data amount to be re-encode by the re-encoder 109 at time t1 is almost equal to the set upper limit value. The code amount gradually decreases as re-encoding progresses. The re-encoding process is executed until data to be re-encoded finally becomes zero. FIG. 34A indicates that the re-encoding process by the re-encoder 109 is ended at time t2. When re-encoding is completed, the code data amount and the number of symbols after re-encoding, which are counted by the second counter 110, are added to the first counter 107. At final time t3, it is determined again that the code amount has reached the upper limit value, and the above process is repeated.

No special problem is posed in the above sequence. This is because time t2≦t3. More specifically, it is because the re-encoding process by the re-encoder 109 is ended before the data amount stored in the first memory 104 reaches the upper limit value again.

Figure 34B:
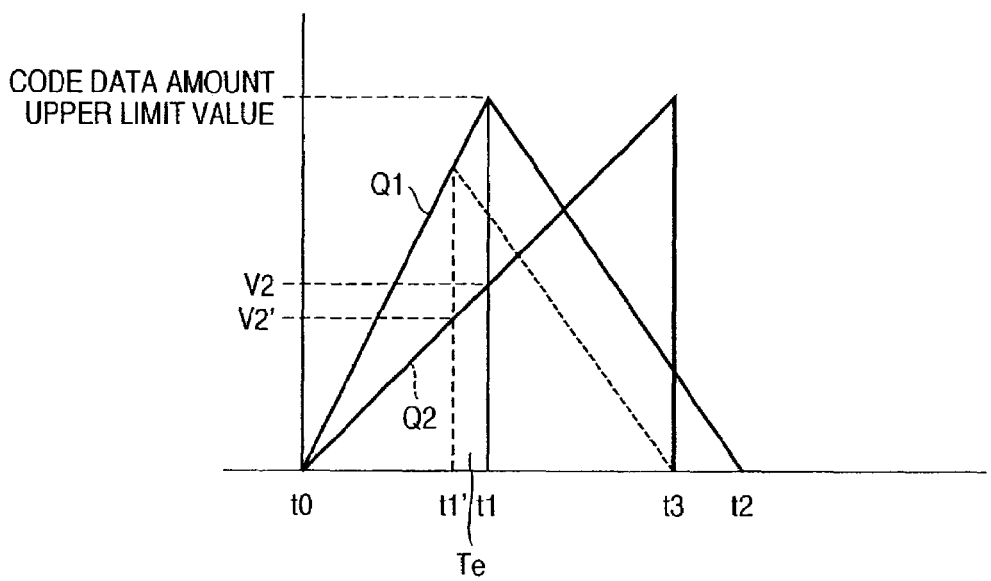

On the other hand, when time t2>t3, no normal re-encoding process can be implemented any more. FIG. 34B shows a state when t2>t3.

To avoid such a situation, the re-encoder 109 is caused to start re-encoding at time t1' before time t1 when the encoded data amount reaches the upper limit first, thereby setting the re-encoding process end time before time t3.

The time required for re-encoding is determined by the number of symbols, as described above. Hence, letting Ta be certain time, a time Tb is calculated by multiplying the number of symbols held by the first counter 107 at time Ta by the number of cycles required for each symbol. Thus, re-encoding end time t2=Ta+Tb is obtained.

On the other hand, a code amount ratio when the same image data is encoded using the quantization steps Q2 and Q1 is empirically obtain for many sample images. An average value α12 is stored in a table (not shown) This also applies to remaining quantization steps Q3, Q4, . . . , and code amount ratios are stored as α13, α14, . . . The code amount ratios may be stored not as a table but as an arithmetic equation.

Hence, when the code amount for the quantization step Q1 at time Ta is represented by V1 (actually measured value), a predicted code amount V2a for the quantization step Q2 at the same time is given by V2a=V1×α12. When coordinates are represented by {time, code amount}, predicted time t3 when the code amount reaches the upper limit value again can be calculated as time at which an extended line that connects {t0,0} and {ta,V2a} crosses the upper limit value.

In the sixth embodiment, time t3 when the code amount reaches the target value again is predicted and calculated while encoding using the quantization step Q1 is being executed, as shown in FIG. 34B. In addition, time t2 when re-encoding is completed is predicted and calculated from the number of symbols at that time. When a condition $$t2 > t3 - \Delta t \quad (\Delta t \text{ is a predetermined positive value that is empirically obtained in advance})$$

is satisfied, the same process as that executed when the code amount has reached the upper limit value is started even if the code amount does not reach the upper limit value yet.

In the above example, the encoder 102 executes encoding using the quantization step Q1, and the quantization step to be used next is Q2. However, the present invention is not limited to the above example. The present invention can also generally be applied to a case wherein the encoder 102 executes encoding using a quantization step Qn (the next quantization step is Qn+1).

Figure 35:
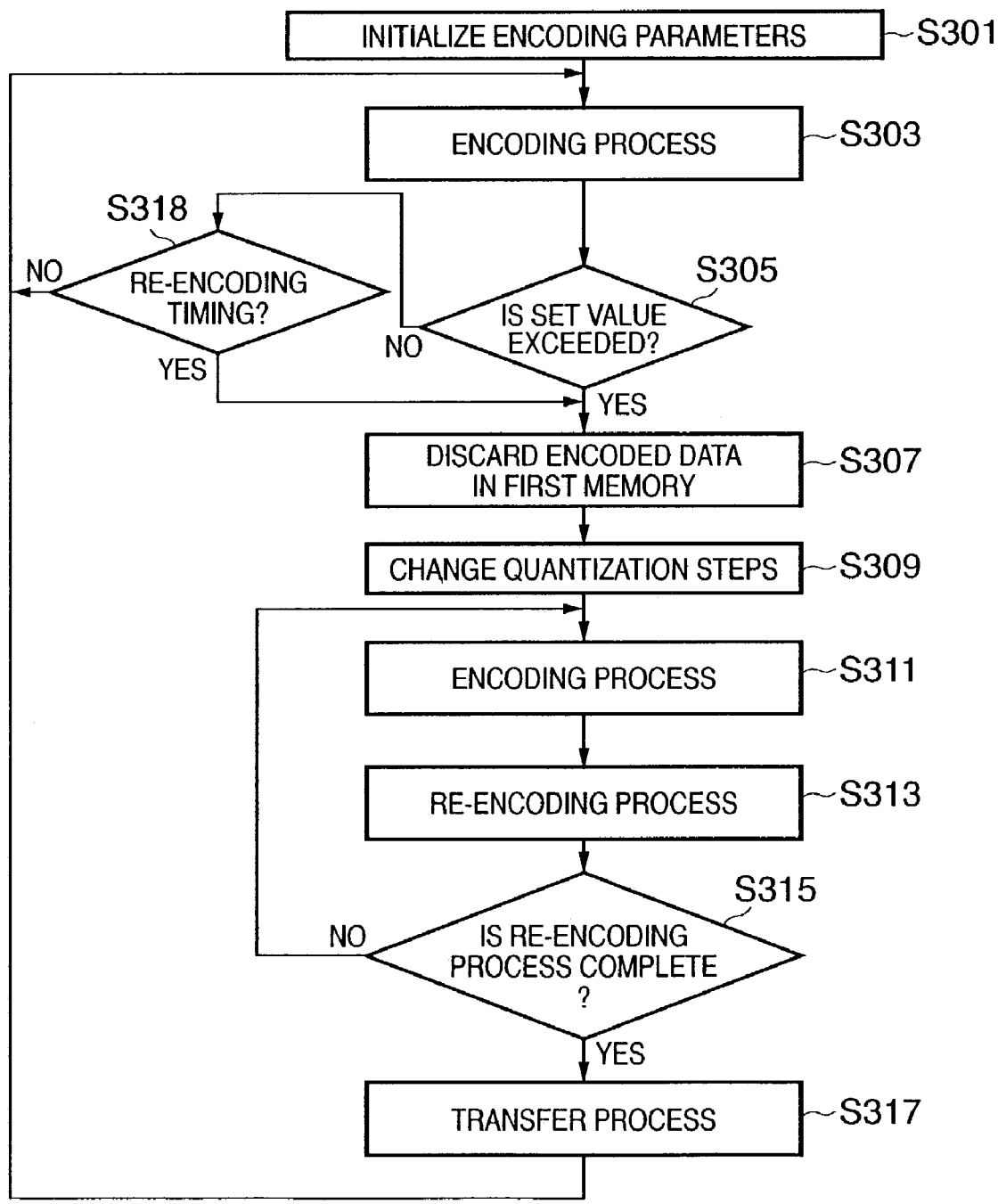
FIG. 35 is a flow chart showing a processing procedure according to the sixth embodiment.

To implement this process, the process shown in FIG. 35 is performed in place of the process shown in FIG. 3 described above, or the process shown in FIG. 36 is executed in place of the process shown in FIG. 8 (the processes shown in FIGS. 35 and 36 are executed by an encoding sequence controller 108).

Figure 36:
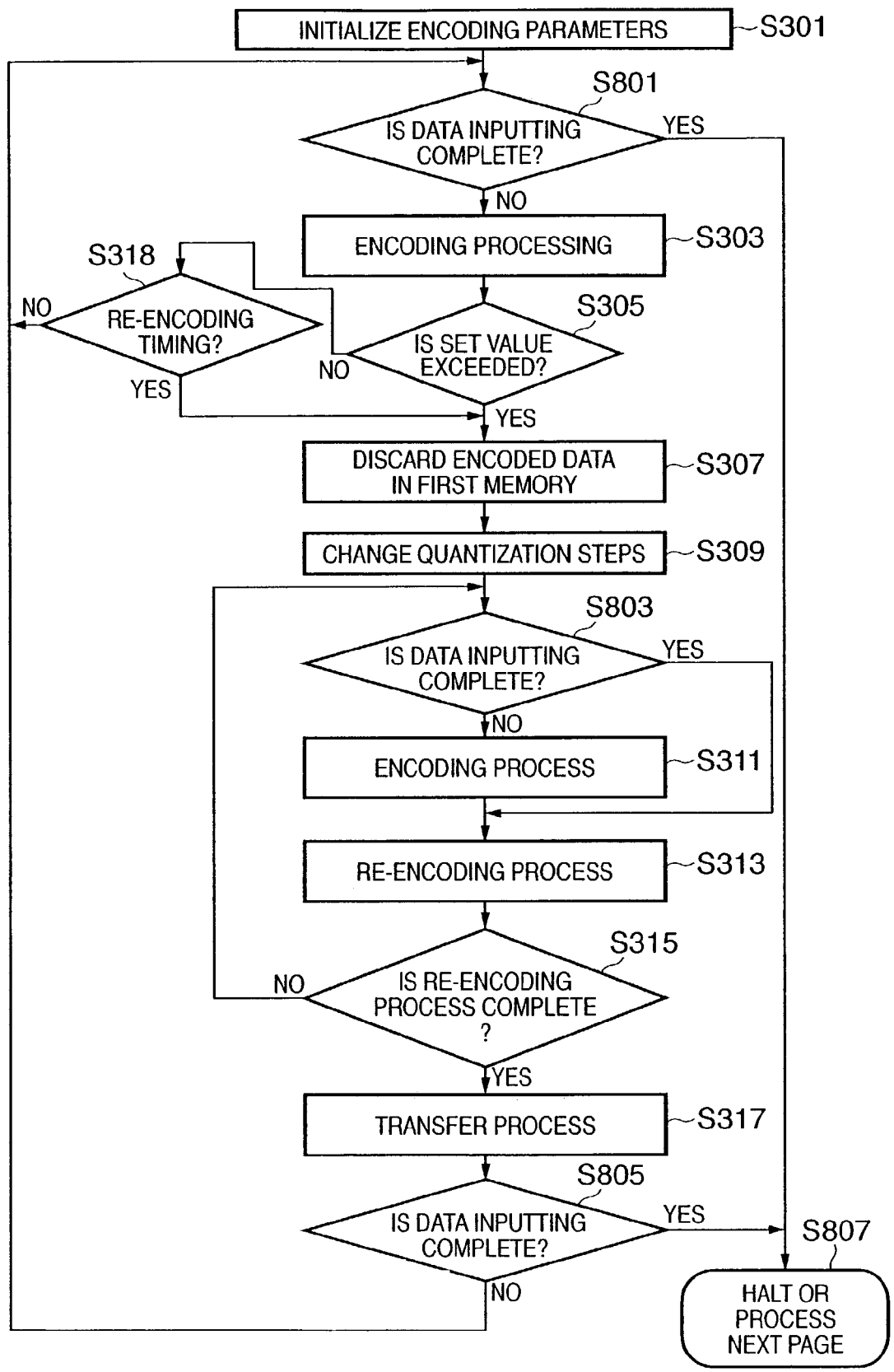
FIG. 36 is a flow chart showing a processing procedure according to the sixth embodiment.

FIG. 35 or 36 is different from FIG. 3 or 8 in that step S318 is added.

More specifically, even when it is determined in step S305 that the code amount has not reached the upper limit value yet, the flow advances to step S315 to determine whether a relation $$t2 > t3 - \Delta t \qquad (1)$$

holds between predicted time t3 when the code amount should reach the upper limit value upon encoding using the next quantization step and predicted time t2 when re-encoding by the number M of symbols at that time is ended. If this relation holds, the flow advances to step S307 to execute the same process as that executed when the code amount has reached the upper limit value. Other processes are the same as in the first example described above, and a description thereof will be omitted.

According to the above description, the re-encoding process is ended before the generated encoded data amount reaches the upper limit value again, so the image data encoding process can smoothly progress.

In the situation shown in FIG. 34B, input of one-page image data may be ended before t1. In this case, even when encoding using the quantization step Q1 is continuously performed, one-page image data is completely encoded before the code amount reaches the upper limit value. Hence, it is unnecessary to start the re-encoding process. If the re-encoding process is executed, the image data is re-encoded by the larger quantization step Q2 although the quantization step Q1 suffices. This indicates that an unnecessary process that causes a degradation in image quality is executed. Such a situation is preferably avoided.

Hence, in addition to inequality (1) that represents a condition for determining the timing of start of re-encoding in step S318 in FIG. 35 or 36, the condition of the encoding end time for a one-page image must also be taken into consideration.

The encoder 102 according to this embodiment executes JPEG encoding for every block of 8×8 pixels. In other words, every time one block is completely encoded, the next block is input and encoded. Let Tb be the average encoding time of one-block pixel data, M be the total number of blocks of one page (this value is uniquely determined by the input image size), N be the ordinal number of the block that is currently being encoded, and Tc be the current time.

Predicted time Te when one page should be completely encoded is given by $$Te = Tc + (M-N) \times Tb$$

To calculate time Te, the first counter 107 counts the number of blocks of encoded data output from the encoder 102 as well as the encoded data amount and the number of symbols. Needless to say, the counted number of blocks is reset at the time of starting encoding of one page. Even when the code amount has reached the upper limit value, the number of blocks is not reset (cleared to zero).

On the other hand, let Vc be the encoded data size counted by a first counter 208 at the current time Tc. The code amount ΔV per block in the past can be calculated by Vc/N. Let Vmax be the upper limit value. Predicted time T1 when the encoded data amount counted by the first counter 208 should reach the upper limit value Vmax if the encoding process by the encoder 102 is continued is given by $$T1 = Tc + \{(Vmax - Vc)/\Delta V\} \times Tb$$

Hence, when

Te ≦ T1 the re-encoding process need not be started. It is yet necessary to ensure the security, so when the allowable error is represented by ε(>0), and $$Te \leq T1 - \epsilon$$

is satisfied, the re-encoding process is not performed.

That is, the flow advances from step S318 to step S307 in FIG. 35 or 36 to start re-encoding when two conditions, $$Te > T1 - \epsilon \quad (3)$$

and $$t2 > t3 - \Delta t \quad (4)$$

are satisfied. If at least one of the two conditions is not satisfied, the encoding process using the current quantization step is continued. Since both Te and T1 contain the Tc component, Tc may be eliminated. In this case, Te represents the time from the current time to the time at which encoding of one page is ended, and T1 represents the time from the current time to the time at which the code amount reaches the upper limit value.

In the above-described way, the encoded data amount can be reduced to the target encoded data amount or less by inputting image data once while minimizing the degradation in image quality and preventing any interrupt of the series of encoding processes.

Needless to say, when an image is read by an image scanner or the like, time Te when one-page image data is completely encoded is the same as the time when the one-page image data is completely read.

In the above example, the time when the code amount reaches the upper limit value for the first time is compared with the time when one-page image data is completely encoded. However, this relationship also applies to the time when the code amount reaches the upper limit value again after re-encoding and the time when one-page image data is completely encoded, so FIGS. 18 and 19 are not corrected.

Seventh Embodiment

The sixth embodiment is based on the configuration shown in FIG. 1. The seventh embodiment based on the configuration shown in FIG. 2 will be described below.

FIG. 2 is different from FIG. 1 in that two encoders execute compression encoding in parallel.

In the sixth embodiment, while compression encoding by a quantization step Qn is being executed, the code amount for a quantization step Qn+1 is estimated. In addition, time t3 when the code amount should reach the upper limit value if compression encoding is executed using the quantization step Qn+1 is predicted and calculated.

On the other hand, in the seventh embodiment, a first encoder 202 executes compression encoding using the quantization step Qn, and a second encoder 205 executes compression encoding using the quantization step Qn+1. That is, time t3 when the code amount for the quantization step Qn+1 reaches the upper limit value can be calculated on the basis of the actual encoded data amount, and the accuracy can be further increased as compared to the sixth embodiment. In other words, Δt in the sixth embodiment can be made smaller, and the timing of start of re-encoding can be delayed.

When the embodiment is applied to FIG. 2, a first counter 208 only needs to count the encoded data amount by the encoder 202. The first counter 208 need not count the number of symbols. Instead, a second counter 210 and third counter 212 count the encoded data mount and the number of symbols.

The outline of operation according to the seventh embodiment will be described below.

In the initial state, the first encoder 202 executes the compression encoding process on the basis of a quantization step Q1. Generated encoded data is stored in a first memory 204. The second encoder 205 executes compression encoding using a quantization step Q2 larger than the quantization step Q1 by one step. The compression encoding result is stored in a second memory 207. The first counter 208 cumulatively counts the encoded data amount output from the first encoder 202. The second counter 210 cumulatively counts the encoded data amount output from the second encoder 205.

When an image of one page is completely input, and the code amount counted by the first counter 208 is equal to or smaller than the set value, the encoded data stored in the first memory 204 is output to the outside as final compression-encoded data.

A case wherein the code amount output from the first encoder 202 has reached the set value while the image of one page is being input will be described with reference to FIGS. 37A and 37B.

Figure 37A:
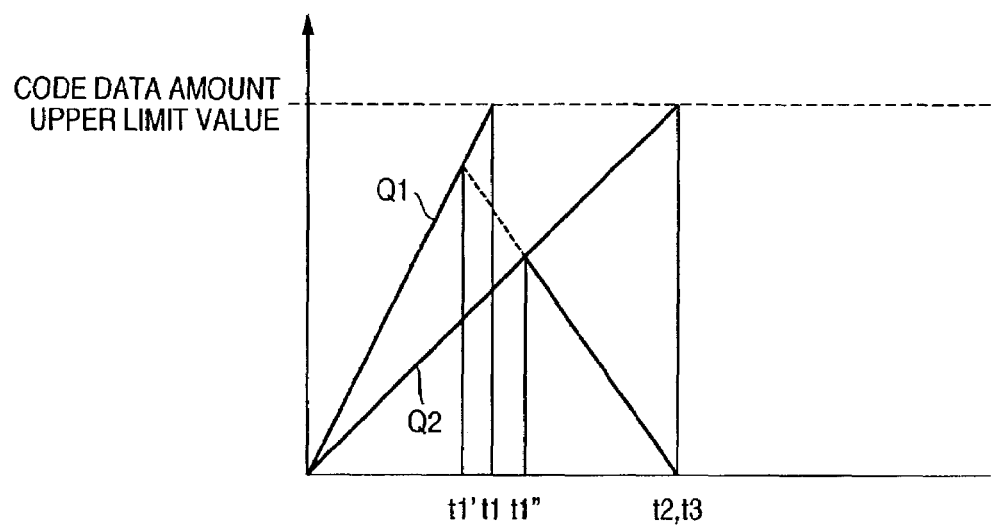
FIGS. 37A and 37B are graphs for explaining the setting principle of a re-encoding process start timing according to the seventh embodiment.

Referring to FIG. 37A, assume that it is determined that the encoded data amount counted by the first counter 208 has reached the set upper limit value. At this time, the data in the first memory 204 is discarded, the data in the second memory 207 is transferred to the first memory 204, and the quantization step used by the first encoder 202 is updated to the quantization step Q2 used by the second encoder 205 at that time. As a result, a configuration equivalent to that when an image of one page is compressed by the quantization step Q2 from the beginning is obtained. For the second encoder 205, a quantization step Q3 is set to obtain a higher compression ratio. Image data input from time t1 is compression-encoded by the quantization step Q3. The encoded data already stored in the second memory 207 at time t1 is encoded data based on the quantization step Q2. The data must be re-encoded using the quantization step Q3. This re-encoding process is executed by a re-encoder 211.

Time t2 when re-encoding by the quantization step Q3 is ended must be before time t3 when the code amount by the first encoder 202 which has started encoding using the quantization step Q2 reaches the upper limit value again.

That is, re-encoding by the re-encoder 211 must be started at a timing before time t1" in FIG. 37A.

In the sixth embodiment, re-encoding must be started before time t' in FIG. 20. In the configuration shown in FIG. 2, an excess time corresponding to t1"–t1' can be obtained.

As is apparent from FIG. 37A, the re-encoding process by the re-encoder 211 only needs to be executed for the encoded data in the second memory 207. This is not directly relevant to the code amount by the first encoder 202. Hence, although the second counter 210 and third counter 212 must count the encoded data amount and the number of symbols, the first counter 208 needs to count only the encoded data amount.

In FIG. 37A, the quantization steps set in the first encoder 202 and second encoder 205 are updated at the timing t1. Actually, the re-encoding process by the re-encoder 211 is started at time t1. An example when the code amount reaches the upper limit value for the first time has been described above. For the second and subsequent times, the process contents are the same as described above except the quantization steps set in the encoders 202 and 210 and the re-encoder 211.

Figure 37B:
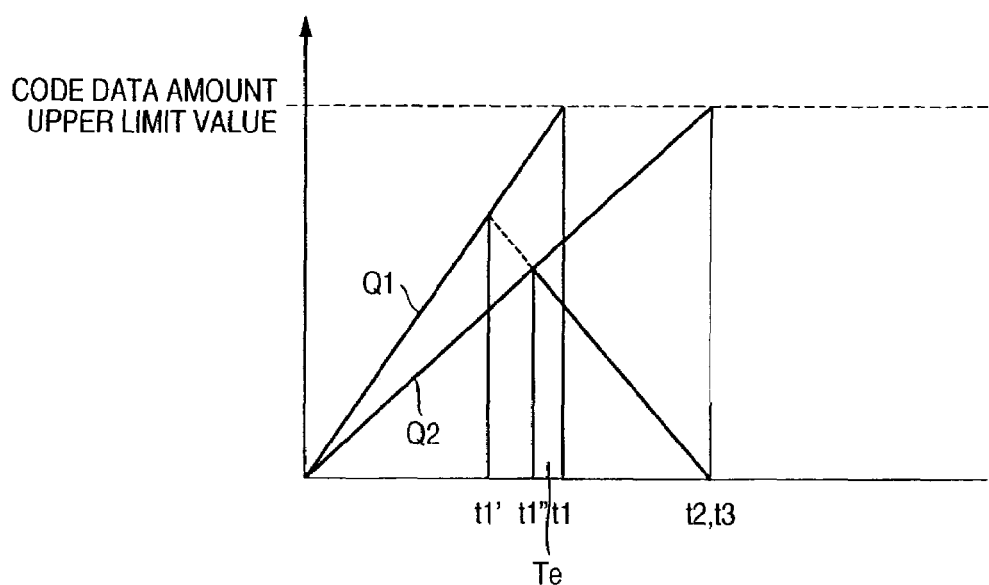

FIG. 37B shows a state wherein even when re-encoding by the re-encoder 211 is started at time t1 when the encoded data amount counted by the first counter 208 has reached the upper limit value, the re-encoding process cannot be completed before time t3 when the code amount for the quantization step Q2 reaches the upper limit value again. That is, the process by the re-encoder 211 must be started before time t1" in FIG. 37B.

For this determination, time t2 required for the re-encoding process by the re-encoder 211 is calculated on the basis of the number of symbols held by the second counter 210. In addition, predicted time t3 when the code amount reaches the upper limit value again is calculated on the basis of the code amount at that time. When a relation $$t2 > t3 - \Delta t$$

holds, the process is started regarding that the code amount in the first counter 208 has reached the upper limit value even when the code amount has not reached the upper limit value yet.

According to FIG. 37B, the time when re-encoding must start is t1", so an excess time can be obtained as compared to time t1' in the first embodiment.

Figure 38:
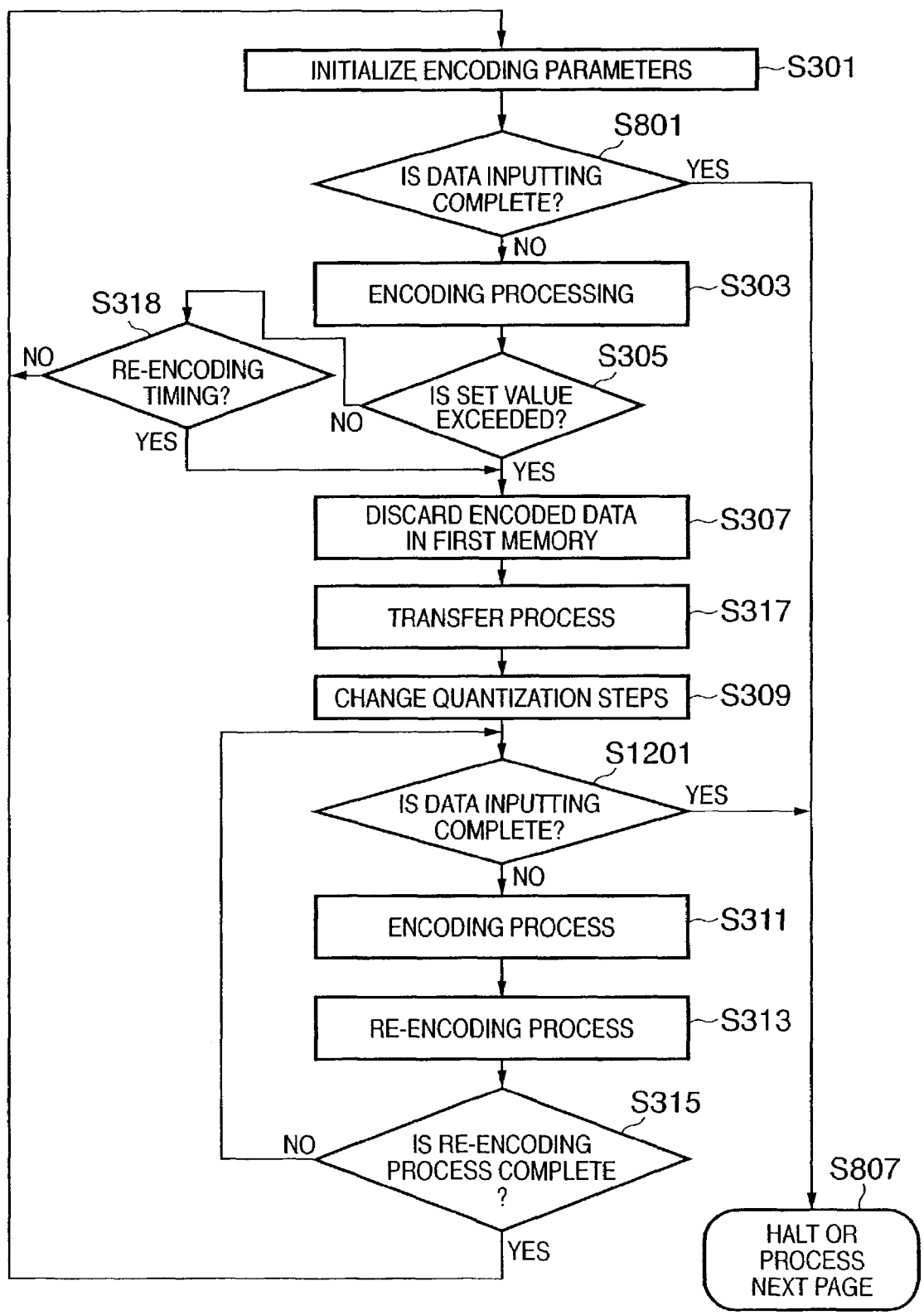
FIG. 38 is a flow chart showing a processing procedure according to the seventh embodiment.

To implement the above process, the process shown in FIG. 38 is executed in place of, e.g., the process shown in FIG. 12. FIG. 38 is different from FIG. 12 in that step S318 is added.

More specifically, even when it is determined in step S305 that the code amount has not reached the upper limit value yet, the flow advances to step S318 to determine on the basis of the code amount and the number of symbols, which are held by the second counter 210, whether the relation $$t2 > t3 - \Delta t$$

holds between predicted time t3 when the code amount should reach the upper limit value by executing encoding using the next quantization step and predicted time t2 when re-encoding by the number of symbols at that time should be completed. If the relation holds, the flow advances to the process in step S307 to execute the same process as that executed when the code amount has reached the upper limit value. The remaining processes are the same as in the first example described above, and a description thereof will be omitted.

When the function of the seventh embodiment is implemented, an encoding sequence controller 209 also refers to information (the encoded data amount and the number of symbols in this embodiment) held in the second counter 210. For this reason, not the configuration shown in FIG. 2 but that shown in FIG. 39 is used. FIG. 39 is different from FIG. 2 only in that the encoding sequence controller 209 can directly refer to the data in the second counter 210, and a detailed description thereof will be omitted.

According to the above description, the seventh embodiment can have the same functions and effects as those of the sixth embodiment. Additionally, in the seventh embodiment, since two encoders execute the encoding process in parallel, an extra time can be produced in the re-encoding process by using the configuration. This is advantageous when the process corresponding to FIG. 2 is implemented by a computer program. When image data is compression-encoded by, e.g., a personal computer, an unexpected process may occur in another task. Hence, it is preferable that the process be executed with an extra time. The time required for the re-encoding process can be calculated on the basis of the encoded data amount. However, when the number of symbols is used, the time can be more accurately calculated.

Even in the seventh embodiment, it is preferably determined in consideration of the encoding end time of one-page image data whether re-encoding should be executed, as in the sixth embodiment described above.

More specifically, in the situation shown in FIG. 37B, i.e., when encoding end time Te of one page is before time t1, it is determined that re-encoding is unnecessary. When this process is adapted to the seventh embodiment, the same principle as in the first embodiment can be applied, although the seventh embodiment is different from the first embodiment in that the two encoders 202 and 205 execute encoding in parallel.

More specifically, let Tb be the average encoding time of one-block pixel data in the encoder 202, M be the total number of blocks of one page (this value is uniquely determined by the input image size), N be the ordinal number of the block that is currently being encoded, and Tc be the current time. Predicted time Te when one page should be completely encoded is given by $$Te = Tc + (M-N) \times Tb$$

On the other hand, let Vc be the encoded data size counted by a first counter 208 at the current time Tc. The code amount $\Delta V$ per block in the past can be calculated by Vc/N. Let Vmax be the upper limit value. Predicted time T1 when the encoded data amount counted by the first counter 208 should reach the upper limit value Vmax if the encoding process by the encoder 102 is continued is given by $$T1 = Tc + \{(Vmax - Vc)/\Delta V\} \times Tb$$

Hence, when $$Te \leq T1$$

the re-encoding process need not be started. It is yet necessary to ensure the security, so when the allowable error is represented by $\epsilon (>0)$, and $$Te \leq T1 - \epsilon$$

is satisfied, the re-encoding process is not performed.

Hence, as in <Improvement Example of Sixth Embodiment>, the flow advances from step S318 to step S307 in FIG. 38 to start re-encoding when two conditions, $$Te > T1 - \epsilon \tag{3}$$

and $$t2 > t3 - \Delta t \tag{4}$$

are satisfied. If at least one of the two conditions is not satisfied, the encoding process using the current quantization step is continued.

In the above-described way, the encoded data amount can be reduced to the target encoded data amount or less by inputting image data once while minimizing the degradation in image quality and preventing any interrupt of the series of encoding processes, as in the sixth embodiment.

In the sixth and seventh embodiments, an example of monochrome image input has been described. For a color image, finer adjustment can be performed. When a color image is encoded, luminance data (Y) and two color difference data (C) are obtained by known color conversion. Hence, the following relationship is obtained. Y represents the luminance, C represents the color difference, QYi (i=1, 2, 3, . . . ) represents the quantization step for the luminance component, and QCi (i=1, 2, 3, . . . ) represents the quantization step for the color difference component. When the value i increases, the quantization step increases.

| Preceding quantization step | | Quantization step candidate |
| --- | --- | --- |
| (QY1, QC1) | → | (QY1, QC2), (QY2, QC2), (QY2, QC3), (QY3, QC3) . . . |
| (QY1, QC2) | → | (QY2, QC2), (QY2, QC3), (QY3, QC3), (QY3, QC4) . . . |
| (QY2, QC2) | → | (QY2, QC3), (QY3, QC3), (QY3, QC4), (QY4, QC4) . . . |

In the embodiments, an example in which the compression ratio is increased by increasing the quantization step. However, as is apparent from the above embodiments, any other encoding scheme in which the compression ratio can be changed by changing a parameter can be applied, so the parameter is not limited to the quantization step. For example, according to JPEG2000, data can be compressed for each layer by entropy encoding after quantization. A layer at a higher level is more dominant for the image quality. Hence, the compression ratio can be changed by, e.g., truncating i layers from the lowermost layer.

As described above, according to the embodiments, the encoded data amount can reliably be decreased to the target code amount or less while continuously inputting an image with a relatively simple configuration. In addition, the degradation in image quality can be suppressed as much as possible.

When the configuration is implemented by a computer program, "$\epsilon$" and "$\Delta t$" in inequalities (3) and (4) are preferably freely be changed by the user because computers have various processing capabilities.

As described above, since each embodiment of the present invention can be implemented by an application program that runs on a general-purpose apparatus, the present invention also incorporates a computer program. A computer program is executed normally by setting a storage medium such as a floppy (registered trademark) disk or CD-ROM in the apparatus and copying or installing the program. Hence, such a storage medium is also incorporated in the present invention. In addition, the present invention can also be applied to a combination of a computer program and appropriate hardware (e.g., an encoding circuit).

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for compression-encoding image data, comprising:
   a first compression encoding unit in which a quantization step can be changed;
   a second compression encoding unit in which the quantization step can be changed and which is adapted to decode and re-encode code data compressed by said first compression encoding unit;
   a code amount monitor unit adapted to monitor a code amount generated by said first compression encoding unit and determine whether the code data amount has reached a predetermined amount;
   a setting unit adapted to, when said code amount monitor unit determines that the code amount has reached the predetermined amount, determine and set a next quantization step in each of said first and second compression encoding units; and
   a control unit adapted to, when the quantization step is changed by said setting unit, cause said second compression encoding unit to re-encode the preceding code data precedingly generated by said first compression encoding unit, store the code data that has undergone re-encoding in a predetermine storage unit as code data after a parameter of said first compression encoding unit is changed, and store the code data generated by said first compression encoding unit in said storage unit as subsequent code data,
   wherein said setting unit includes a unit adapted to compare first predicted time required for re-encoding by said second compression encoding unit for the preceding code data with second predicted time when the code amount reaches the predetermined amount again in encoding in said first compression encoding unit and obtain the quantization step for which the first predicted time is shorter than the second predicted time so as to determine the quantization step to be set for each of said first and second compression encoding units.

2. The apparatus according to claim 1, wherein the first and second predicted times are stored in tables in advance.

3. The apparatus according to claim 1, wherein said code amount monitor unit also monitors the number of symbols.

4. An image processing method of compression-encoding image data, comprising:
   a first compression encoding step in which a quantization step can be changed;
   a second compression encoding step, in which the quantization step can be changed, of decoding and re-encode code data compressed in said first compression encoding step;
   a code amount monitor step of monitoring a code amount generated in said first compression encoding step and determining whether the code data amount has reached a predetermined amount;
   a setting step of, when it is determined in said code amount monitor step that the code amount has reached the predetermined amount, determining and setting a next quantization step in each of said first and second compression encoding steps; and a control step of, when the quantization step is changed in said setting step, executing said second compression encoding step to re-encode the preceding code data precedingly generated in said first compression encoding step, storing the code data that has undergone re-encoding in a predetermine storage unit as code data after a parameter in said first compression encoding step is changed, and storing the code data generated in said first compression encoding step in the storage unit as subsequent code data, wherein said setting step includes a step of comparing a first predicted time required for re-encoding in said second compression encoding step for the preceding code data with a second predicted time when the code amount reaches the predetermined amount again in encoding in said first compression encoding step and obtaining the quantization step for which the first predicted time is shorter than the second predicted time so as to determine the quantization step to be set in each of said first and second compression encoding steps.

5. A computer program stored in a computer-readable medium which is loaded and executed by a computer and causes the computer to function as an image processing apparatus for compression-encoding image data, wherein the computer program cause the computer to function as:

a first compression encoding unit in which a quantization step can be changed;

a second compression encoding unit in which the quantization step can be changed and which is adapted to decode and re-encode code data compressed by said first compression encoding unit;

a code amount monitor unit adapted to monitor a code amount generated by said first compression encoding unit and determine whether the code data amount has reached a predetermined amount;

a setting unit adapted to, when said code amount monitor unit determines that the code amount has reached the predetermined amount, determine and set a next quantization step in each of said first and second compression encoding units; and a control unit adapted to, when the quantization step is changed by said setting unit, cause said second compression encoding unit to re-encode the preceding code data precedingly generated by said first compression encoding unit, store the code data that has undergone re-encoding in a predetermine storage unit as code data after a parameter of said first compression encoding unit is changed, and store the code data generated by said first compression encoding unit in said storage unit as subsequent code data, wherein said setting unit functions as a unit adapted to compare a first predicted time required for re-encoding by said second compression encoding unit for the preceding code data with a second predicted time when the code amount reaches the predetermined amount again in encoding in said first compression encoding unit and obtain the quantization step for which the first predicted time is shorter than the second predicted time so as to determine the quantization step to be set for each of said first and second compression encoding units.

6. A computer-readable recording medium storing a computer program of claim 5.

7. An image processing apparatus for inputting and compression-encoding image data, comprising:

a first compression encoding unit in which a quantization step can be changed;

a second compression encoding unit in which the quantization step can be changed and which is adapted to compression-encode the image data using a quantization step larger than at least that of said first compression encoding unit;

a third compression encoding unit in which the quantization step can be changed and which is adapted to decode and re-encode code data compressed by said second compression encoding unit;

a monitor unit adapted to monitor a code data amount generated by said first compression encoding unit while the image data that is being input is being compressed by said first and second compression encoding units and determine whether the code data amount has reached a predetermined amount;

a quantization step updating unit adapted to, when said monitor unit determines that the code amount has reached the predetermined amount, update the quantization step of said first compression encoding unit to the quantization step set in said second compression encoding unit and update each of the quantization steps of said second and third compression encoding units to a larger quantization step; and a compression encoding control unit adapted to, when said monitor unit determines that the code amount has reached the predetermined amount, update preceding code data precedingly generated by said second compression encoding unit as preceding code data of said first compression encoding unit and cause said third compression encoding unit to re-encode and update the preceding code data from said second compression encoding unit, wherein said quantization step updating unit includes a unit adapted to compare first predicted time required for re-encoding by said third compression encoding unit for the preceding code data from said second compression encoding unit with second predicted time when the code amount reaches the predetermined amount again in encoding in said first compression encoding unit and obtain the quantization step for which the first predicted time is shorter than the second predicted time so as to determine the second and third quantization steps.

8. The apparatus according to claim 7, wherein the first and second predicted times are stored in tables in advance.

9. The apparatus according to claim 7, wherein said monitor unit also monitors the number of symbols.

10. An image processing method of inputting and compression-encoding image data, comprising:

a first compression encoding step in which a quantization step can be changed;

a second compression encoding step, in which the quantization step can be changed, of compression-encoding the image data using a quantization step larger than at least that of said first compression encoding step;

a third compression encoding step, in which the quantization step can be changed, of decoding and re-encoding code data compressed in said second compression encoding step;

a monitor step of monitoring a code data amount generated in said first compression encoding step while the image data that is being input is being compressed in said first and second compression encoding steps and determining whether the code data amount has reached a predetermined amount;

a quantization step updating step of, when it is determined in said monitor step that the code amount has reached the predetermined amount, updating the quantization step of said first compression encoding step to the quantization step set in said second compression encoding step and updating each of the quantization steps of said second and third compression encoding steps to a larger quantization step; and a compression encoding control step of, when it is determined in said monitor step that the code amount has reached the predetermined amount, updating preceding code data precedingly generated in said second compression encoding step as preceding code data of said first compression encoding step and executing said third compression encoding step to re-encode and update the preceding code data in said second compression encoding step, wherein the quantization step updating step includes a step of comparing a first predicted time required for re-encoding in said third compression encoding step for the preceding code data in said second compression encoding step with a second predicted time when the code amount reaches the predetermined amount again in encoding in said first compression encoding step and obtaining the quantization step for which the first predicted time is shorter than the second predicted time so as to determine said second and third quantization steps.

11. A computer program stored in a computer-readable medium which is loaded and executed by a computer and causes the computer to function as an image processing apparatus for inputting and compression-encoding image data, wherein the computer program cause the computer to function as:

a first compression encoding unit in which a quantization step can be changed;

a second compression encoding unit in which the quantization step can be changed and which is adapted to compression-encode the image data using a quantization step larger than at least that of said first compression encoding unit;

a third compression encoding unit in which the quantization step can be changed and which is adapted to decode and re-encode code data compressed by said second compression encoding unit;

a monitor unit adapted to monitor a code data amount generated by said first compression encoding unit while the image data that is being input is being compressed by said first and second compression encoding units and determine whether the code data amount has reached a predetermined amount;

a quantization step updating unit adapted to, when said monitor unit determines that the code amount has reached the predetermined amount, update the quantization step of said first compression encoding unit to the quantization step set in said second compression encoding unit and update each of the quantization steps of said second and third compression encoding units to a larger quantization step; and a compression encoding control unit adapted to, when said monitor unit determines that the code amount has reached the predetermined amount, update preceding code data precedingly generated by said second compression encoding unit as preceding code data of said first compression encoding unit and cause said third compression encoding unit to re-encode and update the preceding code data from said second compression encoding unit, wherein said quantization step updating unit functions as a unit adapted to compare a first predicted time required for re-encoding by said third compression encoding unit for the preceding code data from said second compression encoding unit with a second predicted time when the code amount reaches the predetermined amount again in encoding in said first compression encoding unit and obtain the quantization step for which the first predicted time is shorter than the second predicted time so as to determine the second and third quantization steps.

12. A computer-readable storage medium storing a computer program of claim 11.

13. An image processing method of compression-encoding image data and image region information of the image data, comprising:

a first lossy compression step in which a compression parameter can be changed and which is executed for the image data;

a second lossy compression step, in which the compression parameter can be changed and which is executed for the image data, of decoding a code compressed in said first lossy compression step and lossy-compressing the code again;

a first lossless compression step in which the compression parameter can be changed and which is executed for the image region information;

a second lossless compression step, in which the compression parameter can be changed and which is executed for the image region information, of decoding the code compressed in said first lossless compression step, converting a specific image region value of the image region information obtained by decoding into another image region value in accordance with the compression parameter, and losslessly compressing the code again;

a code amount monitor step of determining whether a total code amount of the code amounts generated in said first lossy compression step and said first lossless compression step has reached a predetermined amount while the codes are being compression-encoded in said first lossy compression step and said first lossless compression step;

a determination step of, when it is determined in said code amount monitor step that the total code amount has reached the predetermined amount, determining information for which the compression parameter is to be changed on the basis of a correlation between the code amount in said first lossy compression step and that in said first lossless compression step; and a control step of, when it is determined in said determination step that the information for which the compression parameter is to be changed is the image data, updating the compression parameters in said first and second lossy compression steps, executing said first lossy compression step to compress image data input after it is determined that the code amount has reached the predetermined amount, and executing said second lossy compression step to lossy-compress again image data compression-encoded before it is determined that the code amount has reached the predetermined amount, and when it is determined in said determination step that the information for which the compression parameter is to be changed is the image region information, updating the compression parameters in said first and second lossless compression steps, executing said first lossy compression step to compress image region information input after it is determined that the code amount has reached the predetermined amount, and executing said second lossless compression step to losslessly compress again image region information compression-encoded before it is determined that the code amount has reached the predetermined amount.

14. The method according to claim 13, wherein in said determination step, the compression parameter is updated on the basis of a preset ratio of the code amount of the image data to the code amount of the image region information and a ratio of the code amount in said first lossy compression step to the code amount in said first lossless compression step.

15. The method according to claim 13, wherein said determination step includes
   a first step of temporarily determining the information for which the compression parameter is to be updated and the compression parameter on the basis of a preset ratio of the code amount of the image data to the code amount of the image region information and a ratio of the code amount in said first lossy compression step to the code amount in said first lossless compression step,
   a second step of calculating a re-compression expected time required for re-compression for the information for which the compression parameter is to be updated and the compression parameter, which are temporarily determined in said first step, and a predicted reaching time when the code amount reaches the set amount again,
   a third step of, when a condition re-compression expected time<predicted reaching time is satisfied in said second step, defining, as a final determination, the information for which the compression parameter is to be updated and the compression parameter, which are temporarily determined, and
   a fourth step of, when the condition is not satisfied, repeatedly executing said first to third steps while setting an estimated code amount of the image data and an estimated code amount of the image region information when it is assumed that compression encoding is executed on the basis of the temporary determination as the code amount of the image data and the code amount of the image region information in said first step.

16. The method according to claim 15, wherein in said first step, when the information for which the compression parameter is to be updated and the compression parameter are determined, a compression parameter for a lower compression ratio is temporarily determined as a compression parameter of the other information for which the compression parameter is to be updated.

17. An image processing apparatus for compression-encoding image data and image region information of the image data, comprising:
   a first lossy compression unit in which a compression parameter can be changed and which is arranged for the image data;
   a second lossy compression unit in which the compression parameter can be changed and which is arranged for the image data and adapted to decode a code compressed by said first lossy compression unit and lossy-compress the code again;
   a first lossless compression unit in which the compression parameter can be changed and which is arranged for the image region information;
   a second lossless compression unit in which the compression parameter can be changed and which is arranged for the image region information and adapted to decode the code compressed by said first lossless compression unit, convert a specific image region value of the image region information obtained by decoding into another image region value in accordance with the compression parameter, and losslessly compress the code again;
   a code amount monitor unit adapted to determine whether a total code amount of the code amounts generated by said first lossy compression unit and said first lossless compression unit has reached a predetermined amount while the codes are being compression-encoded by said first lossy compression unit and said first lossless compression unit;
   a determination unit adapted to, when said code amount monitor unit determines that the total code amount has reached the predetermined amount, determine information for which the compression parameter is to be changed on the basis of a correlation between the code amount from said first lossy compression unit and that from said first lossless compression unit; and
   a control unit adapted to, when said determination unit determines that the information for which the compression parameter is to be changed is the image data, update the compression parameters in said first and second lossy compression units, cause said first lossy compression unit to compress image data input after it is determined that the code amount has reached the predetermined amount, and cause said second lossy compression unit to lossy-compress again image data compression-encoded before it is determined that the code amount has reached the predetermined amount, and
   when said determination unit determines that the information for which the compression parameter is to be changed is the image region information, update the compression parameters in said first and second lossless compression units, cause said first lossy compression unit to compress image region information input after it is determined that the code amount has reached the predetermined amount, and cause said second lossless compression unit to losslessly compress again image region information compression-encoded before it is determined that the code amount has reached the predetermined amount.

18. A computer program stored in a computer-readable medium which functions as an image processing apparatus for compression-encoding image data and image region information of the image data, wherein the computer program functions as:
   a first lossy compression unit in which a compression parameter can be changed and which is arranged for the image data;
   a second lossy compression unit in which the compression parameter can be changed and which is arranged for the image data and adapted to decode a code compressed by said first lossy compression unit and lossy-compress the code again;
   a first lossless compression unit in which the compression parameter can be changed and which is arranged for the image region information;
   a second lossless compression unit in which the compression parameter can be changed and which is arranged for the image region information and adapted to decode the code compressed by said first lossless compression unit, convert a specific image region value of the image region information obtained by decoding into another image region value in accordance with the compression parameter, and losslessly compress the code again;

a code amount monitor unit adapted to determine whether a total code amount of the code amounts generated by said first lossy compression unit and said first lossless compression unit has reached a predetermined amount while the codes are being compression-encoded by said first lossy compression unit and said first lossless compression unit;

a determination unit adapted to, when said code amount monitor unit determines that the total code amount has reached the predetermined amount, determine information for which the compression parameter is to be changed on the basis of a correlation between the code amount from said first lossy compression unit and that from said first lossless compression unit; and a control unit adapted to, when said determination unit determines that the information for which the compression parameter is to be changed is the image data, update the compression parameters in said first and second lossy compression units, cause said first lossy compression unit to compress image data input after it is determined that the code amount has reached the predetermined amount, and cause said second lossy compression unit to lossy-compress again image data compression-encoded before it is determined that the code amount has reached the predetermined amount, and when said determination unit determines that the information for which the compression parameter is to be changed is the image region information, update the compression parameters in said first and second lossless compression units, cause said first lossy compression unit to compress image region information input after it is determined that the code amount has reached the predetermined amount, and cause said second lossless compression unit to losslessly compress again image region information compression-encoded before it is determined that the code amount has reached the predetermined amount.

19. A computer-readable storage medium storing a computer program of claim 18.

20. An image processing method of compression-encoding image data and image region information of the image data, comprising:
a first lossy compression encoding step in which a compression parameter can be changed and which is executed for the image data;
a second lossy compression encoding step, in which the compression parameter can be changed and which is executed for the image data, of compression-encoding the image data using a compression parameter for a higher compression ratio than in said first lossy compression encoding step;
a third lossy compression encoding step, which is executed for the image data, of decoding and re-encoding code data compressed in said second lossy compression encoding step;
a first lossless compression encoding step in which the compression parameter can be changed and which is executed for the image region information;
a second lossless compression encoding step, in which the compression parameter can be changed and which is executed for the image region information, of compression-encoding the image region information using a compression parameter for a higher compression ratio than in the first lossless compression encoding step;
a third lossless compression encoding step, which is executed for the image region information, of decoding and re-encoding code data compressed in said second lossless compression encoding step;
a code amount monitor step of determining whether a total code amount of the code amounts generated in said first lossy compression encoding step and said first lossless compression encoding step has reached a predetermined amount while the codes are being compression-encoded in said first lossy compression encoding step and said first lossless compression encoding step;
a determination step of, when it is determined in the code amount monitor step that the total code amount has reached the predetermined amount, determining information for which the compression parameter is to be changed, on the basis of a correlation between the code amount by said first lossy compression encoding step and the code amount by said first lossless compression encoding step; and
a control step of controlling said first to third lossy compression encoding steps and said first to third lossless compression encoding steps on the basis of contents determined in said determination step,
wherein in said control step,
when it is determined in said determination step that the information for which the compression parameter is to be changed is the image data,
the compression parameters in said first and second lossy compression encoding steps are updated,
said first lossy compression encoding step is executed to take over said second lossy compression encoding step and continue the compression process, and
said third lossy compression encoding step is executed to re-encode the image data compression-encoded in said second lossy compression encoding step before it is determined that the total code amount has reached the predetermined amount, and
when it is determined in said determination step that the information for which the compression parameter is to be changed is the image region information,
the compression parameters in said first and second lossless compression encoding steps are updated,
said first lossless compression encoding step is executed to take over said second lossless compression encoding step and continue the compression process, and
said third lossless compression encoding step is executed to re-encode the image region information compression-encoded in said second lossless compression encoding step before it is determined that the total code amount has reached the predetermined amount.

21. An image processing apparatus for compression-encoding image data and image region information of the image data, comprising:
a first lossy compression encoding unit in which a compression parameter can be changed and which is arranged for the image data;
a second lossy compression encoding unit in which the compression parameter can be changed and which is arranged for the image data and adapted to compression-encode the image data using a compression parameter for a higher compression ratio than in said first lossy compression encoding unit;

a third lossy compression encoding unit which is arranged for the image data and adapted to decode and re-encode code data compressed by said second lossy compression encoding unit;

a first lossless compression encoding unit in which the compression parameter can be changed and which is arranged for the image region information;

a second lossless compression encoding unit in which the compression parameter can be changed and which is arranged for the image region information and adapted to compression-encode the image region information using a compression parameter for a higher compression ratio than in said first lossless compression encoding unit;

a third lossless compression encoding unit which is arranged for the image region information and adapted to decode and re-encode code data compressed by said second lossless compression encoding unit;

a code amount monitor unit adapted to determine whether a total code amount of the code amounts generated by said first lossy compression encoding unit and said first lossless compression encoding unit has reached a predetermined amount while the codes are being compression-encoded by said first lossy compression encoding unit and said first lossless compression encoding unit;

a determination unit adapted to, when said code amount monitor unit determines that the total code amount has reached the predetermined amount, determine information for which the compression parameter is to be changed, on the basis of a correlation between the code amount by said first lossy compression encoding unit and the code amount by said first lossless compression encoding unit; and a control unit adapted to control said first to third lossy compression encoding units and said first to third lossless compression encoding units on the basis of contents determined by said determination unit, wherein said control unit, when said determination unit determines that the information for which the compression parameter is to be changed is the image data, updates the compression parameters in said first and second lossy compression encoding units, causes said first lossy compression encoding unit to take over said second lossy compression encoding unit and continue the compression process, and causes said third lossy compression encoding unit to re-encode the image data compression-encoded by said second lossy compression encoding unit before it is determined that the total code amount has reached the predetermined amount, and when said determination unit determines that the information for which the compression parameter is to be changed is the image region information, updates the compression parameters in said first and second lossless compression encoding units, causes said first lossless compression encoding unit to take over said second lossless compression encoding unit and continue the compression process, and causes said third lossless compression encoding unit to re-encode the image region information compression-encoded by said second lossless compression encoding unit before it is determined that the total code amount has reached the predetermined amount.

22. A computer program stored in a computer-readable medium which functions as an image processing apparatus for compression-encoding image data and image region information of the image data, wherein the computer program functions as:

a first lossy compression encoding unit in which a compression parameter can be changed and which is arranged for the image data;

a second lossy compression encoding unit in which the compression parameter can be changed and which is arranged for the image data and adapted to compression-encode the image data using a compression parameter for a higher compression ratio than in said first lossy compression encoding unit;

a third lossy compression encoding unit which is arranged for the image data and adapted to decode and re-encode code data compressed by said second lossy compression encoding unit;

a first lossless compression encoding unit in which the compression parameter can be changed and which is arranged for the image region information;

a second lossless compression encoding unit in which the compression parameter can be changed and which is arranged for the image region information and adapted to compression-encode the image region information using a compression parameter for a higher compression ratio than in said first lossless compression encoding unit;

a third lossless compression encoding unit which is arranged for the image region information and adapted to decode and re-encode code data compressed by said second lossless compression encoding unit;

a code amount monitor unit adapted to determine whether a total code amount of the code amounts generated by said first lossy compression encoding unit and said first lossless compression encoding unit has reached a predetermined amount while the codes are being compression-encoded by said first lossy compression encoding unit and said first lossless compression encoding unit;

a determination unit adapted to, when said code amount monitor unit determines that the total code amount has reached the predetermined amount, determine information for which the compression parameter is to be changed, on the basis of a correlation between the code amount by said first lossy compression encoding unit and the code amount by said first lossless compression encoding unit; and a control unit adapted to control said first to third lossy compression encoding units and said first to third lossless compression encoding units on the basis of contents determined by said determination unit, wherein said control unit, when said determination unit determines that the information for which the compression parameter is to be changed is the image data, updates the compression parameters in said first and second lossy compression encoding units, causes said first lossy compression encoding unit to take over said second lossy compression encoding unit and continue the compression process, and causes said third lossy compression encoding unit to re-encode the image data compression-encoded by said second lossy compression encoding unit before it is determined that the total code amount has reached the predetermined amount, and when said determination unit determines that the information for which the compression parameter is to be changed is the image region information, updates the compression parameters in said first and second lossless compression encoding units, causes said first lossless compression encoding unit to take over said second lossless compression encoding unit and continue the compression process, and causes said third lossless compression encoding unit to re-encode the image region information compression-encoded by said second lossless compression encoding unit before it is determined that the total code amount has reached the predetermined amount.

23. A computer-readable storage medium storing a computer program of claim 22.

24. An image processing apparatus which compression-encodes image data, comprising:

a first encoding unit in which a quantization step can be changed;

a second encoding unit in which the quantization step can be changed and which is adapted to re-encode code data compressed by said first encoding unit;

a first determination unit adapted to monitor a code data amount generated by said first encoding unit and determine whether the code data amount has reached a predetermined amount;

a second determination unit adapted to calculate, on the basis of the code data amount, time $T0$ when the code data amount reaches the predetermined amount when it is assumed that said first encoding unit compression-encodes the data using a next quantization step and re-encoding end time $T1$ when it is assumed that the code data already generated in accordance with the current quantization step is re-encoded by said second encoding unit in which the next quantization step is set and determine whether condition: $T1 > T0 - \Delta t$ (where $\Delta t$ is a predetermined positive value) is satisfied;

a setting unit adapted to, when said first determination unit determines that the code data amount has reached the predetermined amount or said second determination unit determines that the condition is satisfied, set the next quantization steps in said first and second encoding units; and a control unit adapted to, when the quantization step is changed by said setting unit, cause said first encoding unit to continuously encode image data input after the quantization step is changed and cause said second encoding unit to re-encode the code data already encoded before the quantization step is changed.

25. The apparatus according to claim 24, wherein the code data amount serving as a base of determination in said second determination unit contains the number of symbols.

26. The apparatus according to claim 24, wherein said second encoding unit decodes the encoded data to be re-encoded not to the image data but to a data format of a frequency component and then re-encodes the data.

27. The apparatus according to claim 24, wherein
the apparatus further comprises a third determination unit adapted to calculate predicted time $T2$ when one-page image data is completely encoded and predicted time $T3$ when the code data amount generated by said first encoding unit reaches the predetermined amount and determine whether condition: $T2 > T3 - \Delta t'$ (where $\Delta t'$ is a predetermined positive value) is satisfied, and when said first determination unit determines that the code data amount has reached the predetermined amount or both the conditions of said second and third determination units are satisfied, said setting unit sets the next quantization steps in said first and second encoding units.

28. An image processing method of compression-encoding image data, comprising:

a first encoding step in which a quantization step can be changed;

a second encoding step, in which the quantization step can be changed, of re-encoding code data compressed in said first encoding step;

a first determination step of monitoring a code data amount generated in said first encoding step and determining whether the code data amount has reached a predetermined amount;

a second determination step of calculating, on the basis of the code data amount, time $T0$ when the code data amount reaches the predetermined amount when it is assumed that the data is compression-encoded in said first encoding step using a next quantization step and re-encoding end time $T1$ when it is assumed that the code data already generated in accordance with the current quantization step is re-encoded in said second encoding step in which the next quantization step is set and determining whether condition: $T1 > T0 - \Delta t$ (where $\Delta t$ is a predetermined positive value) is satisfied;

a setting step of, when it is determined in said first determination step that the code data amount has reached the predetermined amount or it is determined in said second determination step that the condition is satisfied, setting the next quantization steps in said first and second encoding steps; and a control step of, when the quantization step is changed in said setting step, executing said first encoding step to continuously encode image data input after the quantization step is changed and executing said second encoding step to re-encode the code data already encoded before the quantization step is changed.

29. The method according to claim 28, wherein
the method further comprises a third determination step of calculating predicted time $T2$ when one-page image data is completely encoded and predicted time $T3$ when the code data amount generated in said first encoding step reaches the predetermined amount and determining whether condition: $T2 > T3 - \Delta t'$ (where $\Delta t'$ is a predetermined positive value) is satisfied, and in said setting step, when it is determined in said first determination step that the code data amount has reached the predetermined amount or both the conditions of said second and third determination steps are satisfied, the next quantization steps are set in said first and second encoding steps.

30. A computer program stored in a computer-readable medium which functions as an image processing apparatus which compression-encodes image data, wherein the computer program functions as:

a first encoding unit in which a quantization step can be changed;

a second encoding unit in which the quantization step can be changed and which is adapted to re-encode code data compressed by said first encoding unit;

a first determination unit adapted to monitor a code data amount generated by said first encoding unit and determine whether the code data amount has reached a predetermined amount;

a second determination unit adapted to calculate, on the basis of the code data amount, time T0 when the code data amount reaches the predetermined amount when it is assumed that said first encoding unit compression-encodes the data using a next quantization step and re-encoding end time T1 when it is assumed that the code data already generated in accordance with the current quantization step is re-encoded by said second encoding unit in which the next quantization step is set and determine whether condition: T1>T0−Δt (where Δt is a predetermined positive value) is satisfied;

a setting unit adapted to, when said first determination unit determines that the code data amount has reached the predetermined amount or said second determination unit determines that the condition is satisfied, set the next quantization steps in said first and second encoding units; and a control unit adapted to, when the quantization step is changed by said setting unit, cause said first encoding unit to continuously encode image data input after the quantization step is changed and cause said second encoding unit to re-encode the code data already encoded before the quantization step is changed.

31. The program according to claim 30, wherein the program further comprises a third determination unit adapted to calculate predicted time T2 when one-page image data is completely encoded and predicted time T3 when the code data amount generated by said first encoding unit reaches the predetermined amount and determine whether condition: T2>T3−Δt'

(where Δt' is a predetermined positive value) is satisfied, and when said first determination unit determines that the code data amount has reached the predetermined amount or both the conditions of said second and third determination units are satisfied, said setting unit sets the next quantization steps in said first and second encoding units.

32. A computer-readable storage medium storing a computer program of claim 31.

33. An image processing apparatus which compression-encodes image data, comprising:

a first encoding unit in which a quantization step can be changed;

a second encoding unit in which the quantization step can be changed and which is adapted to execute encoding using a quantization step larger than at least that of said first encoding unit;

a third encoding unit in which the quantization step can be changed and which is adapted to re-encode code data compressed by said second encoding unit;

a monitor unit adapted to monitor a code data amount generated by said first and second encoding units from the image data that is being input;

a first determination unit adapted to determine whether the code data amount by said first encoding unit, which is monitored by said monitor unit, has reached a predetermined amount;

a second determination unit adapted to calculate, on the basis of the code data amount of said second encoding unit, which is monitored by said monitor unit, predicted time T0 when encoding by said second encoding unit is continued and the code data amount reaches the predetermined amount and re-encoding end time T1 when it is assumed that the code data already generated in accordance with the current quantization step of said second encoding unit is re-encoded by said third encoding unit in which the next quantization step is set and determine whether condition: T1>T0−Δt (where Δt is a predetermined positive value) is satisfied;

a quantization step updating unit adapted to, when said first encoding unit determines that the code data amount has reached the predetermined amount or said second encoding unit determines that the condition is satisfied, update the quantization step of said first encoding unit to the quantization step set in said second encoding unit and update each of the quantization steps of said second and third compression encoding units to a larger quantization step; and a control unit adapted to, when the quantization step is to be updated by said quantization step updating unit, update preceding encoded data of said first encoding unit to preceding code data precedingly generated by said second encoding unit and cause said third encoding unit to re-encode and update the preceding code data by said second encoding unit.

34. The apparatus according to claim 33, wherein the apparatus further comprises a third determination unit adapted to calculate predicted time T2 when one-page image data is completely encoded and predicted time T3 when the code data amount generated by said first encoding unit reaches the predetermined amount and determine whether condition: T2>T3−Δt'

(where Δt' is a predetermined positive value) is satisfied, and when said first determination unit determines that the code data amount has reached the predetermined amount or both the conditions of said second and third determination units are satisfied, said quantization step updating unit sets the next quantization steps in said first and second encoding units.

35. An image processing method of compression-encoding image data, comprising:

a first encoding step in which a quantization step can be changed;

a second encoding step, in which the quantization step can be changed, of executing encoding using a quantization step larger than at least that of said first encoding step;

a third encoding step, in which the quantization step can be changed, of re-encoding code data compressed in said second encoding step;

a monitor step of monitoring a code data amount generated in said first and second encoding steps from the image data that is being input;

a first determination step of determining whether the code data amount in said first encoding step, which is monitored in said monitor step, has reached a predetermined amount;

a second determination step of calculating, on the basis of the code data amount in said second encoding step, which is monitored in said monitor step, predicted time T0 when encoding in said second encoding step is continued and the code data amount reaches the predetermined amount and re-encoding end time T1 when it is assumed that the code data already generated in accordance with the current quantization step of said second encoding step is re-encoded in said third encoding step in which the next quantization step is set and determining whether condition: $T1 > T0 - \Delta t$ (where $\Delta t$ is a predetermined positive value) is satisfied;

a quantization step updating step of, when it is determined in said first encoding step that the code data amount has reached the predetermined amount or it is determined in said second encoding step that the condition is satisfied, updating the quantization step of said first encoding step to the quantization step set in said second encoding step and updating each of the quantization steps of said second and third compression encoding steps to a larger quantization step; and a control step of, when the quantization step is to be updated in said quantization step updating step, updating preceding encoded data in said first encoding step to preceding code data precedingly generated in said second encoding step and executing said third encoding step to re-encode and update the preceding code data in said second encoding step.

36. The method according to claim 35, wherein the method further comprises a third determination step of calculating predicted time T2 when one-page image data is completely encoded and predicted time T3 when the code data amount generated in said first encoding step reaches the predetermined amount and determining whether condition: $T2 > T3 - \Delta t'$ (where $\Delta t'$ is a predetermined positive value) is satisfied, and in the quantization step updating step, when it is determined in said first determination step that the code data amount has reached the predetermined amount or both the conditions of said second and third determination steps are satisfied, the next quantization steps are set in said first and second encoding steps.

37. A computer program stored in a computer-readable medium which functions as an image processing apparatus which compression-encodes image data, wherein the computer program functions as:

a first encoding unit in which a quantization step can be changed;

a second encoding unit in which the quantization step can be changed and which is adapted to execute encoding using a quantization step larger than at least that of said first encoding unit;

a third encoding unit in which the quantization step can be changed and which is adapted to re-encode code data compressed by said second encoding unit;

a monitor unit adapted to monitor a code data amount generated by said first and second encoding units from the image data that is being input;

a first determination unit adapted to determine whether the code data amount by said first encoding unit, which is monitored by said monitor unit, has reached a predetermined amount;

a second determination unit adapted to calculate, on the basis of the code data amount of said second encoding unit, which is monitored by said monitor unit, predicted time T0 when encoding by said second encoding unit is continued and the code data amount reaches the predetermined amount and re-encoding end time T1 when it is assumed that the code data already generated in accordance with the current quantization step of said second encoding unit is re-encoded by said third encoding unit in which the next quantization step is set and determine whether condition: $T1 > T0 - \Delta t$ (where $\Delta t$ is a predetermined positive value) is satisfied;

a quantization step updating unit adapted to, when said first encoding unit determines that the code data amount has reached the predetermined amount or said second encoding unit determines that the condition is satisfied, update the quantization step of said first encoding unit to the quantization step set in said second encoding unit and update each of the quantization steps of said second and third compression encoding units to a larger quantization step; and a control unit adapted to, when the quantization step is to be updated by said quantization step updating unit, update preceding encoded data of said first encoding unit to preceding code data precedingly generated by said second encoding unit and cause said third encoding unit to re-encode and update the preceding code data by said second encoding unit.

38. The program according to claim 37, wherein the program further comprises a third determination unit adapted to calculate predicted time T2 when one-page image data is completely encoded and predicted time T3 when the code data amount generated by said first encoding unit reaches the predetermined amount and determine whether condition: $T2 > T3 - \Delta t'$ (where $\Delta t'$ is a predetermined positive value) is satisfied, and when said first determination unit determines that the code data amount has reached the predetermined amount or both the conditions of said second and third determination units are satisfied, said quantization step updating unit sets the next quantization steps in said first and second encoding units.

39. A computer-readable storage medium storing a computer program of claim 37.

* * * * *

UNITED STATES PATENT AND TRADEMARK OFFICE
CERTIFICATE OF CORRECTION

PATENT NO. : 7,227,998 B2
APPLICATION NO. : 10/458490
DATED : June 5, 2007
INVENTOR(S) : Tadayoshi Nakayama et al.

It is certified that error appears in the above-identified patent and that said Letters Patent is hereby corrected as shown below:

COLUMN 4

Line 5, "shown" should read --shown in--;
Line 9, "shown" should read --shown in--;
Line 12, "shown" should read --shown in--;
Line 28, "according" should read --according to--; and
Line 32, "according" should read --according to--.

COLUMN 10

Line 9, "encodin-" should read --encod- --; and
Line 10, "g.re-encoding" should read --ing.re-encoding--.

COLUMN 13

Line 51, "encodin-" should read --encod- --; and
Line 52, "g.re-encoding" should read --ing.re-encoding--.

COLUMN 14

Line 22, "compression" should read --the compression--; and
Line 23, "way" should read --the way--.

COLUMN 18

Line 41, "represents" should read --represent--.

COLUMN 20

Line 22, "unit" should read --units--.

COLUMN 21

Line 22, "discarded, lossless" should read --discarded and lossless--.

COLUMN 22

Line 24, "process-flow" should read --process flow--.

UNITED STATES PATENT AND TRADEMARK OFFICE
CERTIFICATE OF CORRECTION

PATENT NO. : 7,227,998 B2
APPLICATION NO. : 10/458490
DATED : June 5, 2007
INVENTOR(S) : Tadayoshi Nakayama et al.

It is certified that error appears in the above-identified patent and that said Letters Patent is hereby corrected as shown below:

COLUMN 24

Line 64, "Q4, Q5, QG, . . ." should read --Q4, Q5, Q6, . . .--.

COLUMN 27

Line 18, "s2501," should read --S2501,--.

COLUMN 37

Line 18, "re-encode" should read --re-encoded--;
Line 50, "obtain" should read --obtained--; and
Line 51, "shown)" should read --shown).--.

COLUMN 40

Line 29, "mount" should read --amount--.

COLUMN 43

Line 59, "be" should be deleted.

COLUMN 44

Line 39, "first" should read --a first--;
Line 41, "second" should read --a second--; and
Line 59, "encode" should read --encoding--.

COLUMN 45

Line 27, "cause" should read --causes--.

COLUMN 46

Line 36, "first" should read --a first--; and
Line 39, "second" should read --a second--.

UNITED STATES PATENT AND TRADEMARK OFFICE
CERTIFICATE OF CORRECTION

PATENT NO. : 7,227,998 B2
APPLICATION NO. : 10/458490
DATED : June 5, 2007
INVENTOR(S) : Tadayoshi Nakayama et al.

It is certified that error appears in the above-identified patent and that said Letters Patent is hereby corrected as shown below:

<u>COLUMN 47</u>

Line 33, "cause" should read --causes--.

<u>COLUMN 49</u>

Line 11, "wherein" should read --wherein,--;
    Line 19, "includes" should read --includes:--;
    Line 26, "step," should read --step;--;
    Line 33, "again," should read --again;--;
    Line 39, "determined, and" should read --determined; and--; and
    Line 49, "wherein" should read --wherein,--.

<u>COLUMN 52</u>

Line 28, "wherein" should read --wherein,--.

Signed and Sealed this

Twenty-fourth Day of February, 2009

JOHN DOLL
*Acting Director of the United States Patent and Trademark Office*